(12) United States Patent
Honda et al.

(10) Patent No.: US 8,334,344 B2
(45) Date of Patent: Dec. 18, 2012

(54) SLIDING MATERIAL, SLIDING MEMBER, AND WEATHERSTRIP

(75) Inventors: Masayuki Honda, Saitama (JP); Nobuyasu Noda, Saitama (JP); Hajime Tsujihana, Saitama (JP); Fukuji Watanobe, Saitama (JP); Nobuhiko Takahashi, Saitama (JP); Tsuneo Usuda, Saitama (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 85 days.

(21) Appl. No.: 12/465,445

(22) Filed: May 13, 2009

(65) Prior Publication Data

US 2009/0277095 A1 Nov. 12, 2009

Related U.S. Application Data

(63) Continuation-in-part of application No. 12/279,967, filed as application No. PCT/JP2007/064050 on Jul. 10, 2007, now abandoned.

(30) Foreign Application Priority Data

Jul. 10, 2006 (JP) ................................ 2006-189722
Apr. 23, 2007 (JP) ................................ 2007-113437

(51) Int. Cl.
E06B 7/22 (2006.01)
C08L 47/00 (2006.01)

(52) U.S. Cl. .................. 525/105; 264/177.1; 264/177.2; 49/475.1

(58) Field of Classification Search .......................... None
See application file for complete search history.

(56) References Cited

U.S. PATENT DOCUMENTS

| 6,499,256 B1 * | 12/2002 | Aritake et al. ................... 49/441 |
| 2003/0036598 A1 | 2/2003 | Yamasa et al. |
| 2008/0182939 A1 | 7/2008 | Morikawa et al. |

FOREIGN PATENT DOCUMENTS

| JP | 61-4408 | 2/1986 |
| JP | 7-73893 | 8/1995 |
| JP | 11-342750 | 12/1999 |
| JP | 2000-052780 | 2/2000 |
| JP | 2000-327848 | 11/2000 |
| JP | 2002-20558 | 1/2002 |
| JP | 2003-200738 | 7/2003 |
| JP | 2004-299640 | 10/2004 |
| JP | 2004-299668 | 10/2004 |
| JP | 2004-306937 | 11/2004 |
| JP | 2004307546 A | 11/2004 |
| JP | 3693962 | 7/2005 |
| JP | 2005248110 A | 9/2005 |
| JP | 2006-257313 | 9/2006 |
| WO | 03/025055 A1 | 3/2003 |

OTHER PUBLICATIONS

Office Action for U.S. Appl. No. 12/279,967 mailed on Aug. 11, 2010, 14 pages.
International Search Report (English only) for PCT/JP2007/064050 mailed Nov. 20, 2007 (2 pages).
esp@cenet abstract for JP6344472 dated Dec. 20, 1994 (1 page).
esp@cenet abstract for JP2003213141 dated Jul. 30, 2003 (1 page).
esp@cenet abstract for JP2002020558 dated Jan. 23, 2002 (1 page).
esp@cenet abstract for JP2000327848 dated Nov. 28, 2000 (1 page).
esp@cenet abstract for JP2004299640 dated Oct. 28, 2004 (1 page).
esp@cenet abstract for JP2004306937 dated Nov. 4, 2004 (1 page).
esp@cenet abstract for JP2004299668 dated Oct. 28, 2004 (1 page).
esp@cenet abstract for JP2006257313 dated Sep. 28, 2006 (1 page).
esp@cenet abstract for JP11342750 dated Dec. 14, 1999 (1 page).
Patent Abstracts of Japan in Japanese Publication No. 56-062575, Publication date May 28, 1981 (1 page).
Patent Abstracts of Japan in Japanese Publication No. 2000-052780, Publication date Feb. 22, 2000 (1 page).
Patent Abstracts of Japan in Japanese Publication No. 2003-200738, Publication date Jul. 15, 2003 (1 page).
PCT Notification of Transmittal of Translation of the Preliminary Report on Patentability with Written Opinion for International Application No. PCT/JP2007/064050 mailed Jan. 29, 2009 (8 pages).
Patent Abstracts of Japan in Japanese Publication No. 2005-248110, Publication date Sep. 9, 2005 (1 page).
Patent Abstracts of Japan in Japanese Publication No. 2004-307546, Publication date Nov. 4, 2004 (1 page).
Office Action for Japan Application No. P2006-270951 with English translation, mailed on Nov. 22, 2011, 3 pages.

* cited by examiner

*Primary Examiner* — Marc Zimmer
(74) *Attorney, Agent, or Firm* — Osha Liang LLP

(57) ABSTRACT

The sliding material is obtainable by extrusion of a raw material containing an olefin-based polymer and a silicone compound as the essential components. A part of the olefin-based polymer forms a crosslinked material in the sliding material. The crosslinked material forms domains to disperse in the sliding material so as to prevent uneven distribution of the silicone compound in the extrusion direction. The residual fraction of hot xylene reflux of the sliding material is in a range from 33 to 75% by weight based on the total weight of the sliding material, and the content of the silicone compound based on the total weight of the sliding material is in a range from 5 to 35% by weight.

7 Claims, 39 Drawing Sheets

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(c)

(d)

SLIDING MATERIAL, SLIDING MEMBER, AND WEATHERSTRIP

CROSS-REFERENCE TO RELATED APPLICATIONS

This is a Continuation-In-Part application of Ser. No. 12/279,967 filed on Aug. 19, 2008 now pending.

TECHNICAL FIELD

The present invention relates to a sliding material, a sliding member, and a weather strip.

BACKGROUND ART

Weather strip attached to a door sash of an automobile is an automobile component used in order to seal an outer peripheral part of a window glass to firmly hold the window glass, thus preventing rain, wind, foreign matter, and the like from entering a cabin, and also in order to assure smooth open/close of the window glass.

To ensure those functions, the weather strip is normally formed with a sliding material containing an elastomer. The sliding material used for the case is represented by a coating-setting type such as an urethane-based coating material and by a material of olefin resin and the like mixed with varieties of additives. (Refer to Patent Document 1.)

On the other hand, aiming to provide slidability and other characteristics, there are technologies of adding particles of crosslinked material to the resin, thus forming irregular surface profile of the molding based on the shape of the particles. (Refer to Patent Documents 2 and 3.)

[Patent Document 1] Examined Japanese Patent Publication No. 7-73893
[Patent Document 2] Japanese Patent No. 3693962
[Patent Document 3] Unexamined Japanese Patent Publication No. 2002-20558

DISCLOSURE OF THE INVENTION

Aiming at the improvement in the characteristics or the like, there may be added a silicone compound such as silicone oil to the above elastomer-based sliding material. Since, however, the addition of silicone compound raises problems described below, it has been difficult to obtain a practically applicable thermoplastic sliding material containing silicone compound.

First, one of the problems arises on molding a sliding material such as weather strip by extruding an elastomer containing silicone compound through a die. That is, the silicone compound adheres to the die part to become droplets and lumps, which adhered-silicone compound then sags onto the molding or appears locally on the surface of the molding, thereby resulting in molding failure such as forming a scale-like dappled pattern and large stripes.

Another problem is generation of bad appearance caused by bleeding the silicone compound on the surface of the weather strip in a dappled pattern with time. Still another problem is the deterioration in the slide durability due to prompt removal of the silicone compound during repeated sliding.

In this regard, an object of the present invention is to provide a sliding material containing a silicone compound, which sliding material generates molding failure very little even when the content of silicone compound increases, decreases the bleeding of silicone compound to a sufficient level, and assures the durability. Another object of the present invention is to provide a sliding member using that kind of sliding material, and to provide a weather strip using the sliding member.

To attain the above objects, the present invention provides a sliding material obtainable by extrusion of a raw material containing an olefin-based polymer and a silicone compound as the essential components, wherein a part of the olefin-based polymer forms a crosslinked material in the sliding material, the crosslinked material forms domains to disperse in the sliding material so as to prevent uneven distribution of the silicone compound in the extrusion direction, the residual fraction of hot xylene reflux of the sliding material is in a range from 33 to 75% by weight based on the total weight of the sliding material, and the content of the silicone compound based on the total weight of the sliding material is in a range from 5 to 35% by weight.

According to a new finding of the inventors of the present invention, uneven distribution of the silicone material in the direction of extrusion of the sliding material allows forming a layer composed of the silicone material, and when the layer is formed near the surface or when the material worn to a position near the layer as a result of sliding, there occur above-described problems of appearance of molding and appearance during using. In addition, since the makeup of silicone compound is not available unless the wear reaches the layer of silicone compound, it is difficult to hold the silicone compound in a quantity allowing lubricating the surface layer, thus increasing the sliding resistance and increasing the wear, which raises the above-described problem of slide durability.

Since, however, the sliding material of the present invention forms a crosslinked material of olefin-based polymer, the uneven distribution of silicone material in the extrusion direction is prevented. As a result, the appearance problem of the silicone material for molding and using thereof is decreased to a satisfactory level in spite of very large content of the silicone compound, as high as 5 to 35% by weight.

In addition, prevention of uneven distribution of the silicone compound in the extrusion direction improves the durability of the sliding material. Furthermore, Squeaking Noise generated during use is decreased, which Squeaking Noise is likely generated in general elastomer-based sliding materials containing silicone compound.

Although the reason to be able to prevent the Squeaking Noise is not fully analyzed, the inventors of the present invention speculate the following mechanism. That is, general elastomer-based sliding materials containing silicone compound are inherently non-uniform in the distribution of silicone compound on the surface thereof, which gives mixed existence of slidable portion and non-slidable portion on the surface, and thus Squeaking Noise is likely generated. When sliding motions are repeated, poor lubrication effect causes progress of increase in the resistance resulted from wear and adhesion, which increases the difference in resistance between the portion of existence of silicone compound and the portion of absence of silicone compound, and thus the Squeaking Noise is further generated. When a substance, specifically water, (water likely slips), adheres, the non-uniformity of the distribution of silicone compound on the material surface results in the slide-contact between the glass and the portion having a very large difference in resistance between elastomer and water, which results in very easily generating Squeaking Noise. Furthermore, if the distribution of silicone compound on the surface becomes non-uniform or lacks, the portion of highly compatible with water and the portion of poorly compatible with water appear on the surface in a mixed state, which increases the opportunity of generating Squeaking Noise. To the contrary, the sliding material according to the present invention assures uniform dispersion of silicone compound and has high lubrication and high water-removal capability as the elastomer low resistance and protection film, thereby presumably generating the above phenomena very little, thus preventing the generation of Squeaking Noise.

When the above silicone compound is kneaded in a plastomill at 180° C. and 10 rpm, the resulting torque is preferably in a range from 0.01 to 5 Nm.

With the above torque as an index, the degree of viscosity of silicone compound is specified. According to a finding of the inventors of the present invention, use of a silicone compound which has a viscosity giving the torque within the above specified range further significantly improves the slide durability under sliding while contacting with water, or under other condition. Although the reason to be able to attain the effect is not fully analyzed, the inventors of the present invention speculate that the optimization of viscosity of the silicone compound allows easily maintaining the quantity of silicone compound existing on the surface of the sliding material. If the quantity of silicone compound on the surface of the sliding material becomes insufficient, the condition on the surface becomes scattering of small quantity of very thin water layer. That condition very likely induces the generation of Squeaking Noise.

When the viscosity of silicone compound is controlled as described above, even if the silicone compound which originally existed on the surface in the initial period is removed by sliding motion, it is expected that silicone compound is supplied from interior to the surface of the sliding material, and thus the decrease in the quantity of silicone compound on the surface is suppressed. The viscosity of silicone compound presumably affects the easiness of movement of the silicone compound from interior to the surface of the sliding material. Furthermore, the viscosity of silicone compound presumably affects the length of moving passage of silicone compound from interior to the surface of the sliding material, and further affects the concentration of silicone compound within the moving passage thereof.

On a cross section parallel to the extrusion direction, it is preferable that a portion of the dispersed phase composed of the domain and the not-crosslinked olefin-based polymer, occupying 80% by area, has a dispersion diameter in a range from 0.1 to 200 μm.

The mean particle diameter of the domains of olefin-based polymer crosslinked material on the cross section parallel to the extrusion direction is preferably in a range from 0.5 to 150 μm.

Since olefin-based polymer and silicone-based compound have poor compatibility with each other, the silicone compound likely forms a flow passage in the extrusion direction to result in uneven distribution. If, however, the mean particle diameter of the domains of olefin-based polymer crosslinked material is within the above range, the formation of flow passage in the extrusion direction is hindered, and it becomes difficult for the silicone compound to segregate in stratum form along the extrusion direction. As a result, the problem of bleeding of silicone material during molding and during using is specifically solved well, the durability is further improved, and the generation of Squeaking Noise is effectively decreased.

Those effects become specifically significant when the silicone compound contains at least one silicone compound having 10 mPa·s or higher viscosity, selected from the group consisting of silicone oil, silicone gum, and silicone copolymer containing 40% by weight or more of silicone.

To easily form a crosslinked material so as not to segregate the silicone compound in the extrusion direction, it is preferable that the sliding material contains, as the olefin-based polymer, at least one olefin-based polymer selected from the group consisting of a not-crosslinked olefin-based polymer having an unsaturated bond and a not-crosslinked olefin-based polymer containing a group represented by the formula (i), (ii), (iii), or (iv). The crosslinked material is formed by crosslinking these olefin-based polymers. In addition, the crosslinked material is preferably obtainable by the dynamic crosslinking extrusion.

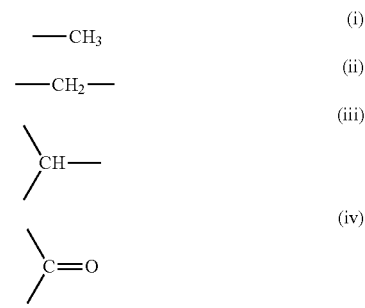

From the point of improving the flowability and moldability, and of improving adhesion with elastomer at the lip part or the like, the above raw materials preferably contain a not-crosslinked olefin-based polymer. That is, it is preferable that the raw material containing olefin-based polymer and silicone compound as the essential components contains a not-crosslinked olefin-based polymer and a crosslinked olefin-based polymer, and that the crosslinked olefin-based polymer (crosslinked material) is obtainable by the dynamic crosslinking extrusion.

The sliding material according to the present invention is applicable to a sliding member and a weather strip. That is, there is provided a sliding member for weather strip slide-contacting with a window glass, which sliding member is made of above sliding material, and provided a weather strip having a sliding member slide-contacting with a window glass, which sliding member is made of above sliding material.

There is provided a sliding material containing a silicone compound, which sliding material hardly generates molding failure even when the content of silicone compound increases, decreases the bleeding of silicone compound to a sufficient level, and assures durability. Also there is provided a sliding member using that type of sliding material, and a weather strip using the sliding member.

BEST MODES FOR CARRYING OUT THE INVENTION

Figure 1:
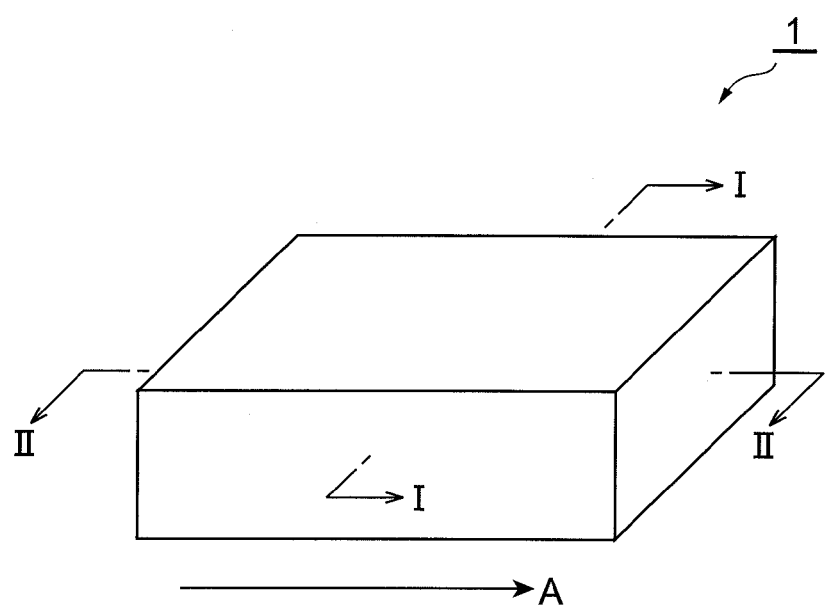
FIG. 1 shows a perspective view of a sliding material according to an embodiment.

Preferred embodiments of the present invention are described below in detail referring to the drawings. For the description of drawings, the same reference symbol is given to the same element, and duplicated description is not given. For easy understanding, the drawings are magnified in a part, and dimensions and relative size are not necessarily the same to those given in the description.

Figure 2:
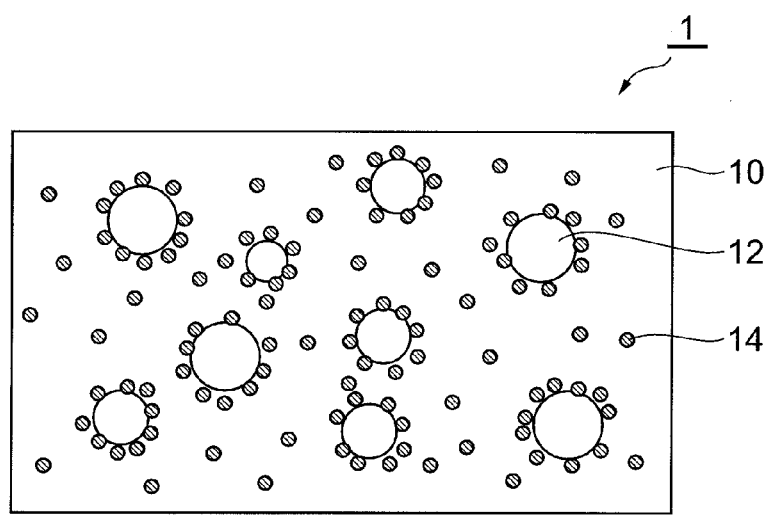
FIG. 2($a$) is a I-I cross sectional view of the sliding material shown in FIG. 1, and FIG. 2($b$) is a II-II cross sectional view of FIG. 1.
Figure 2:
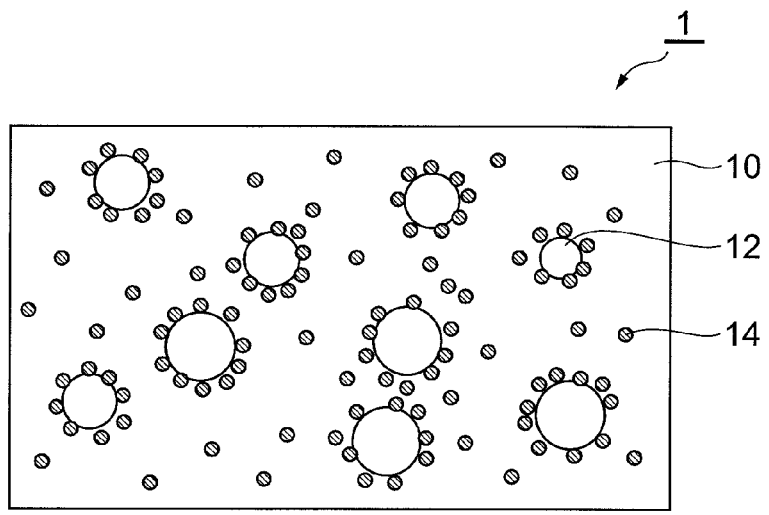

FIG. 1 shows a perspective view of a sliding material 1 according to an embodiment. The arrow A direction in FIG. 1 is the direction of extrusion of the sliding material 1. FIG. 2(*a*) is the I-I cross sectional view of FIG. 1, (the cross sectional drawing normal to the extrusion direction, viewed in the arrow direction), and FIG. 2(*b*) is the II-II cross sectional view of FIG. 1, (the cross sectional drawing parallel to the extrusion direction, viewed in the arrow direction).

As shown in FIG. 2(*a*) and FIG. 2(*b*), on both the cross section normal to the extrusion direction and the cross section parallel to the extrusion direction, the sliding material 1 has dispersed domains 12 composed of a crosslinked olefin-based polymer in a matrix 10 composed of a not-crosslinked olefin-based polymer, and the sliding material 1 contains a silicone compound 14. In the sliding material 1, the silicone compound 14 exists in a large quantity at interface between the matrix 10 and the domain 12.

Figure 3:
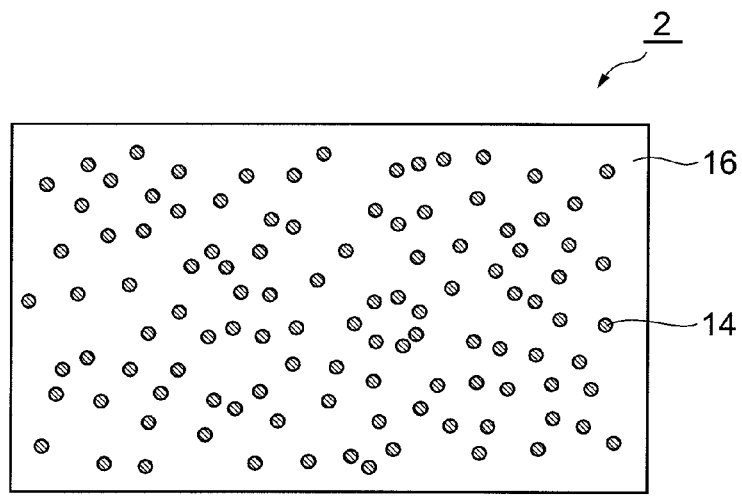
FIG. 3($a$) is a cross sectional view of a sliding material in the prior art, normal to the extrusion direction, and FIG. 3($b$) is a cross sectional view thereof parallel to the extrusion direction.
Figure 3:
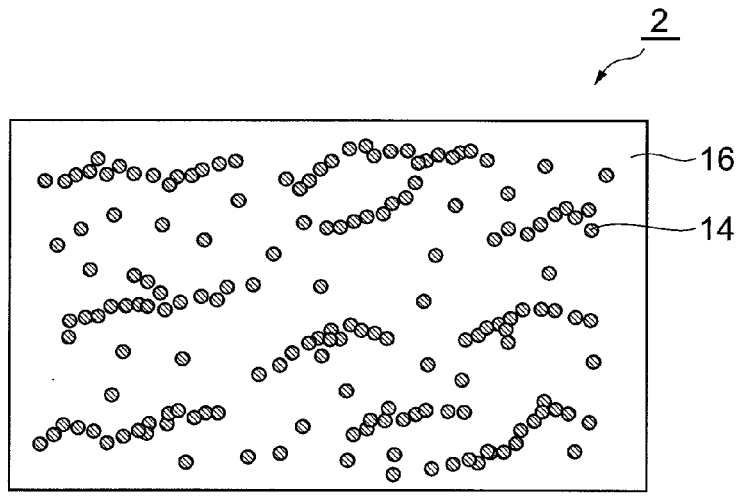

FIG. 3(*a*) is a cross sectional view of a sliding material 2 in the prior art, normal to the extrusion direction, and FIG. 3(*b*) is a cross sectional view thereof parallel to the extrusion direction. As shown in FIG. 3(*a*), on the cross section normal to the extrusion direction, the silicone-based compound 14 is dispersed in a matrix 16 of olefin-based polymer. However, on the cross section parallel to the extrusion direction, as shown in FIG. 3(*b*), the silicone-based compound 14 segregates in the extrusion direction. In other words, the silicone compound 14 forms a layer extending in the extrusion direction within the sliding material 1.

That is, different from the sliding material 2 in the prior art, in the sliding material 1, the crosslinked material of olefin-based polymer forms the domains 12 to disperse in the sliding material so as to prevent the uneven distribution of the silicone compound 14 in the extrusion direction. If a layer of the silicone compound 14 having a length of 50 μm or more (further 80 μm or more, and still further 100 μm or more) extending only in the extrusion direction is formed, it can be understood that the silicone compound 14 segregates in the extrusion direction.

For the case of conventional sliding material using a silicone compound, many applications emphasize the compatibility of silicone compound with resin at molecular level, and the fixation of silicone compound by chemical bonding mainly in order to prevent vanishing of silicone compound caused by bleeding and to prevent eruption of silicone compound during molding. For example, there are studies of a method to control the compatibility by optimizing the molecular weight of the silicone compound, a method to modify chemically the silicone compound, and a method to copolymerize the silicone compound.

To the contrary, differently from the methods of prior art emphasizing the compatibility and chemical bonding, the present invention is based on the concept of intentionally forming a zone which easily attracts silicone compound having low compatibility with resin (olefin-based polymer) within the resin. The zone easily attracting silicone compound is formed mainly at peripheral area of the domain of the crosslinked material. Since the crosslinked material has low compatibility with the silicone compound, and since it has high viscosity, it is substantially not mixed with the silicone compound even under shear generated during extrusion molding. Furthermore, caused by the difference in viscosity or the like between the crosslinked material and the not-crosslinked olefin-based polymer, a gap between them is likely formed, and the silicone compound likely enters the gap. During the extrusion molding, the silicone compound flows avoiding the domain of crosslinked material, and segregates between adjacent domains of crosslinked material, segregates to the interface between the domain of crosslinked material and the phase of the not-crosslinked olefin-based polymer, or to a zone in the vicinity of the interface, or segregates in the not-crosslinked olefin-based polymer. Consequently, the silicone compound can also be distributed in the normal direction to the extrusion direction without segregating in the extrusion direction. The shape of the zone in which the silicone compound segregates is mainly controlled by the quantity and the size of the domains of the crosslinked material. Therefore, the crosslinked material itself may be in a relatively soft state, and likely forms a soft sliding material having excellent sliding performance.

By adopting the above new method, the present invention makes it possible to use a large quantity of silicone compound, which large quantity thereof may generate failures in the conventional art. Owing to the existence of zone to which silicone compound easily enters, even when a large quantity of silicone compound is dispersed in a poor compatibility olefin-based polymer, there hardly occurs bleeding inducing vanishing phenomenon.

According to the present invention, furthermore, the crosslinked material is formed not only to create irregular surface profile but also to arrange zones to which silicone compound easily enters around the domains of crosslinked material, as described above. Compared with the method depending on the irregular surface profile, the present invention has large effect to prevent the generation of Squeaking Noise. For the case of irregular surface profile, the appearance may become a problem. However, the present invention is also superior in raising very little problem of appearance.

Figure 4:
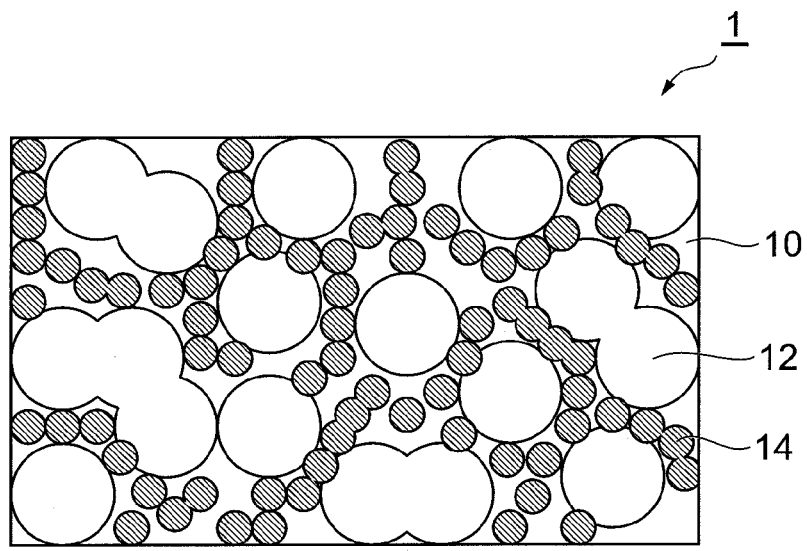
FIG. 4 is a cross sectional view of the sliding material according to the embodiment, parallel to the extrusion direction.

By adequately controlling the quantity and the size of domains of crosslinked material, and further by adequately controlling the quantity and the viscosity of silicone compound, the silicone compound segregates in the vicinity of domains of crosslinked material, which allows the silicone compound to easily form a phase of a network structure. Once the network structure is established, the silicone compound is easily supplied from interior of the sliding material to the surface thereof. FIG. 4 is a schematic cross sectional drawing of a sliding material having a formed network structure of silicone compound according to an embodiment, parallel to the extrusion direction. The sliding material 1 of FIG. 4 contains a large quantity of domains 12 composed of crosslinked olefin-based polymer. The phases of silicone compound 14 connect together in the gaps among domains 12, thus forming the network structure. In the network structure of the silicone compound 14, it is presumed that micropassages connecting the interior to the surface of the sliding material 1 are formed, and that the silicone compound 14 is supplied to the surface through the passages by the sliding-contact with glass or the like. The network structure is formed also on the cross section normal to the extrusion direction. The sliding material having that type of network structure is specifically superior in the slidability and the moldabilty.

The residual fraction of hot xylene reflux of the sliding material 1 is in a range from 33 to 75% by weight based on the total weight of the sliding material 1. The term "residual fraction of hot xylene reflux" specifies the value obtained by the following method.

That is, the sliding material 1 having a thickness of 0.5 mm or less is cut to a size of 5 mm or less to prepare a sample of about 3 g. The sample was accurately weighed to W1. The sample is placed in a cylindrical filter paper, which is then mounted on a Soxhlet extractor to conduct reflux extraction with xylene for 6 hours. After the extraction, the filter paper with the sample is taken out, which is then placed on a hot plate at 120° C., and allowed to stand for 5 hours to fully evaporate the xylene. After allowed to standing to cool, the sample is accurately weighed to W2. The heating time for evaporation is adequately adjusted to secure the time so as the xylene to be evaporated and the sample weight to be satisfactorily stabilized. For example, when the heating time is 5 hours, if the change rate of the "residual fraction (%) of hot xylene reflux" is within +5% and −8% between the case of 5 hours of heating and the case of further 5 hours (total 10 hours) of heating, the heating time of 5 hours is judged as adequate. If the change rate is large, the heating time is extended so as the change rate to become the range from +5% to −8% comparing with the rate obtained from heating at the first cycle. If the weight of inorganic component such as filler insoluble in hot xylene is expressed by W3, the "residual fraction of hot xylene reflux" is derived from [100×(W2−W3)/W1]. The residual fraction of hot xylene reflux mainly reflects the content of crosslinked material and the degree of crosslinking in the sliding material.

If the residual fraction of hot xylene reflux of the sliding material 1 is less than 33% by weight, the silicone compound deposits in a dappled pattern on the surface, or the silicone compound adheres to the die part for molding to generate droplets and lumps (hereinafter the droplets and lumps are referred also to as "GUM"). The "GUM" is mainly composed of silicone compound, not of olefin-based polymer. If the residual fraction exceeds 75% by weight, flowability deteriorates. The residual fraction of hot xylene reflux is preferably in a range from 33 to 70% by weight, and more preferably from 38 to 65% by weight, because that range can further improve the moldability and the holding performance of silicone compound. Alternatively, the residual fraction of hot xylene reflux may be in a range from 33 to 65% by weight, from 38 to 60% by weight, or from 33 to 55% by weight.

In the sliding material 1, the content of silicone compound 14 is in a range from 5 to 35% by weight based on the total weight of the sliding material 1. The sliding material 1 contains that very large quantity of silicone compound compared with the content thereof in the conventional sliding materials, as shown in FIG. 3(a) and FIG. 3(b). Presumable reasons of attaining that high content are (1) that a part of the olefin-based polymer forms a crosslinked material in the sliding material 1, and the crosslinked material forms the domains 12 so as to prevent uneven distribution of silicone compound 14 in the extrusion direction and disperses in the sliding material, and (2) that the residual fraction of hot xylene reflux of the sliding material becomes 33 to 75% by weight based on the total weight of the sliding material.

If the content of silicone compound 14 is less than 5% by weight based on the total weight of the sliding material 1, the slide durability deteriorates, the water-removal performance becomes poor, and Squeaking Noise is likely generated. If the content thereof exceeds 35% by weight, molding failure and bleeding occur. To assure moldability and slide durability, and to prevent generation of Squeaking Noise, the content of silicone compound 14 is preferably in a range from 7 to 34% by weight, and more preferably from 9 to 33% by weight. Alternatively, the content of silicone compound 14 may be in a range from 5 to 18% by weight, or from 9 to 15% by weight.

In the sliding material 1, the mean particle diameter of the domains 12 on the cross section parallel to the extrusion direction, given in FIG. 2(b), is in a range from 0.5 to 150 µm. When the mean particle diameter of the domains 12 is within that range, the bleeding of silicone material during molding and during using can favorably be prevented, the durability is high, and the generation of Squeaking Noise can be effectively decreased. If the mean particle diameter of the domains 12 is less than 0.5 µm, the uneven distribution of silicone compound in the extrusion direction likely occurs, and if the mean particle diameter thereof exceeds 150 µm, the silicone compound likely comes around the domain, which then likely induces uneven distribution of the silicone compound in the extrusion direction. From the point of even distribution of the silicone compound, the mean particle diameter of the domains 12 is preferably in a range from 1 to 100 µm, and more preferably from 3 to 70 µm. Alternatively, the mean particle diameter of the domains 12 may be in a range from 1 to 30 µm.

The mean particle diameter of the domains 12 on a cross section parallel to the extrusion direction can be determined by taking electron microscope photographs of the cross section, and by applying image-processing to calculate the particle diameters equivalent to the particle diameter of each domain 12, and then by deriving the average of the total. The particle diameter is determined by calculating a diameter as if the domain 12 is a perfect circle for measured area of the domain 12. Alternatively, the cross section may be mapped based on the surface elastic modulus using a method such as AFM and nanoindentation, thus observing the domains 12.

The domain 12 is a zone composed mainly of crosslinked material. Although the domain 12 may contain not-crosslinked olefin-based polymer, in some cases, it substantially does not contain silicone compound, (even when silicone compound is intentionally added to the crosslinked material, the silicone compound shows only slight compatibility, and both of them are separated from each other). For example, when X-ray images on a cross section of the sliding material are mapped based on the Si element concentration or the O element concentration, (olefin-based polymer itself often substantially does not contain Si element or O element), the zone in which the Si element concentration or the O element concentration is less than a certain value is a dispersed phase structured by mixing the domains 12 and the matrix 10 of the not-crosslinked olefin-based polymer each other, or the zone of high C element concentration can be understood as the dispersed phase composed of the domains 12 and the matrix 10. The dispersed phase composed of the domains 12 and the matrix 10 in the sliding material 1, or the dispersed phase of the olefin-based polymer, is formed in a shape having a dispersion diameter reflecting mainly the particle diameter of the domain 12 and being in a state of fusing the respective phases. As of the dispersed phase of olefin-based polymer, a portion of 80% by area thereof preferably has a dispersion diameter (maximum length) in a range from 0.1 to 200 μm. The structure segregates the silicone compound to an adequate degree, favorably prevents the bleeding of silicone material during molding and during using, assures high durability, and effectively decreases the generation of Squeaking Noise. If the percentage of the dispersed phase having small dispersion diameter increases, the silicone compound likely segregates in a stratum state along the extrusion direction. If the percentage of the dispersed phase having large dispersion diameter increases, the silicone compound excessively segregates to the peripheral area of domain, which likely leads to difficulty in supplying the silicone compound to the surface and to difficulty in obtaining good appearance. From the viewpoint of easiness of forming the supply passage of silicone compound from interior to outside of the sliding material, and the viewpoint of distribution of silicone compound normal to the extrusion direction and of silicone compound concentration in the supply passage, the 80% portion of the dispersed phase composed of the domains 12 and the matrix 10 more preferably has a dispersion diameter in a range from 0.5 to 150 μm, and most preferably has a dispersion diameter from 1 to 100 μm.

Examples of the olefin-based polymer used as the raw material of the sliding material 1 are at least one hydrocarbon-based polymer prepared by polymerizing α-olefin, cyclo-olefin, conjugated diene, or non-conjugated diene. The olefin-based polymer may be a copolymer of a monomer selected from the group consisting of α-olefin, cyclo-olefin, conjugated diene, or non-conjugated diene, and a copolymer of a monomer selected from above group with a monomer other than the above ones, (hereinafter also referred to as the "non-olefin-based monomer"). The non-olefin-based monomer includes (meth)acrylic acid, (meth)acrylic acid ester, vinyl acetate, vinyl alcohol (such as the one introduced as a saponified material of vinyl acetate), unsaturated carboxylic acid (including α,β-unsaturated carboxylic acid), vinyl ester, and styrene. The above-described olefin-based polymers can be used separately or in combination of two or more of them. When the olefin-based polymers of two or more of them are used, the mixing ratio thereof can be adequately determined so as the sliding material containing silicone compound by quantities from 5 to 35% by weight to give the residual fraction of hot xylene reflux of 33 to 75% by weight.

Examples of the olefin-based polymer prepared by polymerizing α-olefin, (this polymer belongs to the hydrocarbon-based polymers) are: propylene polymer; propylene-ethylene polymer; propylene-ethylene-α-olefin copolymer (the α-olefin contains 3 to 20 carbons); poly-α-olefin which introduced a hard segment (crystalline polymer part) and a soft segment (gum component) in the polymerization stage of polyolefin, (hereinafter that type of polymer may be referred also to as the "reactor TPO"); ethylene polymer; ethylene-α-olefin copolymer (the α-olefin contains 3 to 20 carbons); propylene-ethylene-butene copolymer; EBM (ethylene-butylene copolymer); polymethyl pentene; and polyisobutylene [poly(1,1-dimethylethylene)].

The olefin-based polymer prepared by polymerizing cyclo-olefin, (this polymer belongs to the hydrocarbon-based polymers), includes dicyclopentadiene-based polymer, norbornene-based polymer, petroleum resin, and hydrogenated petroleum resin.

Examples of the olefin-based polymer prepared by polymerizing conjugated diene are BR (butadiene rubber), SBR (styrene-butadiene rubber), SBS (styrene-butadiene block copolymer), IR (isoprene rubber), natural rubber, SIR (styrene-isoprene rubber), SIS (styrene-isoprene block copolymer), NBR (acrylic-butadiene rubber), IIR (butyl rubber), 1,2-polybutadiene, and hydrogenated compound thereof. Examples of the hydrogenated copolymer are SBBS (styrene-butadiene-butylene-styrene copolymer), SEBS (styrene-ethylene/butylene-styrene block copolymer), HSBR (hydrogenated styrene-butadiene rubber), SEPS (styrene-ethylene/propylene-styrene block copolymer), SEEPS (styrene-(ethylene-ethylene/propylene)-styrene block copolymer), SEBC (styrene-ethylene-butylene-ethylene block copolymer), and CEBS (ethylene crystal-(ethylene-butylene)-ethylene crystal copolymer).

The olefin-based polymer prepared by polymerizing non-conjugated diene includes 1,4-pentadiene polymer and 1,5-hexadiene polymer.

The olefin-based polymer which is a copolymer of α-olefin and a conjugated diene includes an ethylene-α-olefin-conjugated diene copolymer (the α-olefin contains 3 to 20 carbons). The olefin-based polymer which is a copolymer of α-olefin and non-conjugated diene includes an ethylene-α-olefin-non-conjugated diene copolymer (the α-olefin contains 3 to 20 carbons). The latter olefin-based polymer includes EPDM and ethylene-butene-non-conjugated diene.

Examples of the olefin-based polymer as a copolymer of α-olefin and non-olefin-based monomer are: ethylene-acrylic copolymer; ionomer (such as a polymer of ethylene-methacrylic acid copolymer ion-crosslinked by an ion of metal such as sodium and zinc, and a polymer of ethylene-acrylic acid copolymer ion-crosslinked by an ion of metal such as sodium and zinc); ethylene-vinyl alcohol copolymer; ethylene-α,β-unsaturated carboxylic acid copolymer; ethylene-vinylester copolymer; and ethylene-acrylic-unsaturated carboxylic acid copolymer.

The olefin-based polymer preferably contains a not-crosslinked olefin-based polymer and a crosslinked olefin-based polymer. The not-crosslinked olefin-based polymer preferably uses a polymer containing propylene or ethylene (such as polypropylene and polyethylene).

The crosslinked olefin-based polymer is a polymer prepared by crosslinking above-described olefin-based polymer. The crosslinked olefin-based polymer includes, without special limitation: above-given not-crosslinked olefin-based polymer having unsaturated bond; and in some cases, a polymer prepared by crosslinking using sulfur, organic peroxide, or phenol resin, which polymer is not-crosslinked olefin-based polymer containing a group expressed by above formula (i), (ii), or (iii) (an olefin-based polymer being crosslinked by withdrawal of hydrogen by an organic peroxide), or not-crosslinked olefin-based polymer containing a group expressed by the formula (iv), (a polymer being crosslinked by the addition of Si—H group in organohydrogen polysiloxane); and a polymer prepared by hydrosilylation-crosslinking by organohydrogen polysiloxane. In the above case, additive or catalyst may be added to accelerate the crosslinking reaction. Alternatively, kneading to give shearing and crosslinking may be given at a time, (dynamic crosslinking), using above crosslinking method, thus obtaining a polymer having a structure of thermoplastic olefin-based polymer, (such as polyethylene and polypropylene), in which the crosslinked domains are dispersed, which polymer is then used as the olefin-based polymer. Also there is available a method in which a not-crosslinked thermoplastic olefin polymer (such as polyethylene and polypropylene) is mixed with a crosslinked material prepared by relatively uniformly crosslinking by the dynamic crosslinking to totally thicken, and thus thickened crosslinked material is dispersed as the domains in the matrix of not-crosslinked thermoplastic olefin-based polymer. The size and the quantity of the domains of the olefin-based polymer are adjusted by the reactivity and the adding quantity of the olefin-based polymer and the crosslinking agent in the selected crosslinking method. Alternatively, the adjustment can be done by the condition of dynamic crosslinking. As of the above ionomers, the one becoming the residual fraction of hot xylene reflux belongs to the crosslinked olefin-based polymers. The crosslinked olefin-based polymer is not necessarily required to be used with a not-crosslinked olefin-based polymer, and sole crosslinked olefin-based polymer can be used.

The olefin-based polymer preferably contains at least one olefin-based polymer selected from the group consisting of a not-crosslinked olefin-based polymer having unsaturated bond, and a not-crosslinked olefin-based polymer having a group expressed by above formula (i), (ii), or (iii). The not-crosslinked olefin-based polymer having unsaturated bond includes: an olefin-based polymer prepared by polymerizing conjugated diene (such as BR, SBR, SBS, IR, natural rubber, SIR, SIS, NBR, IIR, and 1,2-polybutadiene); a hydrogenated material remaining unsaturated bond of conjugated diene polymer or conjugated diene copolymer, in a part, (SBBS and the like); a copolymer of α-olefin and conjugated diene; a copolymer of α-olefin and non-conjugated diene, (EPDM and the like); a copolymer of α-olefin and non-conjugated diene, (EPDM, ethylene-butene-non-conjugated diene, and the like); and a dicyclopentadiene-based polymer. Preferable crosslinking agent for the not-crosslinked olefin polymer having unsaturated bond includes: organic peroxide; organohydrogen polysiloxane and platinum-based catalyst; organic peroxide and organohydrogen polysiloxane; phenol resin and chloride catalyst; and sulfur-based crosslinking agent.

A typical example of the not-crosslinked olefin-based polymer containing the group of the formula (i) is propylene-α-olefin copolymer, (2 to 20 carbons), and other examples thereof are reactor-TPO, propylene-butene copolymer, and propylene-octene copolymer. Also polyisobutylene and butylene copolymer are included.

Typical examples of the not-crosslinked polymer containing the group of formula (ii) are ethylene polymer, ethylene-α-olefin copolymer (α-olefin contains 3 to 20 carbons), and ethylene-based copolymer prepared by hydrogenation of living anionic polymer. Specifically there are included varieties of polyethylenes (LLDPE, HDPE, ultrahigh molecular weight PE, and the like), EP, EPR, EBM, ethylene-octene copolymer, SEBS, HSBR, SEPS, SEEPS, SEBC, CEBC, ethylene-(meth)acrylic acid ester copolymer, and ethylene-acrylic acid ester copolymer rubber. When the hydrogenation rate is low for SEBS, HSBR, SEPS, SEEPS, SEBC, and CEBC, they are classified as the not-crosslinked olefin polymers having unsaturated bond.

A typical example of the not-crosslinked olefin-based polymer containing the group of formula (iii) is the one prepared by polymerization or copolymerization of branched olefin. Examples of the not-crosslinked olefin-based polymer containing the group of formula (iii) are poly-α-olefin copolymer (the α-olefin has 4 to 20 carbons and has branch), propylene-ethylene-α-olefin copolymer (the α-olefin has 4 to 20 carbons and has branch), and polymethylpentene.

From the four kinds of the groups of the formulae (i), (ii), and (iii), and of the unsaturated bond, a not-crosslinked olefin-based polymer having a structure of combining two or more of these groups can be favorably used. There are many kinds of not-crosslinked olefin-based polymers having that structure, and they are commercially available.

Preferred crosslinking agent for the not-crosslinked olefin polymer containing the group of formula (i), (ii), or (iii) includes organic peroxide, and organic peroxide and organohydrogen polysiloxane. As of the groups of formulae (i), (ii), and (iii), the group of the formula (ii) shows high reactivity, and is specifically preferred.

The not-crosslinked olefin-based polymer containing the group of the formula (iv) includes: ethylene-(meth)acrylic acid ester copolymer; ethylene-vinylacetate copolymer; ethylene-acrylic acid ester; ethylene-acrylic acid alkylester binary copolymer rubber; and ethylene-acrylic acid alkylester-vinylacetate ternary copolymer rubber. Preferred crosslinking agent for the not-crosslinked olefin polymer containing the group of the formula (iv) includes organohydrogen polysiloxane and platinum-based catalyst, and organic peroxide and organohydrogen polysiloxane.

Preferred silicone compound used as the raw material of the sliding material 1 includes silicone oil or silicone gum (rubber), and silicone-based copolymer. Examples of silicone oil or silicone gum (rubber) are: dimethyl silicone; diphenyl silicone; methylphenyl silicone; those silicones having 5% by mole or less of vinyl group; hydrogen polysiloxane; and modified silicone oil such as alkyl-modified one, higher fatty acid ester-modified one, fluorine-modified one, polyether-modified one, amino-modified one, alcohol-modified one, epoxy-modified one, and carboxy-modified one. Specifically preferred ones are dimethyl polysiloxane containing less than 1% by mole of vinyl group and having chain structure having number average molecular weight from $10^2$ to $10^8$ (dimethyl silicone oil and gum), methyl hydrogen polysiloxane having chain structure, methyl hydrogen polysiloxane having alkylene group, and methylphenyl silicone oil and gum, in view of excellent sustainability of sliding performance and of excellent weatherability.

The above silicone-based copolymer is prepared by copolymerizing various silicone compounds described above in the section of silicone oil or silicone gum (rubber) with other resin. The silicone-based copolymer may use a commercially available copolymer or may be a separately-prepared reaction product. Examples of the silicone-based copolymer are silicone-acrylic copolymer "CHALINE" (trade name, manufactured by Nissin Chemical Industry Co., Ltd.), silicone-acrylic copolymer "X-22-8171" (trade name, manufactured by Shin-Etsu Chemical Co., Ltd.), and a part-crosslinked product of dimethyl vinyl polysiloxane containing 0 to 1% by mole of vinyl group with EPDM, SBS, SS containing 0 to 5% by weight of unsaturated group. Other examples of them are "X-22-2102" and "X-22-2147" which are the pellets prepared by forming these resins as master batch, (trade names, manufactured by Shin-Etch Chemical Co., Ltd.), "BY27-001S" (trade name, manufactured by Dow Corning Toray Co., Ltd.), and "BY27-201" which is the pellets prepared by part-graft polymerization with resin, (trade name, manufactured by Dow Corning Toray Co., Ltd.).

Preferred silicone compound used as the raw material of the sliding material 1 includes a silicone compound having 10 mPa·s or higher viscosity, selected from the group consisting of silicone oil, silicone gum, and silicone copolymer containing 40% by weight or more of silicone. With the use of that type of silicone compound, the slide durability is improved. In addition, eruption of silicone compound during molding and during use does not occur, and the appearance becomes better. The viscosity of above silicone oil is preferably in a range from 10 to $10^{11}$ mPa·s, and more preferably from $10^2$ to $10^7$ mPa·s. Silicone gum, silicone copolymer, or a reaction product of the silicone compound (the reaction product represents a partially-crosslinked product such as EPDM), may be in a state of gum, solid, or powder at normal temperature. For the case of solid or powder, the viscosity is determined after once the silicone compound is kneaded at a temperature of melting or gelling to bring the compound to a gummy fluid state. When the silicone compound is pellet dispersed in resin, the above viscosity is the viscosity of the silicone compound dispersed in the pellet. The silicone compound giving 10 mPa·s or higher viscosity normally induces molecular weight distribution during manufacturing. In a strict meaning, the entire components are not in a molecular structure of 10 mPa·s or higher viscosity but containing molecules of less than 10 mPa·s of viscosity (the zone of relatively small molecular weight), thus being adjusted to a viscosity of 10 mPa·s or more. Thus adjusted compound may be used as it is, or may be used after removing an arbitrary low molecular weight range. Alternatively, it is arbitrary to mix a commercially available silicone compound of higher than 10 mPa·s of viscosity and a commercially available silicone compound of less than 10 mPa·s of viscosity to prepare a silicone compound of 10 mPa·s or higher viscosity. Applicable silicone oil, silicone gum, and silicone copolymer having 10 mPa·s or higher viscosity include the one having converted molecular weight of about 100 to about 2000000 (preferably from 4000 to 1500000).

Optimization of the viscosity of silicone compound can further significantly improve the slide durability. Within a suitable range of viscosity, if the viscosity of silicone compound decreases, the size of domain of the crosslinked material likely increases. That is, the viscosity itself of the silicone compound presumably affects the dispersion mode of the silicone compound. If the viscosity of the silicone compound is at the same level, larger content of silicone compound likely increases the size of the domain of the crosslinked material. The size of the domain of the crosslinked material can also be adjusted by the degree of crosslinking or the degree of thickening.

The viscosity of silicone compound can be specified by the torque, as an index, determined by kneading the silicone compound in a plastomill. In concrete terms, the silicone compound is kneaded in the plastomill together with a crosslinked lump composed of an olefin-based polymer which is an olefin-based polymer containing ultrahigh molecular weight polyethylene, high density polyethylene, and styrene-butadiene-styrene, and in which a part of the styrene-butadiene-styrene and a part of the polyethylene form a crosslinked material by dynamic crosslinking extrusion, thus determining the torque during the kneading, and then deriving the viscosity of the silicone compound. When two or more silicone compounds are used, they are mixed together and are mixed with the crosslinked lump.

On evaluating the viscosity of the silicone compound using the above method, "Crosslinked lump 5" (the manufacturing method thereof is given in the example described later), is used as the crosslinked lump, for example. A mixture of the silicone compound with the crosslinked lump 5, at a ratio of 45 to 5 by mass, is kneaded in the plastomill while heating them to 180° C. The plastomill adopts 4C150-01 Model LABOPLASTOMILL (mixer: R60), manufactured by Toyo-Seiki Seisakusho, Ltd. The charge of the sum of the silicone compound and the crosslinked lump is 50 g. The torque is determined under kneading of the mixture at 10 rpm of rotor speed while heating the mixture to 180° C. Other detail procedure is given in the example described later. Although the use of the apparatus and of the "Crosslinked lump 5" is preferred in view of reproducibility, (when more than one silicone compound is used, addition of a small quantity of crosslinked lump improves the kneading and dispersion performance and improves the reproducibility), it is possible to apply other similar apparatus, crosslinked lump, and powder of filler and the like, which can provide substantially the same result or convertible measurement result.

When silicone compounds of a plurality of kinds are combined and used for the above kneading to evaluate the viscosity, the compounds contact with a small quantity of crosslinked lump, and under an influence of the viscosity and the slidability of each of them, the kneading proceeds in a state having varieties of properties. For instance, silicone compounds of a plurality of kinds may homogeneously mix to become gel or liquid, or may give slightly humidified powder state, or sol, gruel, or resembling pre-curing cement, dispersing powder in a low-viscosity silicone oil. The latter state often appears when a silicone copolymer containing 40% by weight or more of silicone is used, or a product of reaction with the silicone compound is used. If the mixture of pluralities of silicone compounds becomes powder or sol state, the observed torque is relatively low, and the charged crosslinked lump also stops at a state of collapse to powder of a visually identifiable size. The phenomenon is also the same in using sole silicone of low viscosity. When a silicone compound composed of single or pluralities thereof becomes gel state during kneading, the observed torque is relatively high. In that case, the kneaded material becomes gray or black, and the collapse of the crosslinked lump reaches non-visible level. According to a finding of the inventors of the present invention, the observed torque under the above conditions is preferably in a range from 0.01 to 5 Nm, and more preferably from 0.01 to 4 Nm, independent of the difference in the state. The preferred range suggests that the viscosity of silicone compound affects the domain size of the crosslinked material in the sliding material.

According to the present invention, the observed torque under the above conditions is preferably in a range from 0.01 to 5 Nm, and more preferably from 0.1 to 1.4 Nm. If the torque is not in the range from 0.01 to 5 Nm, Squeaking Noise likely occurs caused by long term repeated slidings accompanied with the contact with water and slurry water. If the torque becomes less than 0.01 Nm, maintaining good appearance likely fails. The silicone compound giving that range of torque can be prepared from, for example, a single silicone compound having 10 mPa·s or higher viscosity or by combining pluralities of silicone compounds having 10 mPa·s or higher viscosity, which silicone compound is selected from the group consisting of silicone oil, silicone gum, and silicone copolymer containing 40% by weight or more of silicone.

The sliding material 1 can contain various additive components to other than the olefin-based copolymer and the silicone compound which are the essential components. That kind of additive includes: reinforcing agent such as pigment, silica and carbon black; antioxidant; weatherability improving agent; thermoplastic resin; elastomer; mildew proofing agent; antibacterial agent; fire retardant; softener such as paraffin-based one; sliding agent; and lubricant such as fluorine-based one. As of these additive components, these components are often mixed with silicone compound when the simultaneous kneading is applied to the silicone compound with inorganic filler such as carbon black, clay, talc, and silica, and when the simultaneous kneading is applied to the silicone compound with solid or liquid component (such as wax, sliding agent, and lubricant) which are difficult to be impregnated with olefin-based polymer. In that case, the observed torque under the above conditions is preferably in a range from 0.01 to 5 Nm when the measurement is done on a mixture of the silicone compound with a component to be simultaneously kneaded.

The content ratio of the olefin-based polymer, the silicone compound, and the above additive component which can be added at need to the sliding material 1 may be adequately adjusted so as the silicone compound to be able to be contained by a quantity from 5 to 35% by weight when the olefin-based polymer crosslinked material is formed so as the residual fraction of hot xylene reflux to become 33 to 75% by weight. For example, an adequate quantity of crosslinking agent (about 0% to about 20% by weight) is added to a not-crosslinked olefin-based polymer of about 95% to about 20% by weight (to 100% by weight of the sliding material), thus conducting the dynamic crosslinking using an extruder to form and disperse the crosslinked domains in the olefin-based polymer, and then adding the silicone compound by a quantity from 5 to 35% by weight, further kneading them and adjusting them to manufacture the sliding material 1.

The method for manufacturing the sliding material 1 is not limited as far as the following conditions are satisfied: a part of the olefin-based polymer forms the crosslinked material, the crosslinked material forms the domains, the domains are dispersed in the sliding material so as to prevent the uneven distribution of the silicone compound in the extrusion direction, the residual fraction of hot xylene reflux of the sliding material is in a range from 33 to 75% by weight based on the total weight of the sliding material, and the content of the silicone compound is in a range from 5 to 35% by weight based on the total weight of the sliding material.

A preferred method for manufacturing the sliding material 1 is: applying dynamic crosslinking to the above-described not-crosslinked olefin-based polymer to form pellets, which pellets are then kneaded together with a silicone compound and an additive component using a kneading machine such as an extruder (twin screw extruder or single screw extruder) and a kneader. Other applicable methods include: the one in which an olefin-based polymer crosslinked with a not-crosslinked olefin-based polymer (such as dynamic-crosslinked olefin-based polymer) is kneaded in an extruder (twin screw extruder or single screw extruder) or a kneading machine such as a kneader, thus pelletizing them, which pellets are then kneaded together with a silicone compound and an additive component using similar extruder or kneading machine; and the one in which a not-crosslinked olefin-based polymer, crosslinked olefin-based polymer (such as dynamic-crosslinked olefin-based polymer), a silicone compound and an additive component are kneaded together in an extruder (twin screw extruder or single screw extruder) or in a kneading machine such as a kneader. The state of the not-crosslinked olefin-based polymer being dynamically crosslinked is not specifically limited. The dynamic crosslinking is conducted, for example, using a not-crosslinked olefin-based polymer in a state of veil, pellet, irregular shape powder, powder in spherical shape or close to spherical shape, or fine powder at micron order.

Formation of crosslinked material so as the sliding material to give 33 to 75% by weight of the residual fraction of hot xylene reflux can prevent the uneven distribution of silicone compound in the extrusion direction while adding the silicone compound by a quantity from 5 to 35% by weight. When the mean particle diameter of the crosslinked material (domains) is regulated to a range from 0.5 to 150 μm on the cross section normal to the extrusion direction, the above uneven distribution prevention is further surely achieved. The residual fraction and the mean particle diameter can be controlled as above by adjusting the kind and the quantity of applied olefin-based polymer and of crosslinking agent.

To let a part of the olefin-based polymer in the sliding material form the crosslinked material within the sliding material, treatment of electron beam or ultraviolet ray irradiation, heating, or the like is applied utilizing unsaturated portion, hydrocarbon portion, carbonyl group, hydroxyl group, amino group, or silanol group of olefin-based polymer, and using crosslinking agent such as organic peroxide, hydrosilylation agent (and hydrosilylation catalyst), phenol resin curing agent, sulfur, sulfur-containing compound, organic polyvalent amine, and metal oxide. Use of organic peroxide is specifically preferred. The organic peroxide is advantageous in view of being able to manufacture a high viscosity crosslinked material because the organic peroxide not only forms unsaturated bond but also induces radical crosslinking caused by the withdrawal of hydrogen from the group of above formula (i), (ii), or (iii). On forming the crosslinked material using the organic peroxide, it is preferable to use also an organosiloxane containing hydrosilyl group (Si—H), (hydrosilylation agent). By the use of the organosiloxane containing hydrosilyl group, the crosslinking efficiency is improved, and the anti-aging performance in the process such as dynamic crosslinking accompanied with heat treatment is improved. In other words, what is called the "resin burn" is prevented.

Preferred organic peroxide includes peroxy ketal, dialkyl peroxide, peroxy ester, diacyl peroxide, and peroxy dicarbonate.

Examples of the preferred organic peroxide are 1,1-di(t-hexylperoxy)cyclohexane, 1,1-di(t-hexylperoxy)3,3,5-trimethylcyclohexane, 1,1-di(t-butylperoxy)cyclohexane, n-butyl-4,4-di(t-butylperoxy)valerate, dicumylperoxide, 2,5-dimethyl-2,5-di(t-butylperoxy)hexane, di(2-t-butylperoxyisopropyl)benzene, t-butylcumylperoxide, di-t-hexylperoxide, di-t-butylperoxide, 2,5-dimethyl-2,5-di(t-butylperoxy)hexane-3,2,5-dimethyl-2,5-di(benzoylperoxy)

hexane, t-hexylperoxybenzoate, t-butylperoxy-3-methylbenzoate, diisopropylperoxydicarbonate, di(4-t-butylcyclohexyl)peroxydicarbonate, and 1,6-bis(t-butylperoxycarbonyloxy)hexane.

Examples of the hydrosilylation agent are a hydrogenated silicon compound such as methylhydrogen polysiloxane and methylhydrogen alkylmethyl polysiloxane. Examples of the hydrosilylation catalyst are platinum-containing catalysts such as hexachloro platinic acid, platinum chloride, platinum oxide, and platinum complex.

Examples of the phenol resin curing agent are halogenated phenol resins such as alkylphenol formadhehyde resin, methyloled alkylphenol resin, and brominated alkylphenol resin. Non-halogenated phenol resin is normally used with a halogen-donor such as stannic chloride as the catalyst, and with a halogenated hydrogen-removing agent such as zinc oxide. For the halogenated phenol resin, it is used with, if necessary, halogenated hydrogen-removing agent.

By molding the sliding material 1 described above, the sliding member is obtainable, which sliding member then provides the weather strip.

Figure 5:
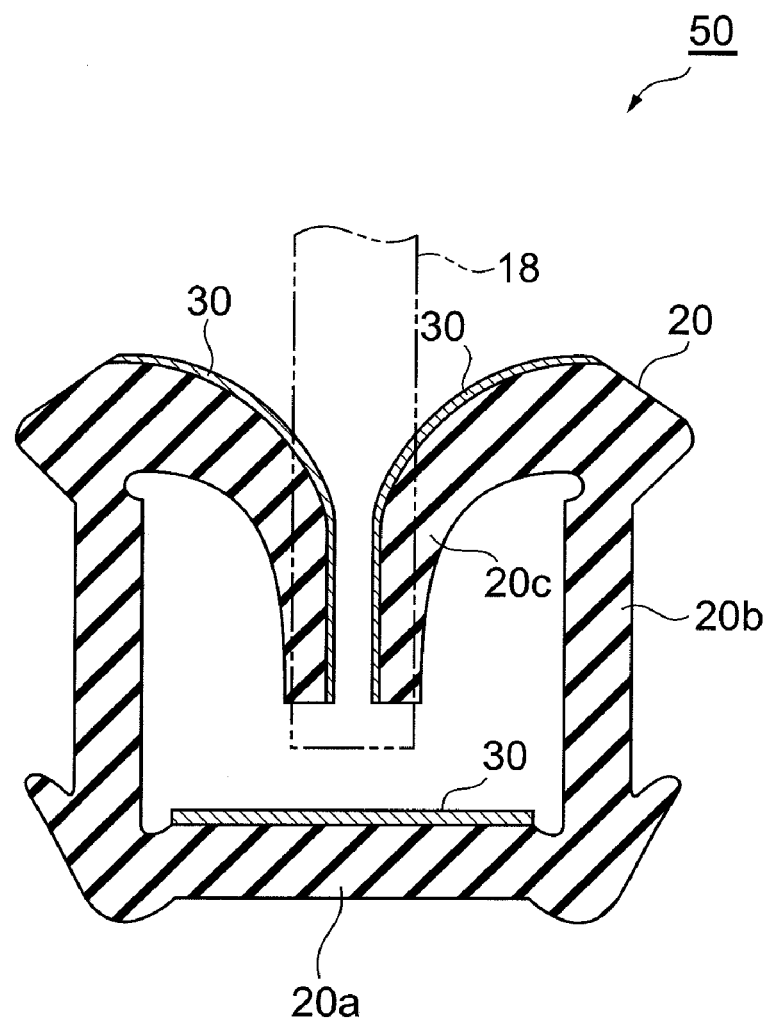
FIG. 5 is a schematic cross sectional drawing of a weather strip according to the first embodiment.

FIG. 5 is a schematic cross sectional drawing of the weather strip according to the first embodiment. The weather strip 50 according to the first embodiment, given in FIG. 5, is composed of a weather strip body part 20 and a sliding member 30 (made of above-described sliding material 1). The weather strip body part 20 is composed of a bottom part 20a, both side wall parts 20b, and a lip part 20c extending inward from the tip of both side wall parts 20b. The sliding members 30 are formed so as to cover the slide-contacting part of the lip part 20c slide-contacting with a window glass 18, and the surface of the bottom part 20a slide-contacting with outer peripheral edge face of the window glass 10, on the slide-contacting part and the bottom part 20a.

Figure 6:
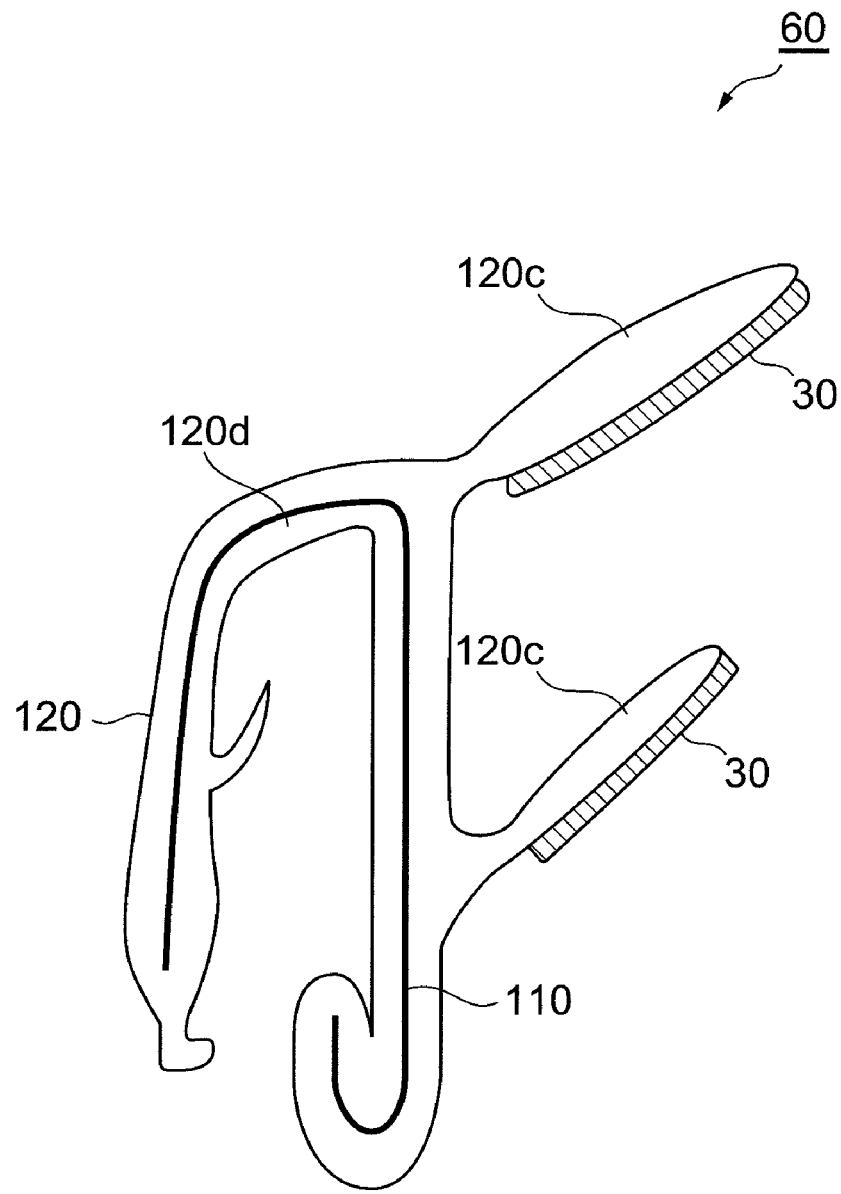
FIG. 6 is a schematic cross sectional drawing of a weather strip according to the second embodiment.
Figure 7:
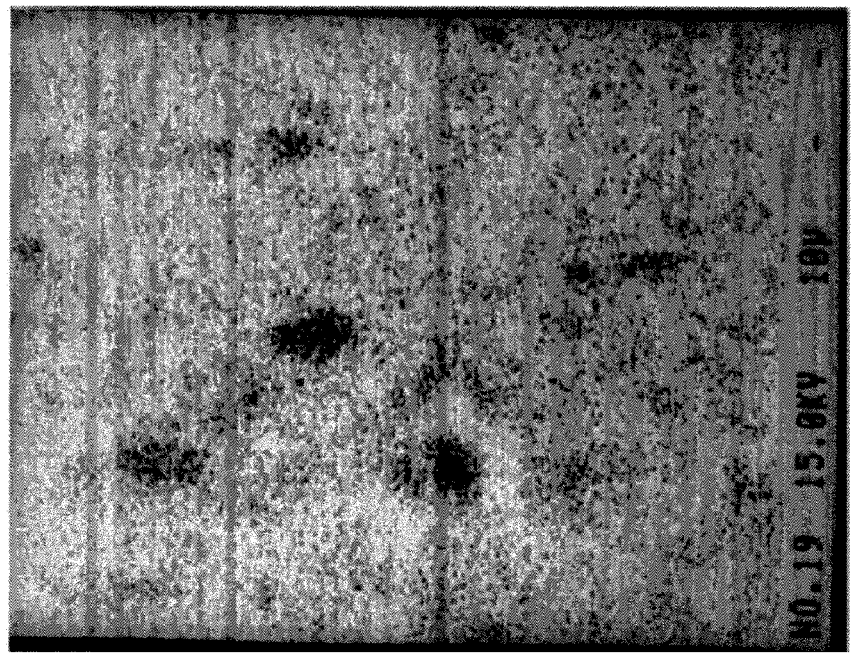
FIGS. 7(*a*) and 7(*b*) show X-ray images of Example 2.
Figure 7:
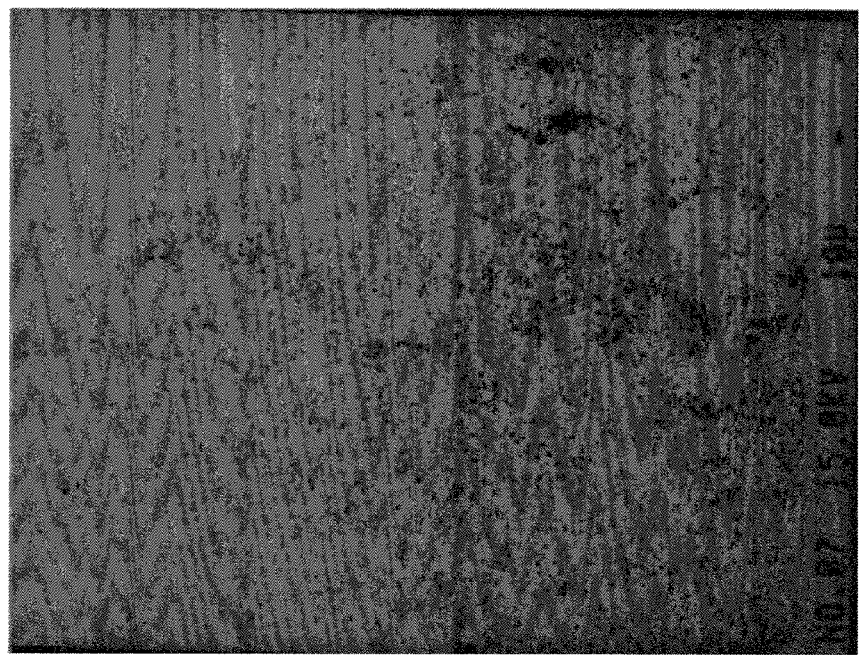

FIG. 6 is a schematic cross sectional drawing of the weather strip according to the second embodiment. The weather strip 60 according to the second embodiment, shown in FIG. 6, is composed of a weather strip body part 120 and the sliding member 30 (made of the above-described sliding material 1). The weather strip body part 120 has a core material 110, and is composed of an attaching part 120d to attach to the vehicle, and a lip part 120c slide-contacting with the window glass. The sliding member 30 is formed on the lip part 120c so as to cover the slide-contacting part of the lip part 120c.

The weather strip according to the first embodiment or the second embodiment uses the sliding material of the present invention as the sliding member so that the molding failure does not occur, that the bleeding of silicone compound is decreased to a satisfactory level, that low sliding resistance is maintained for a long period, that the stable low sliding resistance is maintained even under various conditions such as dry state and wet state (including a state between them), and slurry water state, and that generation of Squeaking Noise is suppressed.

EXAMPLES

The present invention is described in more detail in the following based on Examples and Comparative Examples. The present invention, however, is not limited to the following examples.

(Investigation 1)
(1) Preparation of Crosslinked Lump

A kneaded mixture of an ultrahigh molecular weight polyethylene giving 3.5 million of weight average molecular weight (ultrahigh molecular weight PE), and a high density polyethylene (HDPE) was kneaded with a styrene-butadiene-styrene rubber (SBS) in a twin screw extruder to prepare pellets. Onto thus prepared pellets, an organic peroxide master batch was scattered, and the mixture was fed to the twin screw extruder, thus generating dynamic crosslinking to obtain a lump. The lump was crushed to allow it passing through a hole of 5 mm in diameter, thus obtained the crosslinked lumps 1, 2, 3, and 4, respectively. The composition of each lump is given in Table 1. Applying the above-described method, the "residual fraction of hot xylene reflux" was determined. The result showed that smaller quantity of organic peroxide gave smaller degree of crosslinking. It was found that smaller quantity of organic peroxide gave smaller particle diameter of domain when the crosslinked lump was kneaded with the "Kneading 1-A" which is described later.

TABLE 1

|  | Cross-linked lump 1 | Cross-linked lump 2 | Cross-linked lump 3 | Cross-linked lump 4 |
|---|---|---|---|---|
| Kneaded mixture of ultrahigh molecular weight PE with HDPE | 50 | 50 | 50 | 50 |
| SBS | 50 | 50 | 50 | 50 |
| Organic peroxide master batch | 2.0 | 1.5 | 1.0 | 0.4 |
| Total | 102 | 101.5 | 101 | 100.4 |
| Residual fraction % of hot xylene reflux | 72 | 68.5 | 60.5 | 44.9 |

(2) Preparation of Sliding Material

The mix of "Kneading 1-A" given in Table 2 and Table 37 respectively, was kneaded in a Banbury mixer, and the kneaded mixture was fed to an extruder to prepare pellets. Onto the pellets of "Kneading 1-A", the curing agent of "Kneading 1-B" was scattered, which prepared mixture was then fed to a twin screw extruder to conduct dynamic crosslinking, thus prepared TPV pellets. The TPV pellets were mixed with the material given in the "Kneading 2" other than silicone oil, which mixture was then fed to the twin screw extruder to knead them together. At an interim part of the twin screw extruder, silicone oil is charged using a metering pump to knead them together, thereby manufactured pellets of the sliding material. In Table 2 and Table 3, the chemical name, the product name, and the manufacturer in abbreviation are the following.

EPDM-1: Nodel IP4770 (trade name, DuPont Dow Elastomers LLC)
EPDM-2: PX-060 (trade name, Mitsui Chemicals, Inc.)
Reactor TPO: R110MP (trade name, Prime Polymer Co., Ltd.)
PP: Novatec MA3H (trade name, Japan Polychem Corporation)
Paraffin oil: PW-90 (trade name, Idemitsu Kosan Co., Ltd.)
Crosslinking assistant: A-DCP (trade name, Shin-Nakamura Chemical Co., Ltd.)
V-LLDPE: Engage8130 (trade name, DuPont Dow Elastomers LLC)
Silicone master pellet: main component: dimethylsilicone gum
Acrylic silicone: CHALINE (trade name, Nissin Chemical Industry Co., Ltd.)
Organic peroxide master batch: Main component: 2,5-dimethyl-2,5-di(t-butylperoxy)hexane
Silicone oil: 100 to 5000 mm$^2$/s (96.5 to 4875 mPa·s) dimethylsilicone oil
SiH: KF-99 (trade name, Shin-Etsu Chemical Co., Ltd.)
Pt-based catalyst master batch: Main component: chloroplatinic acid

TABLE 2

|  |  | Example 1 | Example 2 | Comparative Example 1 | Comparative Example 2 |
|---|---|---|---|---|---|
| Kneading 1-A | EPDM 1 | 48.8 | 42 | 34.1 | 34.1 |
|  | Reactor TPO | 7.5 | 7.2 | 5.1 | 5.1 |
|  | PP | 23.5 | 30.7 | 22.7 | 46.1 |
|  | Paraffin oil | 7.2 | 7.2 | 7.2 | 5.0 |
|  | Carbon black | 7.2 | 7.2 | 7.2 | 5.5 |
|  | Anti-aging agent | 0.7 | 0.7 | 0.7 | 0.5 |
| Kneading 1-B | Crosslinking assistant | 2.3 | 2.3 | 1.7 | 1.7 |
|  | Organic peroxide master batch | 2.7 | 2.7 | 1.9 | 1.9 |
| Kneading 2 | V-LLDPE | — | — | 19.4 | — |
|  | Subtotal | 100.0 | 100.0 | 100.0 | 100.0 |
|  | Silicone master pellet | 9.9 | 9.9 | 9.9 | 9.9 |
|  | Acrylic silicone | 2.5 | 2.5 | 2.5 | 2.5 |
|  | Silicone oil | 7.0 | 7.0 | 7.0 | 7.0 |
|  | Subtotal of silicone-based material | 19.5 | 19.4 | 19.5 | 19.5 |
|  | Grand total | 119.5 | 119.4 | 119.5 | 119.5 |
| Quantity of silicone compound |  | 13.8 | 13.7 | 13.8 | 13.8 |
| Content (%) of silicone compound in the sliding material |  | 11.5 | 11.5 | 11.5 | 11.5 |
| Residual fraction (%) of hot xylene reflux of the sliding material |  | 43.4 | 36.9 | 29.5 | 28.0 |

TABLE 3

|  |  | Example 3 | Example 4 | Example 5 | Example 6 | Example 7 | Example 8 | Comparative Example 3 | Comparative Example 4 |
|---|---|---|---|---|---|---|---|---|---|
| Kneading 1-A | EPDM 1 | — | — | — | — | 15.6 | — | — | 18.6 |
|  | EPDM 2 | 23.3 | 19.7 | 19.6 | 19.6 | — | 12.6 | 34.8 | — |
|  | Reactor TPO | — | — | — | — | 2.0 | 1.2 | — | 2.4 |
|  | PP | 37 | 31.4 | 24.0 | 24.0 | 19.6 | 15.0 | 55.4 | 24 |
|  | Paraffin oil | — | — | — | — | 2.0 | 2.0 | — | 2.4 |
|  | Carbon black | — | — | — | — | — | 2.7 | — | — |
|  | Silica | 1.5 | 1.3 | 1.3 | 1.3 | 0.1 | 0.1 | 2.3 | 0.2 |
|  | Anti-aging agent | 0.5 | 0.6 | 0.6 | 0.6 | 0.5 | 0.5 | 0.8 | 0.6 |
|  | SiH | 1.3 | 1.1 | 1.1 | 1.1 | — | — | 1.9 | — |
|  | Black pigment | 1.9 | 1.9 | 3.1 | 3.1 | 2.0 | 0.7 | 2.8 | 2.4 |
| Kneading 1-B | Crosslinking assistant | — | — | — | — | 0.7 | 0.6 | — | 0.4 |
|  | Organic peroxide master batch | — | — | — | — | 0.4 | 0.9 | — | 0.2 |
|  | Pt-based catalyst master batch | 1.3 | 1.2 | 1.1 | 1.1 | — | — | 1.9 | — |
| Kneading 2 | Crosslinked lump 1 | 33.2 | 42.3 | — | — | — | — | — | — |
|  | Crosslinked lump 2 | — | — | 48.8 | 48.8 | — | 63.2 | — | — |
|  | Crosslinked lump 3 | — | — | — | — | 56.5 | — | — | — |
|  | Crosslinked lump 4 | — | — | — | — | — | — | — | 48.5 |
|  | Light stabilizer | — | 0.5 | 0.4 | 0.4 | 0.6 | 0.5 | — | 0.3 |
|  | Subtotal | 100.0 | 100.0 | 100.0 | 100.0 | 100.0 | 100.0 | 100.0 | 100.0 |
|  | Silicone master pellet | 5 | 4.2 | 11.2 | 13.7 | 12.1 | 13.7 | — | 17 |
|  | Acrylic silicone | 15.2 | 12.9 | 3.7 | — | 6.1 | — | 30.2 | — |
|  | Silicone oil | 2.7 | 2.8 | 2.9 | 5.9 | 8.0 | 7.5 | — | 6 |
|  | Subtotal of silicone-based material | 22.9 | 19.9 | 17.8 | 19.6 | 26.2 | 21.2 | 30.2 | 23.0 |
|  | Grand total | 122.9 | 119.9 | 117.8 | 119.6 | 126.2 | 121.2 | 130.2 | 123.0 |
| Quantity of silicone compound |  | 15.8 | 13.9 | 11.1 | 12.8 | 18.3 | 14.4 | 21.1 | 14.5 |
| Content (%) of silicone compound in the sliding material |  | 12.9 | 11.6 | 9.4 | 10.7 | 14.5 | 11.8 | 16.2 | 11.8 |

TABLE 3-continued

|  | Example 3 | Example 4 | Example 5 | Example 6 | Example 7 | Example 8 | Comparative Example 3 | Comparative Example 4 |
|---|---|---|---|---|---|---|---|---|
| Residual fraction (%) of hot xylene reflux of the sliding material | 36.0 | 39.8 | 42.9 | 42.6 | 40.6 | 47.0 | 23.8 | 30.7 |

(3) Preparation of Sliding Member (Two-Layer Molding)

Next, two units of extruder were connected to a flat sheet shaped two-layer molding die. An olefin-based TPV material for forming the base was extruded from one of the extruders, while the sliding material for Examples and Comparative Examples, respectively, was extruded from another extruder to obtain the respective moldings. The thickness of the sliding member was adjusted to about 100 μm, and the thickness of the olefin-based TPV material was adjusted to 1 mm.

(4) Dispersed State of Silicone

The dispersed state of silicone in the respective sliding members (two-layer moldings) of Examples 2 to 7 and Comparative Examples 1 to 3 was observed by photographing the X-ray images of Si (silicon) using EPMA. First, the analytical face of the two-layer molding was cut with a razor to about 5 mm in width on the analytical face to prepare the sample. A conductive tape was adhered on an exclusive-use sample table (a cubic block of 10 mm in sides, made of brass), and the sample was adhered on the conductive tape. On periphery and side faces of the analytical face, Carbond-Tight was coated.

Using QUICKAUTO COATER SC-701AT (manufactured by Sanyu Electron Co., Ltd.), Au (gold) was applied onto the analytical face by about 100 Å of thickness by vacuum vapor deposition. The exclusive-use sample table was mounted on EPM-810 (EPMA manufactured by Shinadzu Corporation), and electron beam of 15 kV of applied voltage and 20 nA of sample current was irradiated, thus obtained X-ray images of SiKα.

Figure 8:
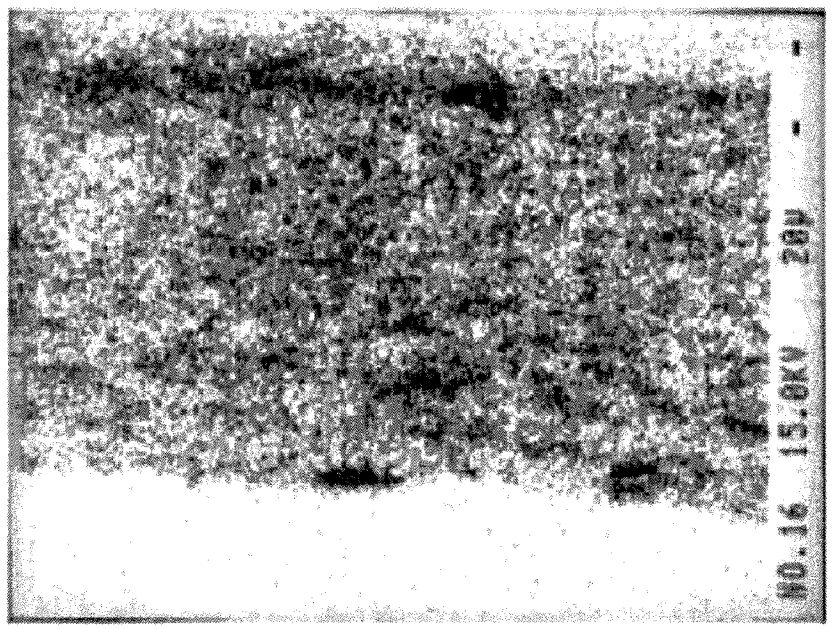
FIGS. 8(*a*) and 8(*b*) show X-ray images of Comparative Example 1.
Figure 8:
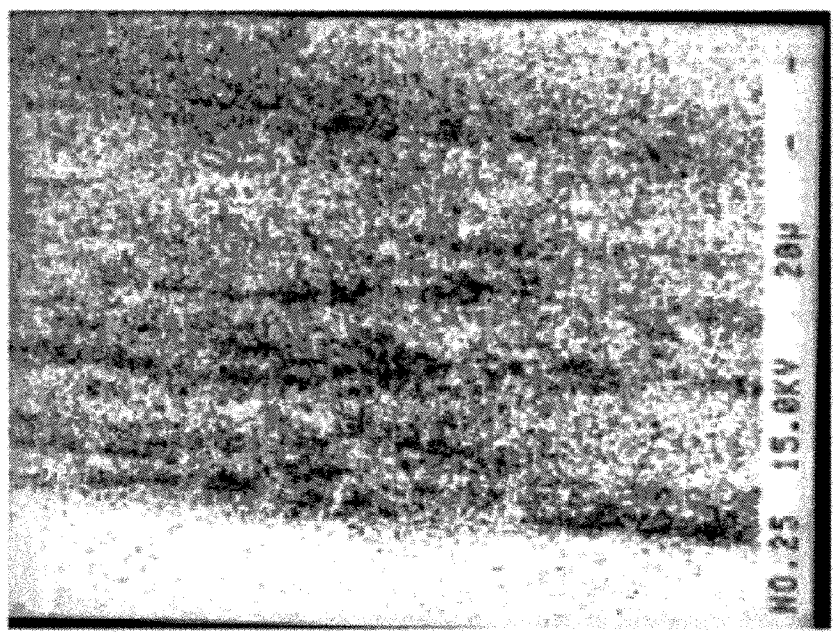
Figure 9:
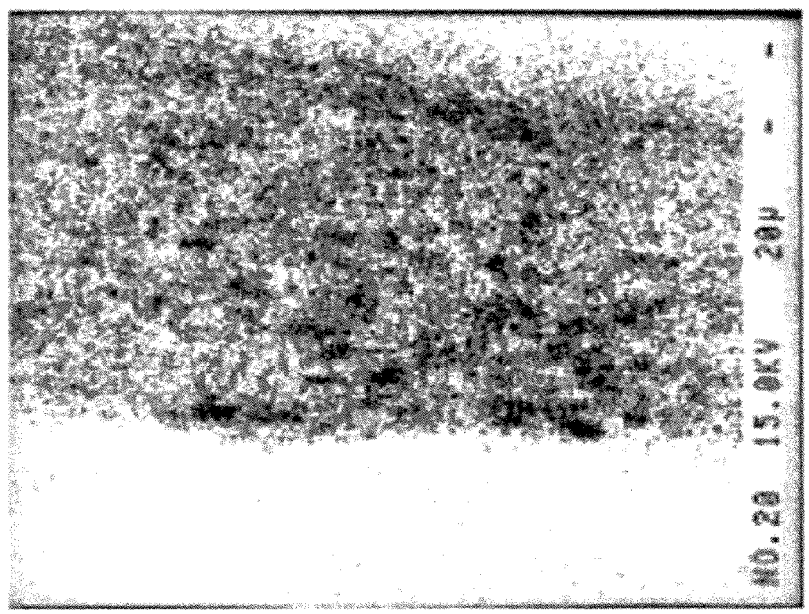
FIGS. 9(*a*) and 9(*b*) show X-ray images of Comparative Example 2.
Figure 9:
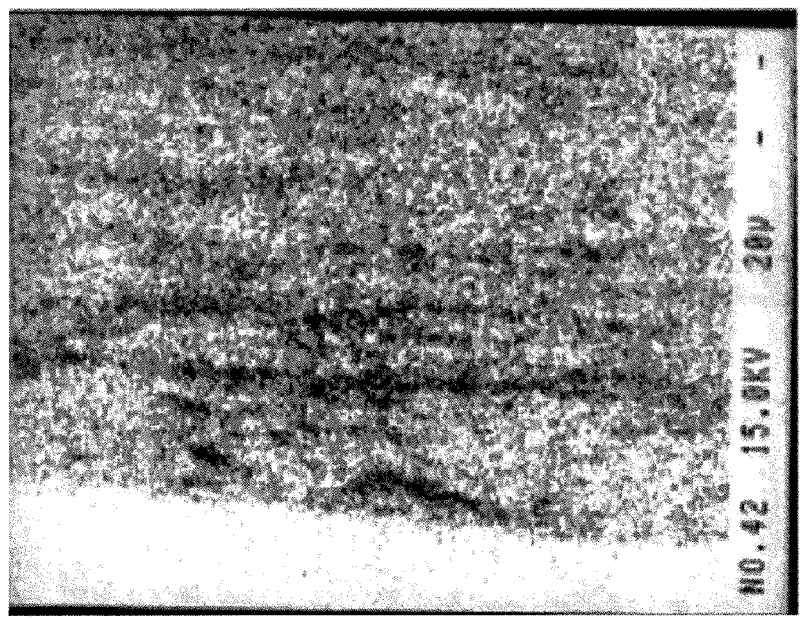
Figure 10:
FIGS. 10(*a*) and 10(*b*) show X-ray images of Example 3.
Figure 10:
Figure 11:
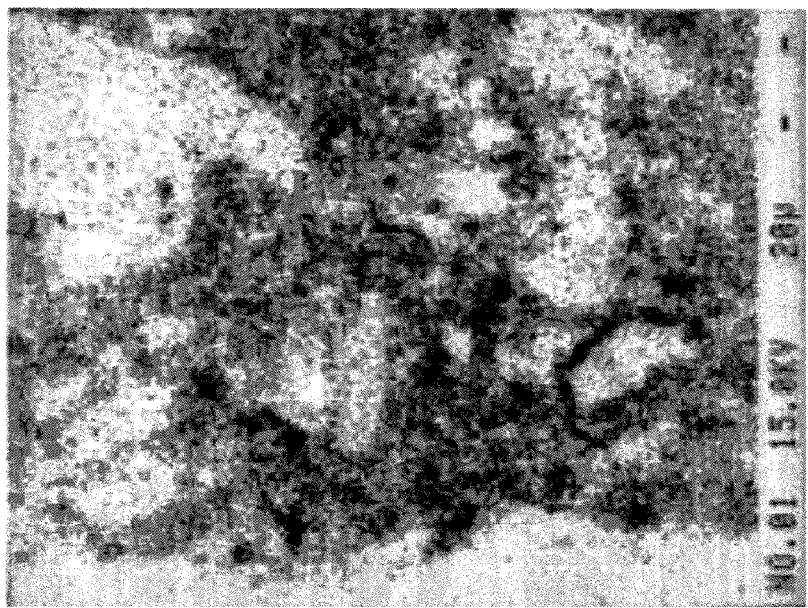
FIGS. 11(*a*) and 11(*b*) show X-ray images of Example 4.
Figure 11:
Figure 12:
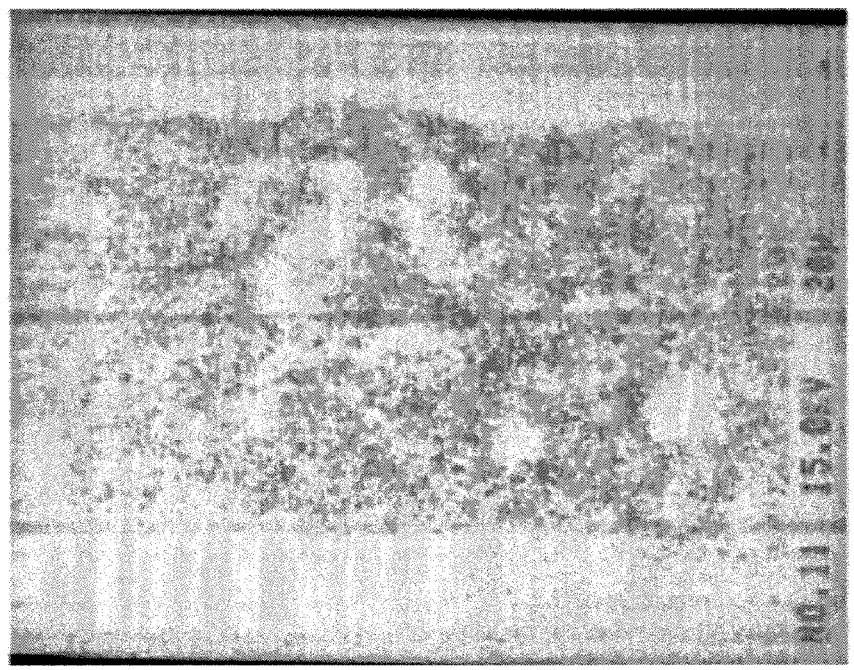
FIGS. 12(*a*) and 12(*b*) show X-ray images of Example 5.
Figure 12:
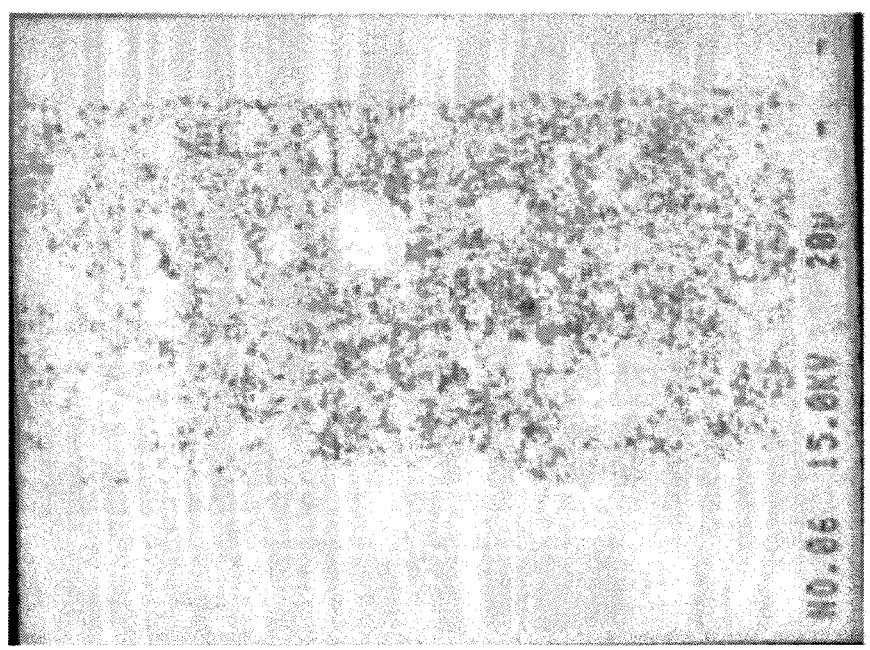
Figure 13:
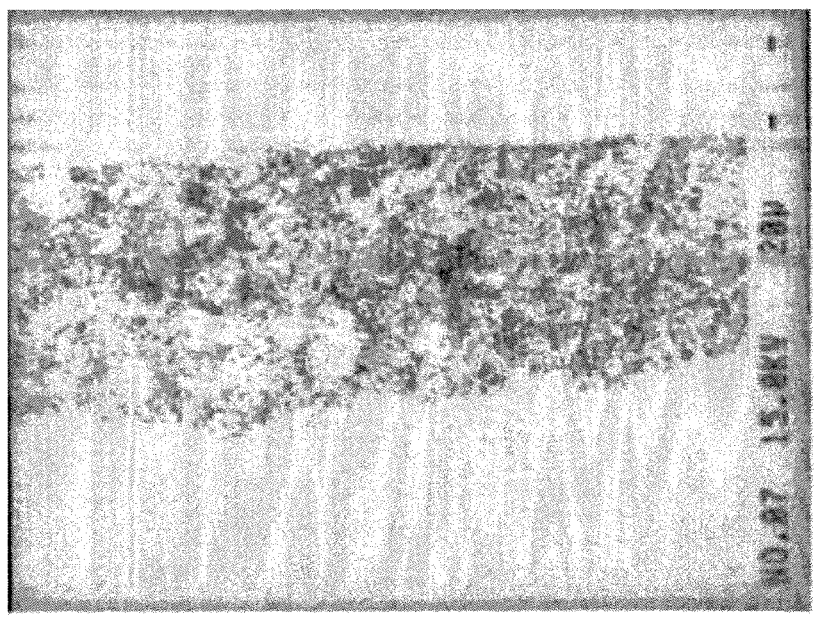
FIGS. 13(*a*) and 13(*b*) show X-ray images of Example 6.
Figure 13:
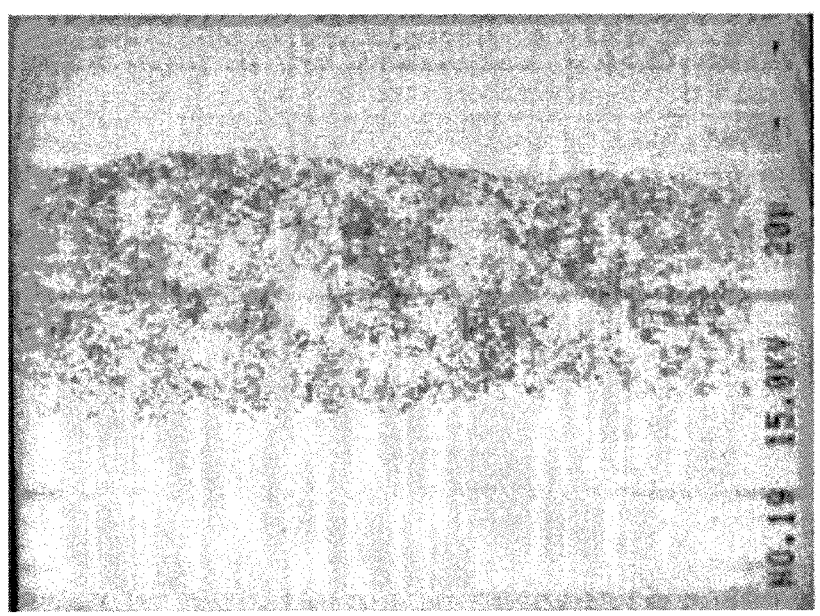
Figure 14:
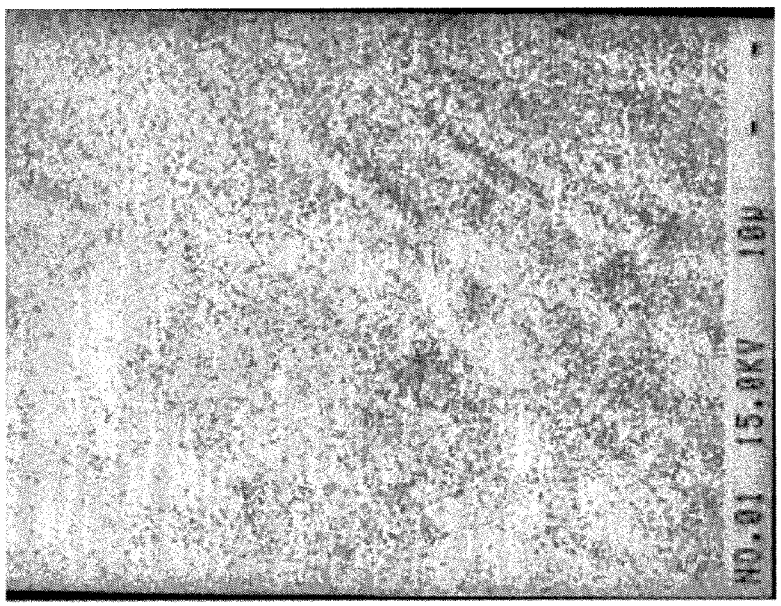
FIGS. 14(*a*) and 14(*b*) show X-ray images of Example 7.
Figure 14:
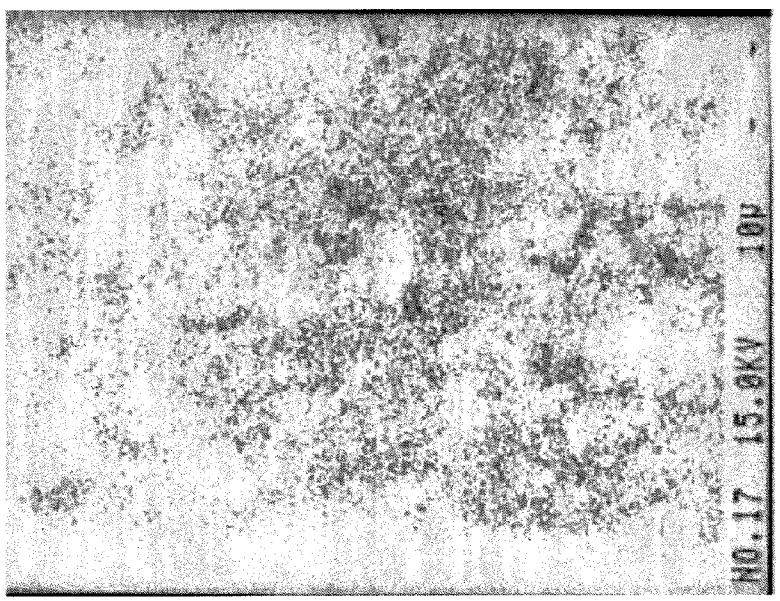
Figure 15:
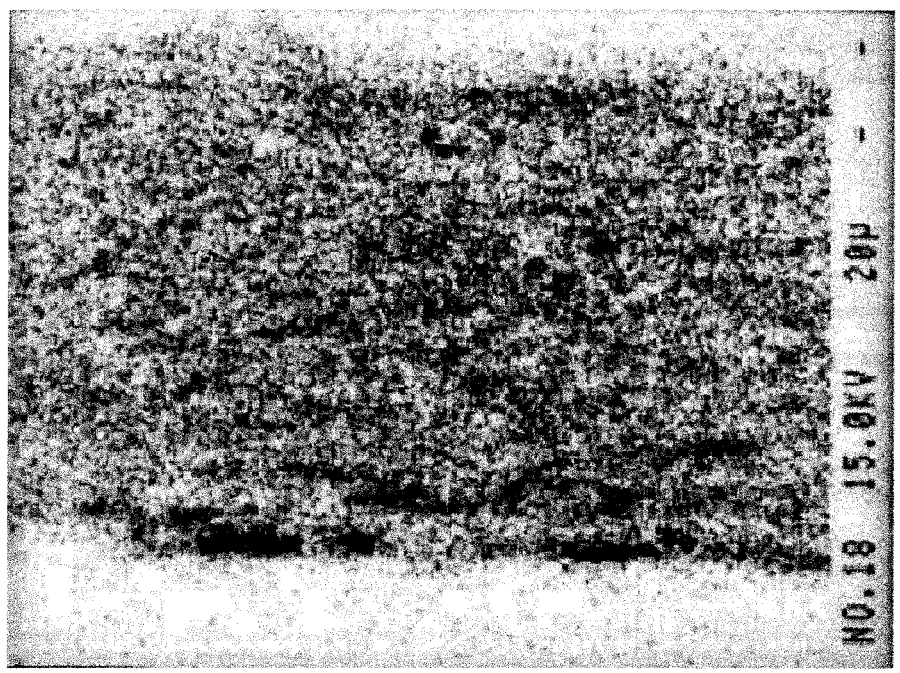
FIGS. 15(*a*) and 15(*b*) show X-ray images of Comparative Example 3.
Figure 15:
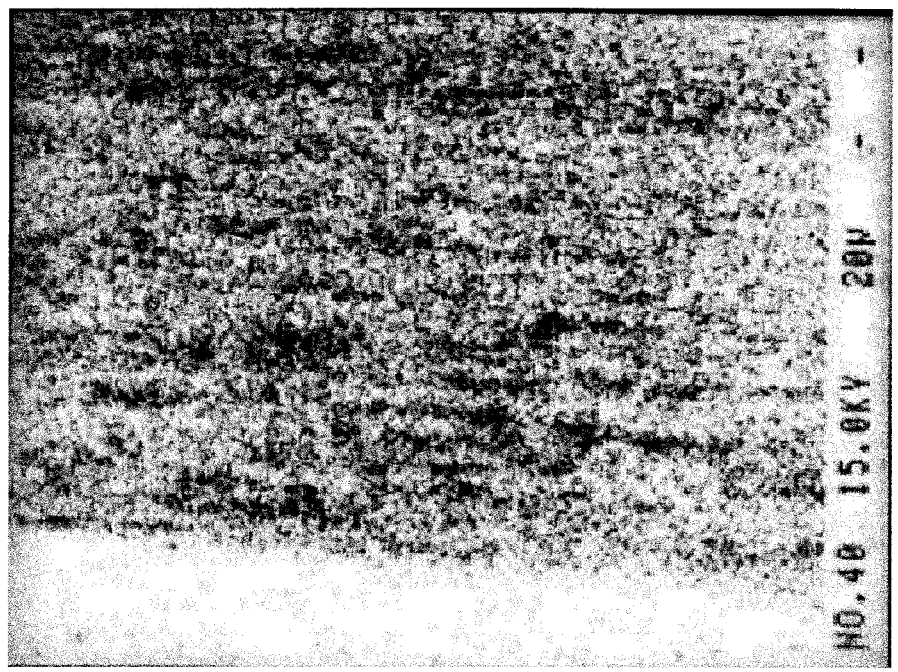

The X-ray images of Examples 2, 3, 4, 5, 6, and 7 are given in FIGS. 7, 10, 11, 12, 13, and 14, respectively, and the X-ray images of Comparative Examples 1, 2, and 3 are given in FIGS. 8, 9, and 15, respectively. As shown in these figures, the sliding members in Comparative Examples segregated to form layers of the silicone (expressed by black points) in the extrusion direction. In the sliding members in Examples, however, the crosslinked material of olefin-based polymer formed domains, and the silicone did not segregate in the extrusion direction and dispersed in the sliding member.

(5) Appearance

In the section "(3) Preparation of sliding member (two-layer molding)", the appearance of molded sliding members (Examples 1 to 8 and Comparative Examples 1 to 4) on extruding through a two-layer molding die was observed to confirm the intermittent appearance of silicone on the surface and to confirm the presence/absence of wavelike pattern of silicone, (pattern resembling ">>", in the extrusion direction).

(6) Moldability

The adhesion of silicone ("GUM") to the die part during extrusion through the two layer die, (Examples 1 to 8 and Comparative Examples 1 to 4), in the section "(3) Preparation of sliding member (two-layer molding)" was observed.

(7) Hardness

Hardness was determined for the sliding materials of Examples 1 to 8 and Comparative Examples 1 to 4 using Durometer D.

(8) Slidability

Figure 16:
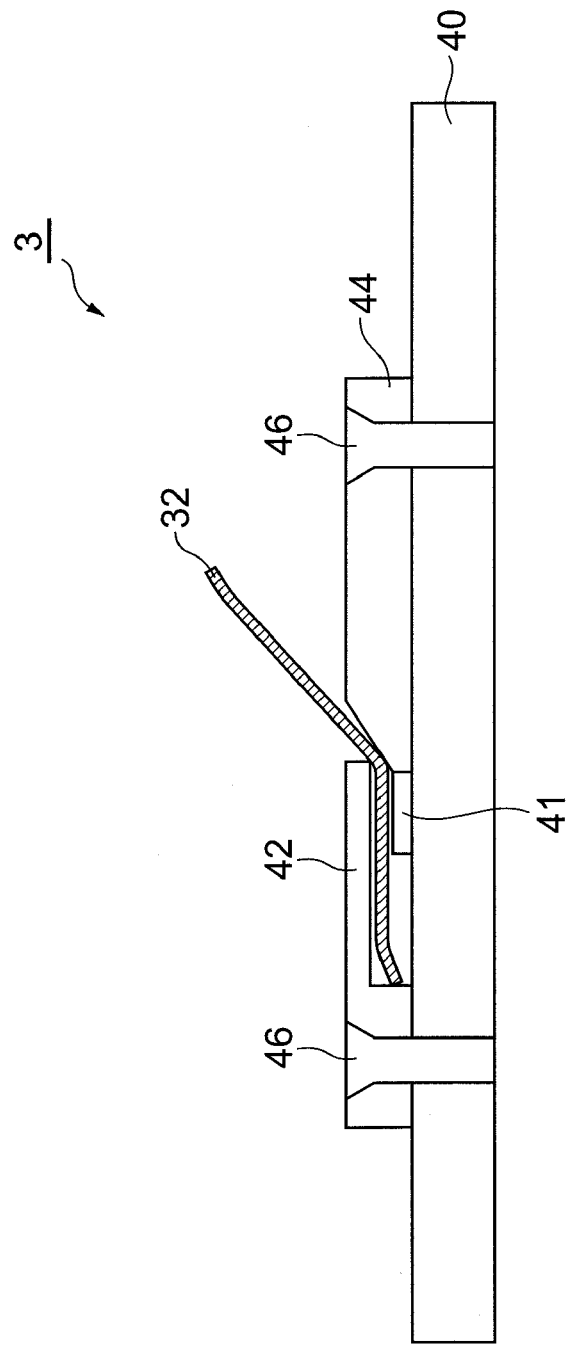
FIG. 16 shows a schematic cross sectional drawing of a jig to fix a two-layer molding.
Figure 17:
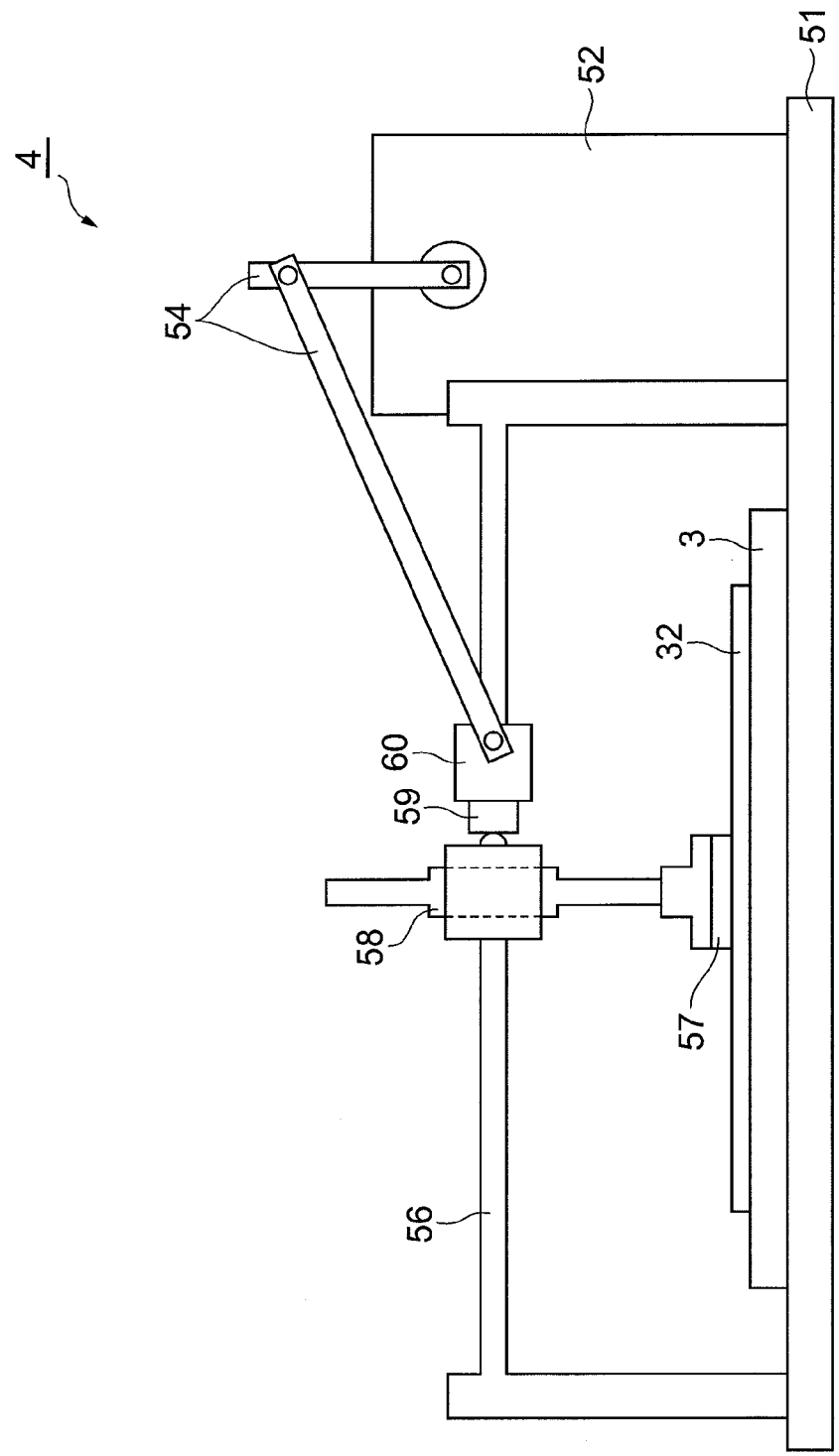
FIG. 17 shows a schematic cross sectional drawing of a slide tester.

The two-layer molding (sample) obtained by "(3) Preparation of sliding member (two-layer molding)" was fixed by a jig so as the two layer portion of coated part of the sliding member layer to become flexible. FIG. 16 shows a schematic cross sectional drawing of the jig to fix the two-layer molding. The jig 3 given in FIG. 16 is composed of a support plate 40, a first fixing member 42 for holding a two-layer molding 32, a second fixing member 44, a third fixing part 41 (a convex part integrated with the support plate 40), and bolts 46 for fixing the first fixing member 42 and the second fixing member 44 on the support plate 40. The jig was fixed to a slide tester, and 17 N of load was applied to the sample, and then the motor was driven to let the glass plate (50 mm in length) move horizontally (at an average rate of 150 mm/s), thus sliding the two-layer molding 32 (sample), and the slidability was evaluated. FIG. 17 shows a schematic cross sectional drawing of the slide tester used for evaluating the slidability. The slide tester 4 given in FIG. 17 is provided with a support plate 51 to fix the jig 3 for holding the two-layer molding 32 in longitudinal direction, a motor 52 mounted on the support plate 51, an arm 54 which converts the rotating motion of the motor 52 into the linear motion along two rods 56 in parallel each other, a glass-holding member 58 and a load cell fixing member 60 to conduct reciprocating linear motion via a bearing, a glass plate 57 sliding the two-layer molding 32, and a load cell 59 which detects the resistance of sliding.

Under the condition, there were executed total seven sets, repeating the set of following-described A, B, C, and D in this sequential order ("7 sets repeated sliding test"). During the test, there were determined the load in horizontal direction using a load cell, the presence/absence of Squeaking Noise, and the number of generations of Squeaking Noise by hearing. As of the loads observed by the load cell, the maximum load at the C set on the seventh set was adopted as the repeated sliding resistance, which is given in the Table. The set No. and the number of generations of Squeaking Noise were recorded.

A. Attaching slurry water, and giving 100 slidings (50 cycles).
B. Wiping off the slurry water on the sample using a gauze, and attaching water to give 100 slidings.
C. Wiping off the water on the sample using a gauze, and giving 400 slidings.
D. Attaching water to the sample, and giving 100 slidings, As of the samples which did not generate Squeaking Noise after 7 sets of sliding test, six samples were subjected to re-test to confirm the reproducibility and the durability. The re-test was given by 20 sets in principle. If, however, Squeaking Noise was generated by 3 sets or more during the re-test, the re-test was stopped at that moment.

(9) Removal of Water

The sample which completed 7 sets in the "(8) Slidability" was dismounted from the jig, and the surface water was wiped off. The sample was allowed to standing in a room of 23° C. and 50% RH for 30 minutes. Then, on the line of the sample slide-contacting the glass, seven drops of water having about 3 mm in diameter were placed using a syringe. After allowed to standing for 2 minutes, the sample was shaken, and the condition of water droplets was observed. The evaluation was given in accordance with the description given in Table 4.

TABLE 4

| | |
|---|---|
| AA | Water droplets are almost vanished from the sample, or are almost removed outside the slide-contact line. Even when water droplets are left in a slight quantity on the slide-contact line, their diameter is 1 mm or less, and they are vanished or evaporated within 1 minute. |
| A | Some of water droplets are left on the slide-contact line, while some of them are removed outside the line. The water droplets left on the line have a diameter of 2 mm or less, and they are vanished or evaporated within 2 minutes. |
| B | Some of water droplets are left on the slide-contact line, while some of them are removed outside the line. The water droplets left on the line have a diameter of smaller than the original diameter of 3 mm and of at or larger than 2 mm. The water droplets are vanished or evaporated within 5 minutes. |

TABLE 4-continued

| | |
|---|---|
| CC | Water droplets and trace of water droplets are left at a position of placing them on the slide-contact line. The diameter of the trace of water droplets is almost the same to that of the originally placed water droplets. Water droplets and trace of water droplets are not vanished or evaporated within 5 minutes. |
| C | Water droplets and trace of water droplets are left, without exception, at a position of placing them on the slide-contact line. The diameter of the trace of water droplets is larger than that of originally placed water droplets, and spreading from original area. The drying of the sample is worse than that in CC, and water penetrates into interior of the sample. |

The results of evaluations for (4) to (9) are given in Table 5 and Table 6.

TABLE 5

| | Example 1 | Example 2 | Comparative Example 1 | Comparative Example 2 |
|---|---|---|---|---|
| Silicone dispersion image (X-ray) (Extrusion direction) | — | Not-stratum | Stratum | Stratum |
| Appearance | Good | Applicable level | Silicone waving generated | Silicone waving generated |
| Moldability | Good | Good | Silicone adherence appeared | Silicone adherence appeared |
| Hardness (Durometer D) | 28 | 43 | 28 | 48 |
| Dry maximum sliding resistance at 7th set | 42.3 N | 27.8 N | 46.9 N (at 3rd set) | 38 N |
| 7 sets repeated sliding test Squeaking Noise generating Set No. (Numeral in parentheses is the number of slidings) | 5 (4), 6 (6), 7 (17) | Not generated | 1 (17), 2 (54) (stopped at 3rd set) | 5 (3), 6 (14), 7 (23) |
| 7 sets repeated sliding test Water removal after 7th set | B | B | C (at 3rd set) | CC |
| 20 sets repeated sliding test Dry maximum value at 20th set | — | — | — | — |
| 20 sets repeated sliding test Dry maximum value at 20th set | — | — | — | — |
| 20 sets repeated sliding test Squeaking Noise generating Set No. (Numeral in parentheses is the number of slidings) | — | — | — | — |
| Water removal after 20th set | — | — | — | — |

TABLE 6

| | Example 2 | Example 3 | Example 4 | Example 5 | Example 6 | Example 7 | Comparative Example 3 | Comparative Example 4 |
|---|---|---|---|---|---|---|---|---|
| Silicone dispersion image (X-ray) (Flow direction) | Not-stratum | Not-stratum | Finely dispersed, not-stratum | Finely dispersed, not-stratum | Most finely dispersed among examples, not-stratum | — | Stratum | — |
| Appearance | Good | Good | Good | Good | Good | Good | Silicone waving generated | Silicone waving generated |
| Moldability | Good | Good | Good | Good | Good | Good | Silicone adherence appeared | Silicone adherence appeared |
| Hardness (Durometer D) | 49 | 49 | 48 | 47 | 43 | 45 | 53 | 47 |
| Dry maximum sliding resistance at 7th set | 27.5 N | 23.8 N | 24.6 N | 23.6 N | 16.3 N | 24.4 N | 34 N | 28.9 N |
| 7 sets repeated sliding test: Squeaking Noise generating Set No. (Numeral in parentheses is the number of slidings) | Not generated | Not generated | Not generated | Not generated | Not generated | Not generated | 5 (4), 6 (33), 7 (13) | 6 (1), 7 (3) |

TABLE 6-continued

| | Example 2 | Example 3 | Example 4 | Example 5 | Example 6 | Example 7 | Comparative Example 3 | Comparative Example 4 |
|---|---|---|---|---|---|---|---|---|
| 7 sets repeated sliding test: Water removal after 7th set | A | A | AA | AA | AA | AA | CC | B |
| 20 sets repeated sliding test: Dry maximum value at 7th set | 26.8 N | 23.9 N | 25.3 N | 22.6 N | 15.6 N | — | — | 30.9 N |
| 20 sets repeated sliding test: Dry maximum value at 20th set | 30.6 N (at 11th set) | 28.7 N (at 15th set) | 25.0 N | 21 N | 14.9 N | — | — | 44.9 N (at 11th set) |
| 20 sets repeated sliding test: Squeaking Noise generating Set No. (Numeral in parentheses is the number of slidings) | 9 (6) 10 (16) 11 (7) | 10 (2) 11 (1) 15 (1) | 12 (3) | Not generated | Not generated | Not generated during 7sets | — | 7 (3), 8 (3), 9 (22), 10 (37) |
| Water removal after 20th set | B (at 11th set) | B (at 15th set) | A | A | AA | — | — | CC (at 11th set) |

(Investigation 2)

Further investigation was given on the influence of viscosity and the like of silicone compound. The content of the investigation is described in detail in the following.

(1) Preparation of Crosslinked Lump

A kneaded mixture of ultrahigh molecular weight polyethylene powder (Ultrahigh molecular weight PE2, trade name of XM-220, weight average molecular weight of 2 million, manufactured by Mitsui Chemicals Inc.) and high density polyethylene (HDPE, trade name of J-2200J, manufactured by Mitsui Chemicals Inc.) was mixed with a styrene-butadinene-styrene rubber (SBS, trade name of TR2250, manufactured by JSR Corporation), a black pigment (trade name of PEONY BLACK F-3090MM, manufactured by Dainippon Ink & Chemicals, Inc.), and a silicone oil (100 cSt of dynamic viscosity), to a composition (weight ratio) given in Table 7. The mixture was kneaded in a twin screw extruder to prepare pellets. An organic peroxide master batch was scattered on the pellets, which was then fed to the twin screw extruder to conduct dynamic crosslinking, thus obtained lump. The lump was pulverized to pass through a hole of 5 mm in diameter, thus prepared the crosslinked lump 5. The residual fraction of hot xylene reflux of the crosslinked lump 5 was determined similar to "Investigation 1".

TABLE 7

| | Crosslinked lump 5 |
|---|---|
| Ultrahigh molecular weight PE2 | 15.7 |
| HDPE | 39.4 |
| SBS | 39.4 |
| Black pigment | 3.2 |
| Silicone oil (dynamic viscosity: 100 cSt) | 2.4 |
| Organic peroxide master batch | 5.4 |
| Total | 105.5 |
| Residual fraction (%) of hot xylene reflux | 80.5 ± 3.5 |

The organic peroxide master batch was the one prepared by diluting 2,5-dimethyl-2,5-di(t-butylperoxy)hexane by silica and PP, containing 7 to 12% by weight of 2,5-dimethyl-2,5-di(t-butylperoxy)hexane.

When the crosslinked lump 5 was kneaded by a plastomill under the following-given condition, the torque at 4 minutes after beginning the rotor rotation was 7.45±0.15 Nm. The determination of viscosity of silicone compound, described later, used the crosslinked lump giving that torque. The temperature of the crosslinked lump at 4 minutes after beginning the rotor rotation was 184±3° C., giving a property to allow the lump to be collapsed to powder. When cooled, the crosslinked lump fused to become a state not easily be collapsed to powder.

The method for determining torque of crosslinked lump
Plastomill: 4C150-01 Model LABOPLASTOMILL, manufactured by Toyo-Seiki Seisakusho, Ltd.
Sample (crosslinked lump) quantity: 40 g
Mixer type: R60
Temperature: 180° C.
Rotational speed: 100 rpm (2) Preparation of Sliding Material For the Example 9, the mix of "Kneading 1-A" in Table 8 was kneaded in a Banbury mixer, which was then fed to an extruder to prepare pellets. Onto the pellets of "Kneading 1-A", the curing agent of "Kneading 1-B" was scattered, which prepared mixture was then fed to a twin screw extruder to conduct dynamic crosslinking, thus prepared TPV pellets. The TPV pellets was mixed with the material given in the "Kneading 2" other than silicone oil, which mixture was then fed to the twin screw extruder to knead them together. At an interim part of the twin screw extruder, silicone oil is charged using a metering pump to knead them together, thereby manufactured pellets of sliding material. For the Examples 10 to 15, a commercially available phenol resin crosslinked TPV was used instead of above TPV pellets, and the material given in "Kneading 2" including the above TPV was used to prepare the sliding material pellets. The chemical name, the product name, and the manufacturer in abbreviation appeared in Table 8 are the following. Other components are the same to those of Tables 2 and 3.

Phenol resin galvanized TPV: Sarlink 3145D (manufactured by DSM Inc.), content of inorganic filler: 6.1% by weight Silicone oil A: dynamic viscosity 30 to 3000 mm$^2$/s (cSt) (28.7 to 2910 mPa·s), dimethylsilicone Silicone oil B: dynamic viscosity 5000 to 30000 mm$^2$/s (cSt) (48.75 to 29280 mPa·s), dimethylsilicone Silicone master pellet: Dimethyl silicone gum is kneaded with PP, which is then pelletized. The content of dimethyl silicone gum is 50% by weight based on the total weight of the silicone master pellets. The torque of the dimethyl silicone gum determined by the method for quantifying the viscosity of silicone compound, described later, is in a range from 3.35 to 3.75 Nm (at 180±2° C.).

Acrylic silicone: A copolymer of 50 to 70% by weight of silicone composed mainly of dimethyl polysiloxane and 30 to 50% by weight of acrylic-based monomer. The torque of the acrylic silicone determined by the method for quantifying the viscosity of silicone compound, described later, is in a range from 4.00 to 4.40 Nm (at 18±2° C.).

about 5 mm in width on the analytical face to prepare the sample. A conductive tape was adhered on an exclusive-use sample table (a cubic block of 10 mm in sides, made of brass), and the sample was adhered on the conductive tape. At peripheral area and side faces of the analytical face, carbon-dotite was coated. Observation was given to the sliding member in the initial stage after manufactured, and to the sliding member after sliding test under a condition described below. Furthermore, also for the surface of sliding member (sliding face) after the sliding test, observation was given on the X-ray images in similar procedure.

Using QUICKAUTO COATER SC-701AT (manufactured by Sanyu Electron Co., Ltd.), Au (gold) was applied onto the

TABLE 8

| | | Example 9 | Example 10 | Example 11 | Example 12 | Example 13 | Example 14 | Example 15 |
|---|---|---|---|---|---|---|---|---|
| Kneading 1-A | EPDM2 | 17.5 | — | — | — | — | — | — |
| | PP | 22.2 | | | | | | |
| | Silica | 1.2 | | | | | | |
| | Anti-aging agent | 0.1 | | | | | | |
| | SiH | 1.0 | | | | | | |
| Kneading 1-B | Pt-based catalyst master batch | 1.0 | | | | | | |
| Kneading 2 | Phenol resin galvanized TPV | — | 45.4 | 45.3 | 45.3 | 38.5 | 45.3 | 44.1 |
| | PP | — | — | — | — | — | — | 2.7 |
| | Crosslinked lump 2 | 54.0 | — | — | — | — | — | — |
| | Crosslinked lump 5 | — | 52.2 | 52.1 | 52.1 | 58.9 | 52.1 | 50.7 |
| | Light stabilizer and anti-aging agent | 0.8 | 0.6 | 0.8 | 0.8 | 0.8 | 0.8 | 0.7 |
| | Black pigment | 2.5 | 1.8 | 1.8 | 1.8 | 1.8 | 1.8 | 1.8 |
| | Subtotal | 100.0 | 100.0 | 100.0 | 100.0 | 100.0 | 100.0 | 100.0 |
| | Silicone master pellet | 3.7 | 11.3 | 14.2 | 17.0 | 11.3 | 1.8 | 5.5 |
| | Acrylic silicone | 11.0 | 2.3 | 2.8 | 3.4 | 2.3 | 9.1 | 2.2 |
| | Silicone oil A | 3.0 | 4.5 | 5.7 | 6.8 | 4.5 | 7.4 | 4.4 |
| | Silicone oil B | | | | | | | 2.8 |
| | Subtotal of silicone-based materials | 17.7 | 18.1 | 22.7 | 27.2 | 18.1 | 18.3 | 14.9 |
| | Grand total | 117.7 | 118.1 | 122.7 | 127.2 | 118.1 | 118.3 | 112.1 |
| Quantity of silicone compound | | 15.9 | 12.5 | 15.6 | 18.7 | 12.5 | 17.4 | 12.2 |
| Content (%) of silicone compound in the sliding material | | 13.5 | 10.5 | 12.7 | 14.7 | 10.5 | 14.7 | 10.8 |
| Residual fraction (%) of hot xylene reflux of the sliding material | | 44.7 | 47.5 | 46.1 | 44.7 | 54.7 | 47.7 | 48.0 |

(3) Preparation of Sliding Member (Two-Layer Molding)

Next, two units of extruder were connected to a flat sheet shaped two-layer molding die. An olefin-based TPV material for forming the base was extruded from one of the extruders, while the sliding material of Examples 9 to 16, respectively, was extruded from another extruder to obtain the respective moldings. The thickness of the sliding member was adjusted to 170±70 μm, and the thickness of the olefin-based TPV material was adjusted to 2 mm.

(4) Dispersed State of Silicone Compound

The dispersed state of silicone compound in the respective sliding members (two-layer moldings) of Examples 9 to 16 was observed by photographing the X-ray images of Si element, C element, or O element using EPMA. First, the analytical face of the two-layer molding was cut with a razor to analytical face by about 100 Å of thickness by vacuum vapor deposition. Using the electron probe microanalyzer JXA-8100, manufactured by JEOL Ltd., the face analysis (color mapping) was given under the following-given condition.

Electron gun: Tungsten (initial stage) or $LaB_6$ (after water test and glass exchange test)
Acceleration voltage: 15 kV
Irradiation current: $1 \times 10^{-8}$ A
Pixel: 300×300
Pixel size: 1×1 μm
Observation time: 40 msec/1 pixel color mapping; Mapping (developing colors) was done by coloring sequentially from zones giving high concentration of each element to zones giving low concentration thereof. For Si element, zones were divided into the zones of the respective concentration levels of "over 50", "50 to 43", "43 to 37", "37 to 31", "31 to 25", "25 to 18", "18 to 12", "12 to 6", "6 to 0", and "below 0". Color development was allowed by allotting the respective colors to the respective zones. The zone where the concentration of Si element and of O element is high is the zone where the silicone compound distributes in a large quantity. Inversely, the zone where the C element concentration is low can be determined as the zone of distribution of silicone compound in a large quantity.

(5) Appearance, Moldability, and Hardness

Applying the same method to that of above "Investigation 1", the appearance, the moldability, and the hardness of sliding members of Examples 9 to 15 were evaluated.

(6) Slidability

For the sliding members in Examples 9 to 15, the slidability test repeating 20 sets of treatment was given under a similar condition to that of above "Investigation 1", (hereinafter referred to as the "Condition 1"). The test determined the load in the horizontal direction (sliding resistance) using a load cell, and also determined the presence/absence of Squeaking Noise and the number of generations of Squeaking Noise by hearing. In addition, the surface of sliding part (trace of sliding) before and after the test was observed by IR to determine the absorbance ratio of Si—$CH_3$ (near 1262 $cm^{-1}$) to C—H (near 1463 $cm^{-1}$), (hereinafter referred to as the "Si—$CH_3$ absorbance ratio"). When the Si—$CH_3$ absorbance ratio is high, the silicone compound (dimethyl polysiloxane) presumably exists on the surface in a large quantity. When the Si—$CH_3$ absorbance ratio is low, Squeaking Noise likely occurs.

Furthermore, as a severer test than the above slidability test, there was given a test which applied the treatments of a series of set of A through F described below in a sequential order of A, B, C, B, C, B, C, D, C, E, E, F, E, and C to the respective sliding members, (hereinafter referred to as the "Condition 2"), thus evaluated the slidability. For the one set of the series of treatments, the number of slidings was 60000.

Load: 30 N
Average sliding speed: 200 mm/sec
A. 20000 slidings in normal state (dry state).
B. 500 slidings attaching water of about 0.6 g to the sample. The action of 500 slidings is repeated ten times, or 5000 slidings as subtotal. During the repeated operation, wiping with gauze is not applied.
C. The action of 2000 slidings is given continuously while pouring water to the sample at a rate of about 1.8 g/min.
D. The action of 3000 slidings is given in normal state. After the operation of C, the water attached to the sample is not wiped off, and the sliding is given in the state of leaving the water on the sample.
E. The action of 3000 slidings is given in normal state after replacing the glass plate.
F. The action of 3000 slidings is given in normal state after replacing with a glass plate having curved surface.

(7) Evaluation of Viscosity of Silicone Compound

Dimethyl silicone gum, acrylic silicone, silicone oil A, and silicone oil B, which were in the silicone master pellets used in the respective examples, were mixed at the respective ratios of examples, thus prepared the respective silicone compounds which were the mixture of 45 g of total weight. The percentage of dimethyl silicone gum was calculated based on the content in the silicone master pellets.

The 45 g of thus prepared silicone compound and 5 g of the crosslinked lump 5 were charged to a plastomill. The torque under the operation of 10 rpm of rotational speed of the rotor at 180° C. was determined. The torque was adopted as the index of the viscosity of silicone compound. The condition of plastomill is given below.

Plastomill: 4C150-01 Model LABOPLASTOMILL (manufactured by Toyo-Seiki Seisakusho, Ltd.)

Quantity of sample: 50 g (silicone compound (45 g)+crosslinked lump 5 (5 g))
Mixer type: R60
Testing temperature: 180±2° C.
Testing procedure:
Sample of 50 g is charged to LABOPLASTOMILL regulated to 180° C.
The rotor of LABOPLASTOMILL is rotated while changing the rotational speed in an order of A, B, C, to D.
A. 150 rpm (1.5 min)
B. 100 rpm (1.5 min)
C. 50 rpm (1.5 min)
D. 10 rpm (1.5 min)

In above D, the average torque is determined after 1 minute and 20 seconds have passed. The procedure allows stable determination of torque.

FIGS. 18 to 28 show X-ray images on the cross sections of the respective sliding members after the sliding test in the initial stage or under the "Condition 2". FIGS. 29 to 32 show X-ray images on the surfaces of the respective sliding members (sliding faces) after the sliding test under the "Condition 2". The correlation with each Example for each figure is given below. In FIGS. 18 to 28, the X-ray image is positioned so as the lateral direction to become the extrusion direction. In FIGS. 18 to 24, (a), (b), (c), and (d) give the X-ray images in the same zone, giving (a) as the image of not applying mapping based on element concentration, (b) as the image of applying mapping based on Si element concentration, (c) as the image thereof based on C element concentration, and (d) as the image thereof on O element concentration. In each figure, the image is drawn so as higher element concentration to give thinner developed color.

Figure 18:
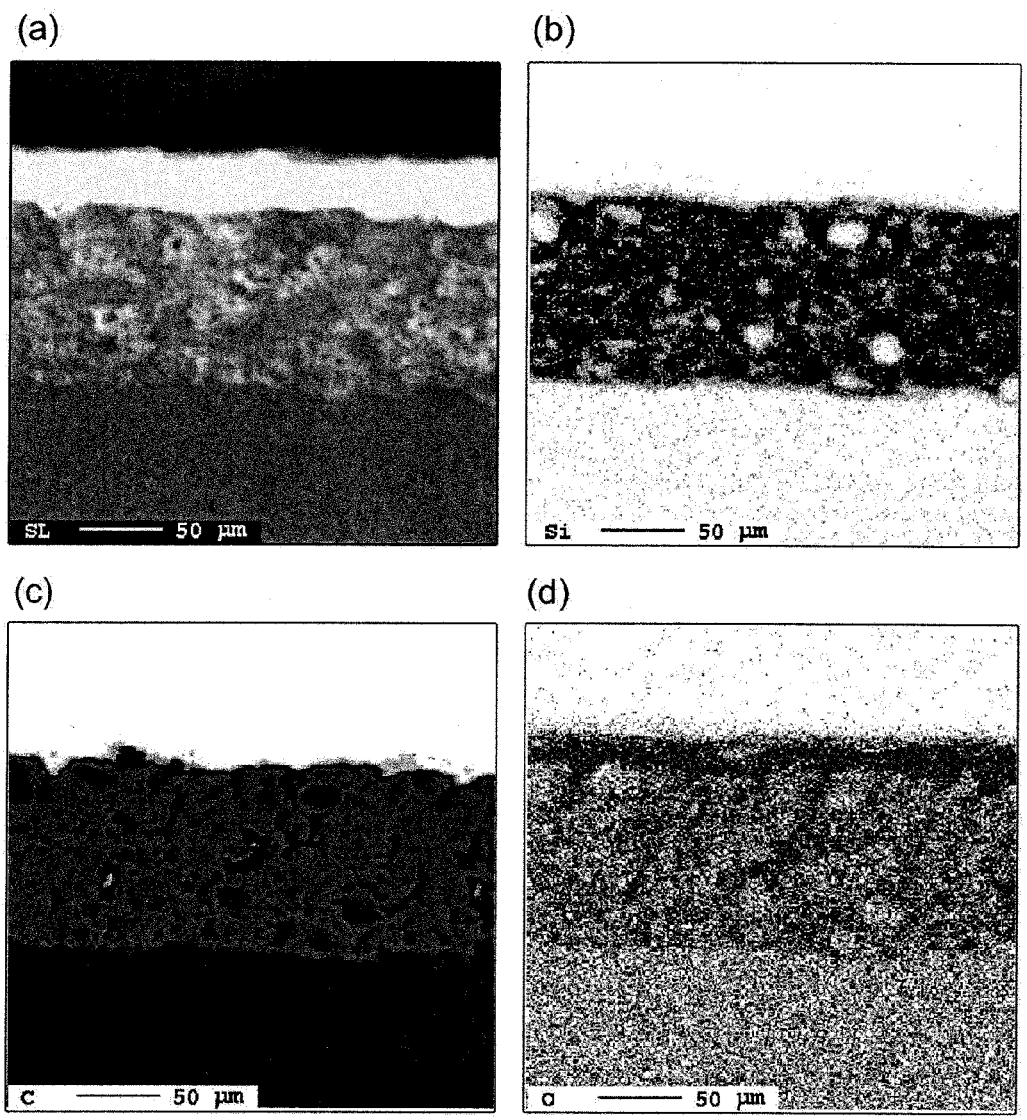
FIGS. 18(*a*) to 18(*d*) show X-ray images of Example 9.
Figure 19:
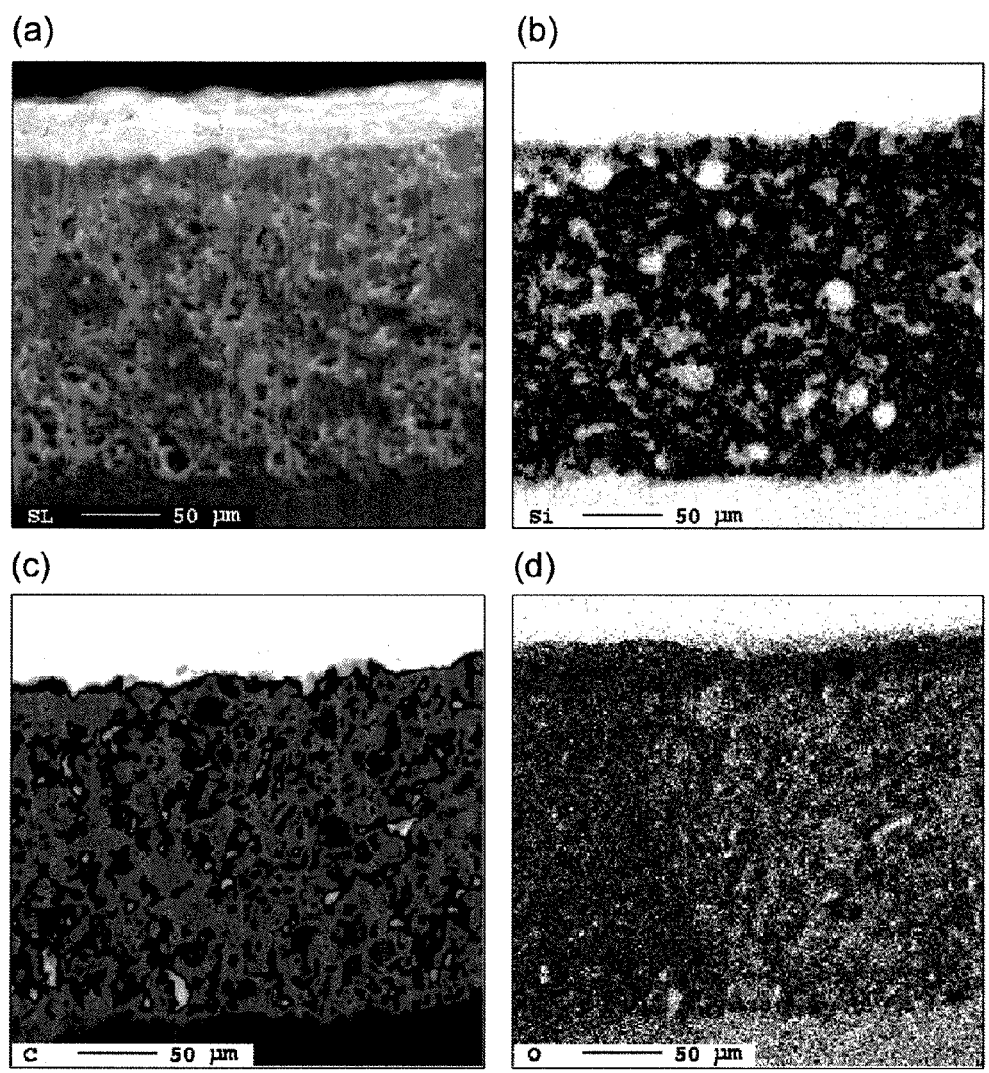
FIGS. 19(*a*) to 19(*d*) show X-ray images of Example 10.
Figure 20:
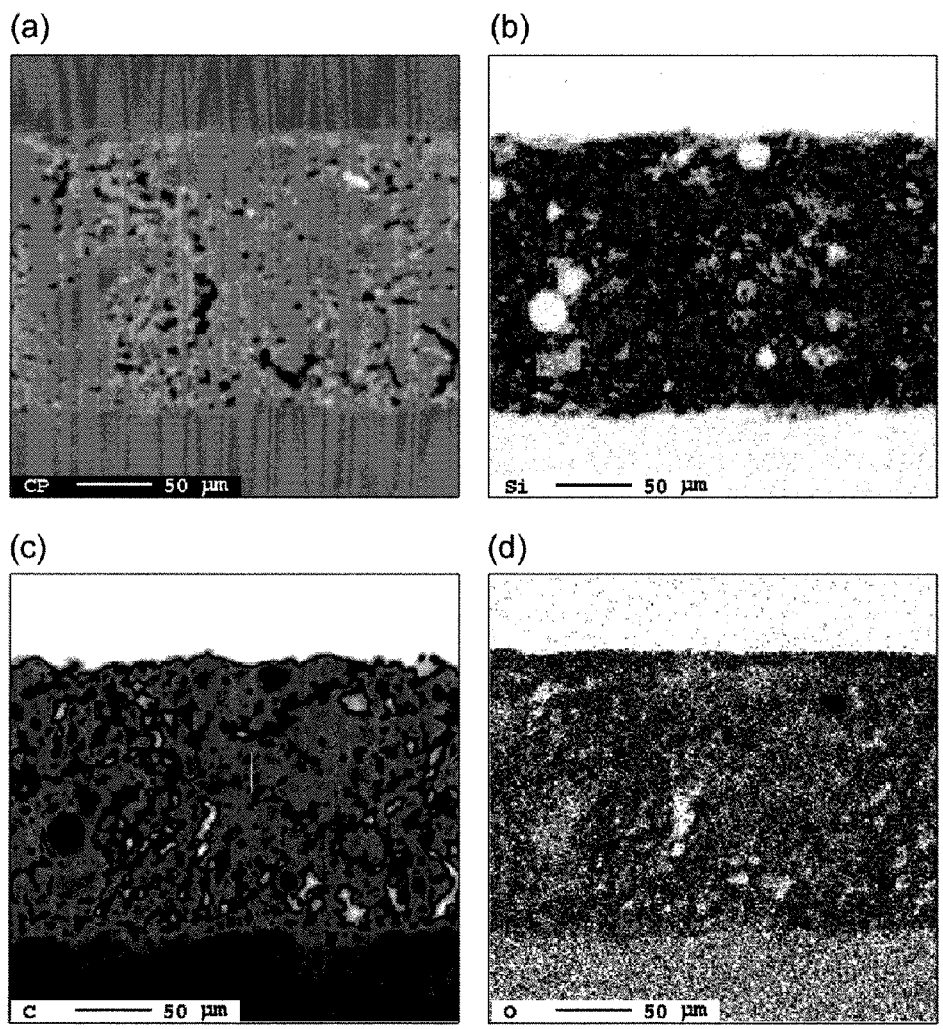
FIGS. 20(*a*) to 20(*d*) show X-ray images of Example 11.
Figure 21:
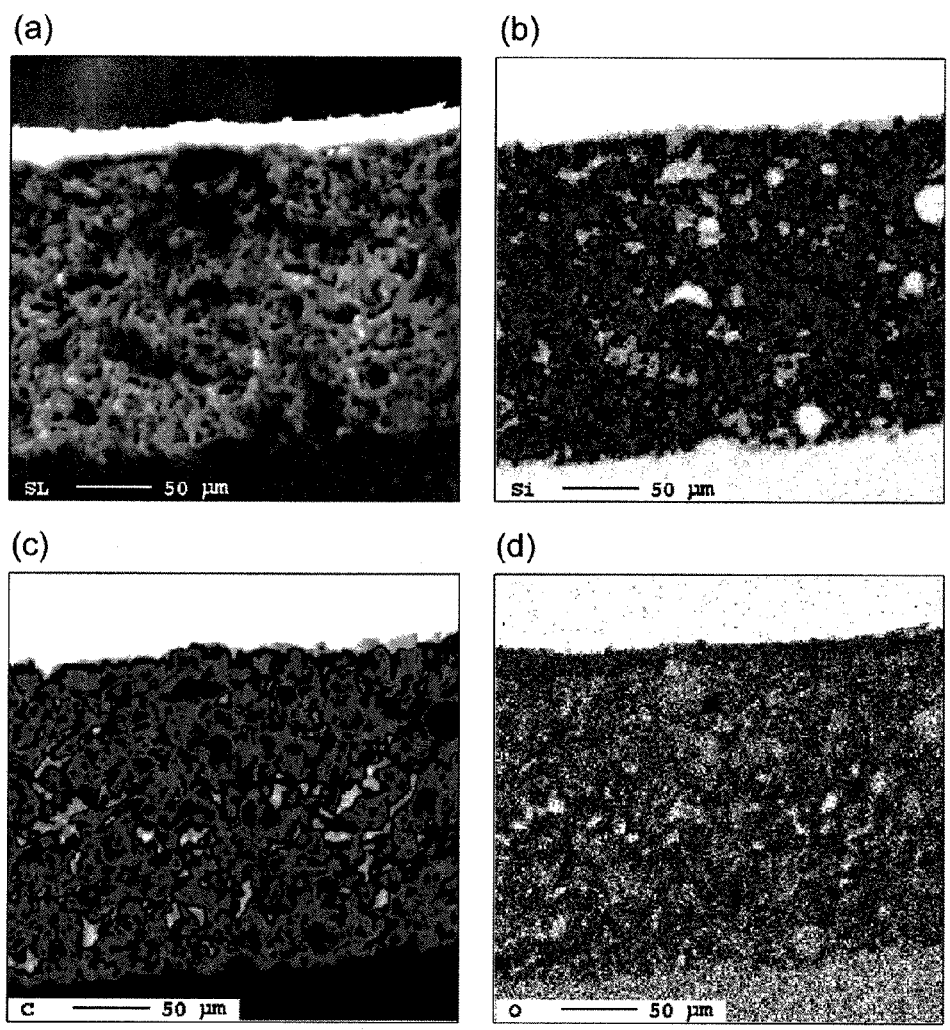
FIGS. 21(*a*) to 21(*d*) show X-ray images of Example 12.
Figure 22:
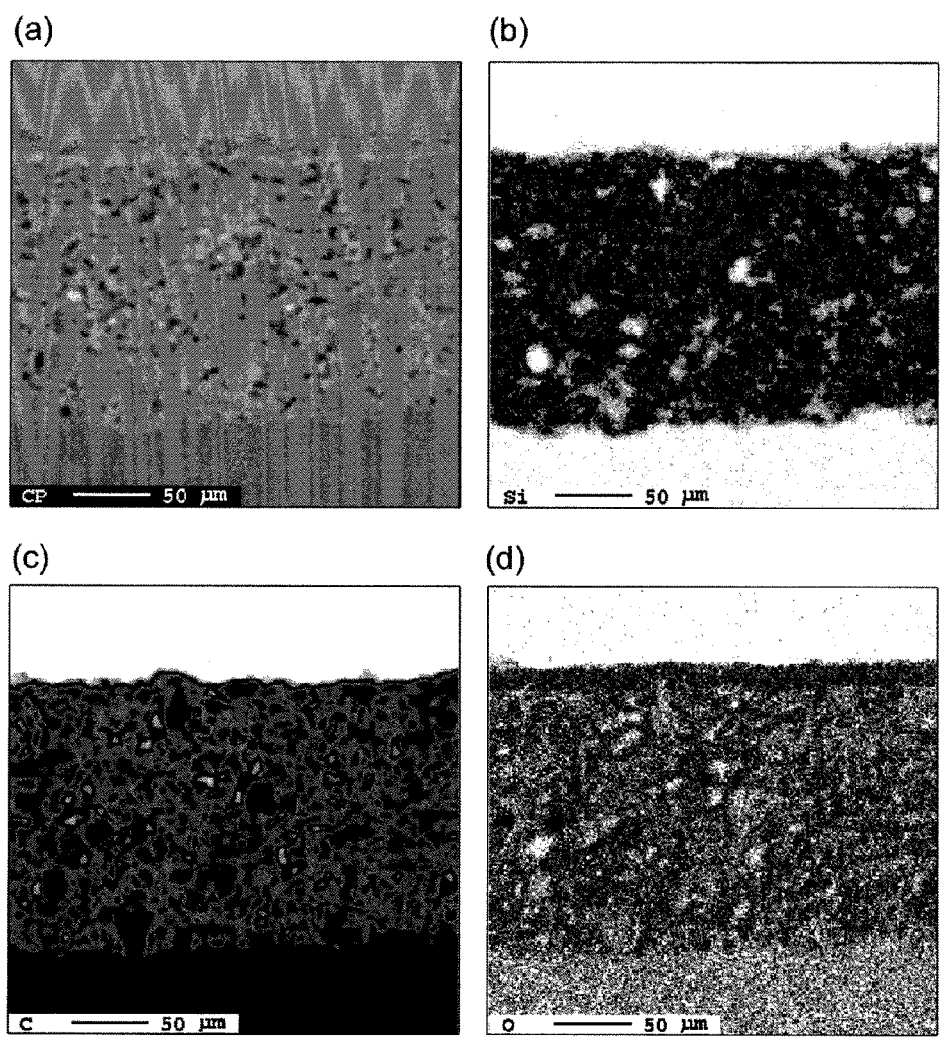
FIGS. 22(*a*) to 22(*d*) show X-ray images of Example 13.
Figure 23:
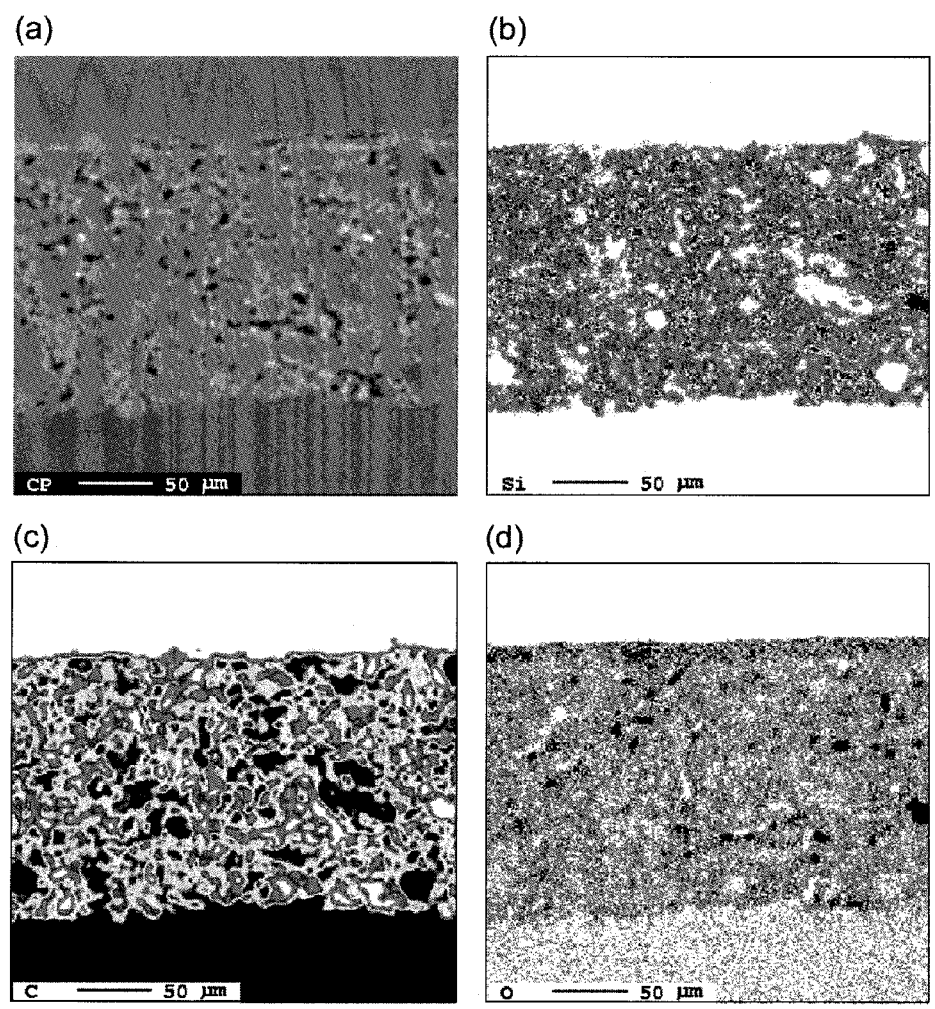
FIGS. 23(*a*) to 23(*d*) show X-ray images of Example 14.
Figure 24:
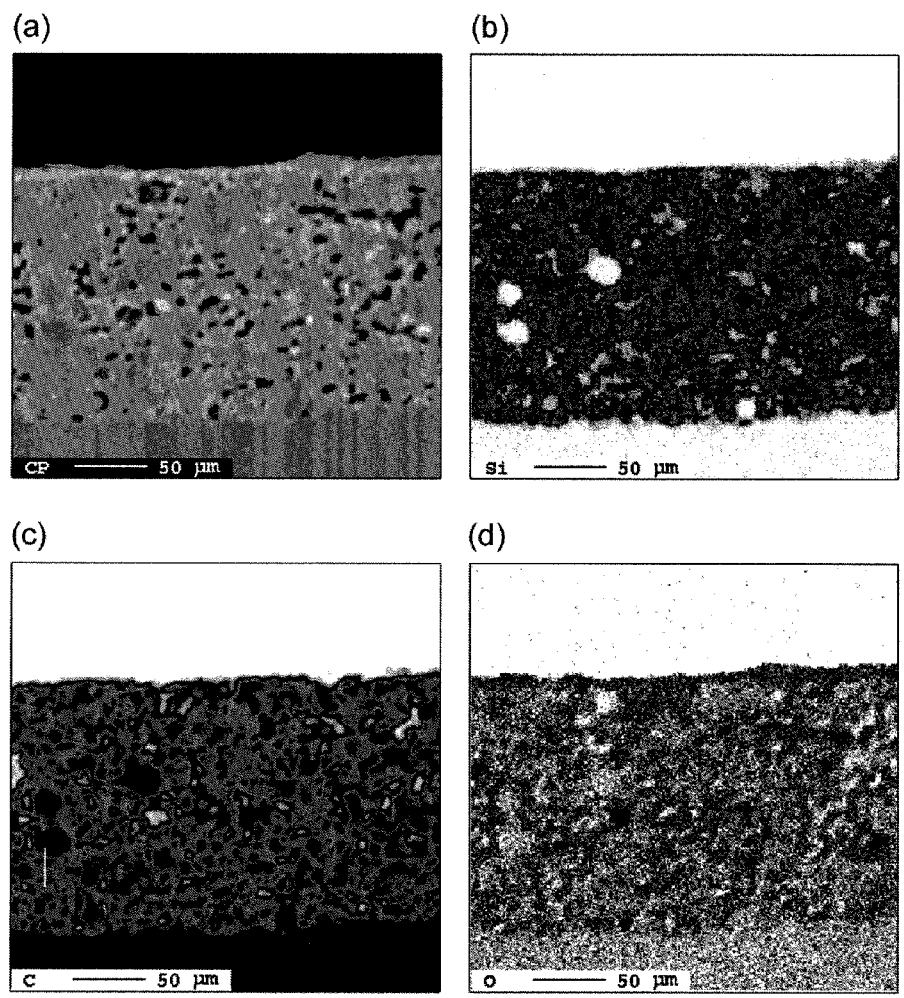
FIGS. 24(*a*) to 24(*d*) show X-ray images of Example 15.
Figure 25:
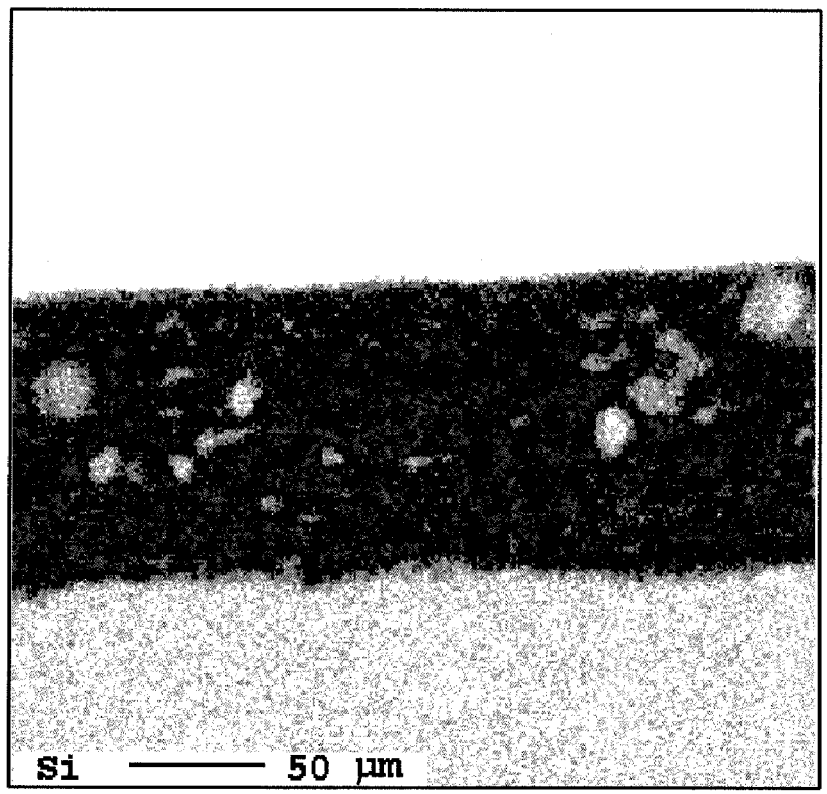
FIG. 25 shows an X-ray image of Example 9.
Figure 26:
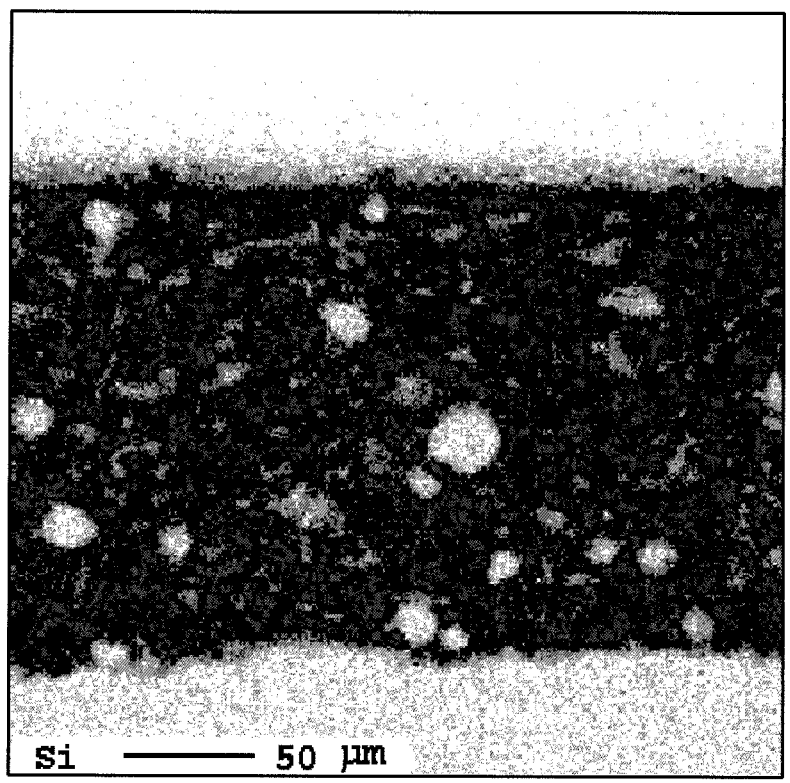
FIG. 26 shows an X-ray image of Example 10.
Figure 27:
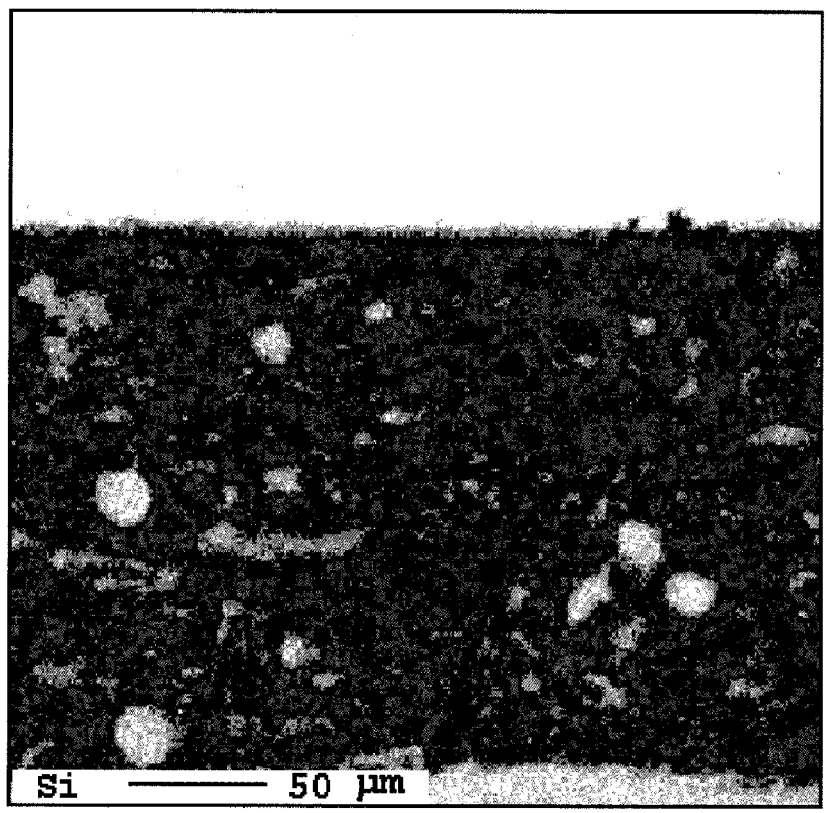
FIG. 27 shows an X-ray image of Example 12.
Figure 28:
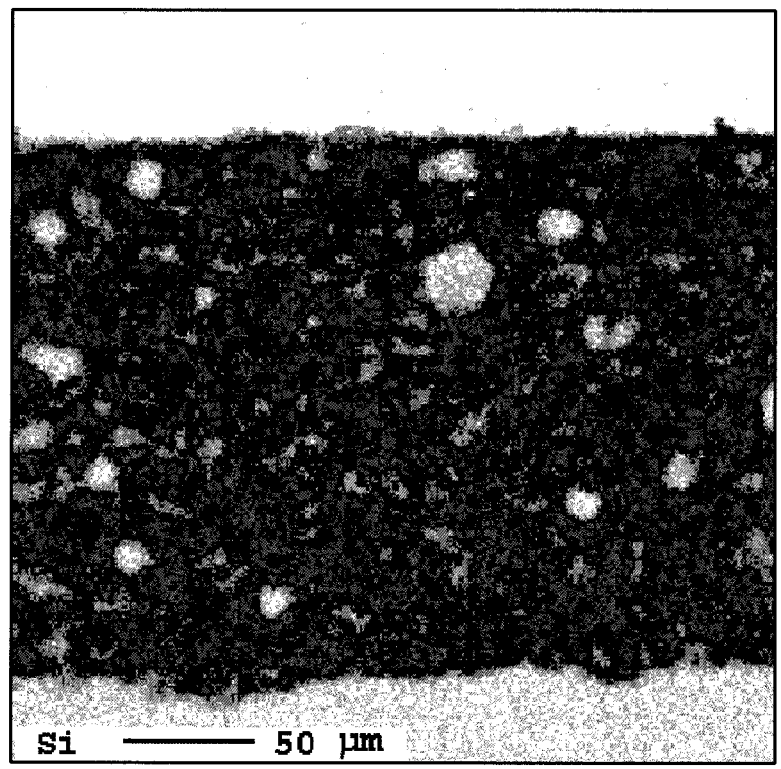
FIG. 28 shows an X-ray image of Example 13.
Figure 29:
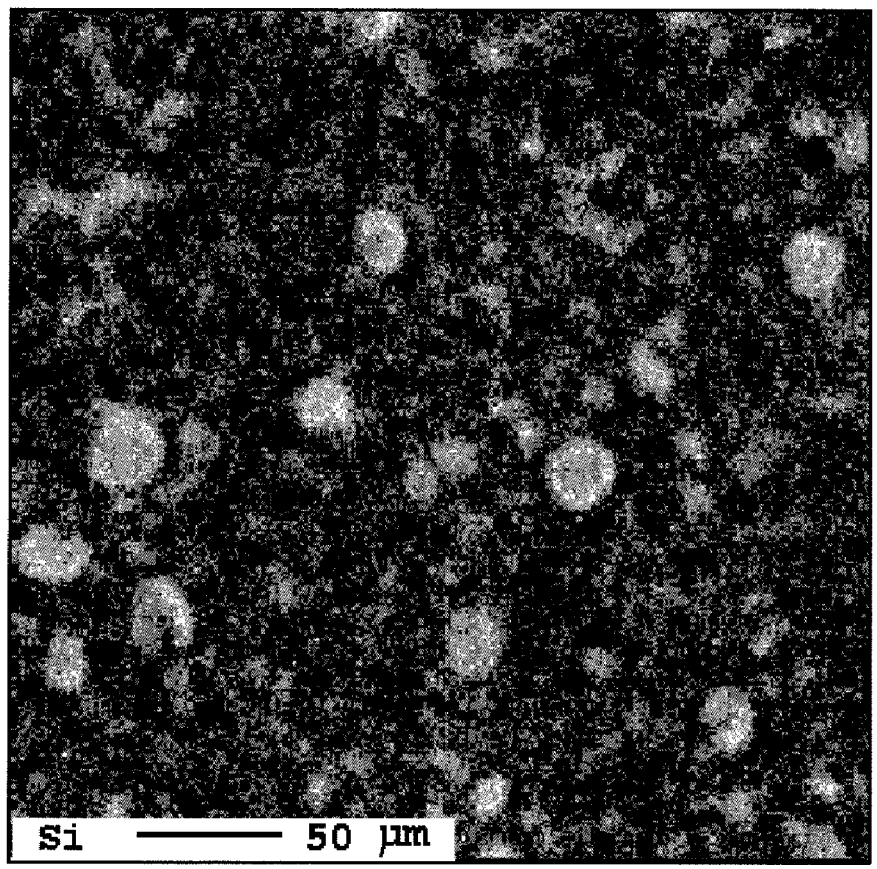
FIG. 29 shows an X-ray image of Example 9.
Figure 30:
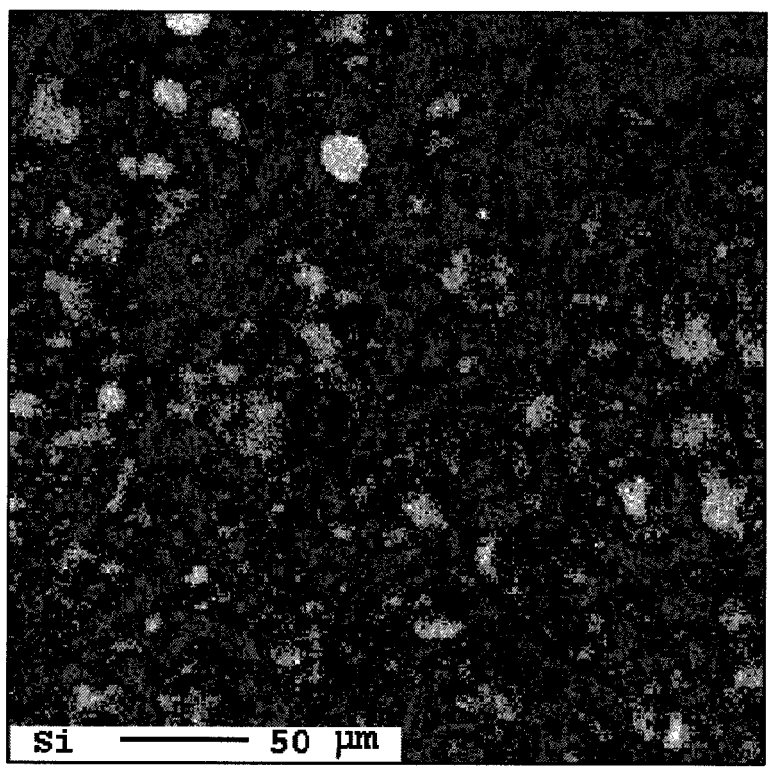
FIG. 30 shows an X-ray image of Example 10.
Figure 31:
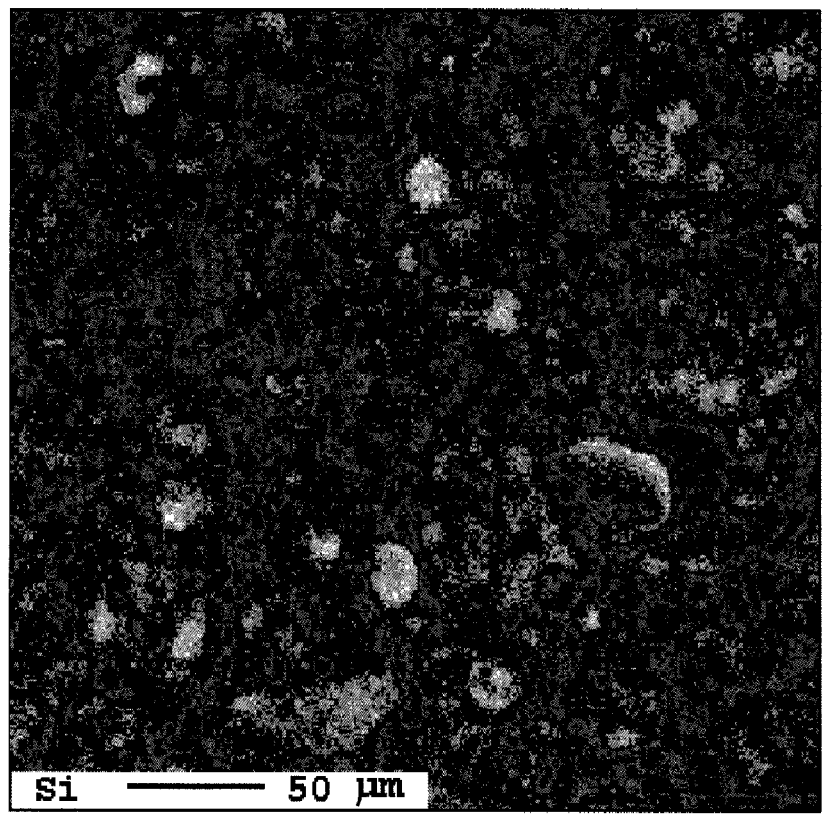
FIG. 31 shows an X-ray image of Example 12.
Figure 32:
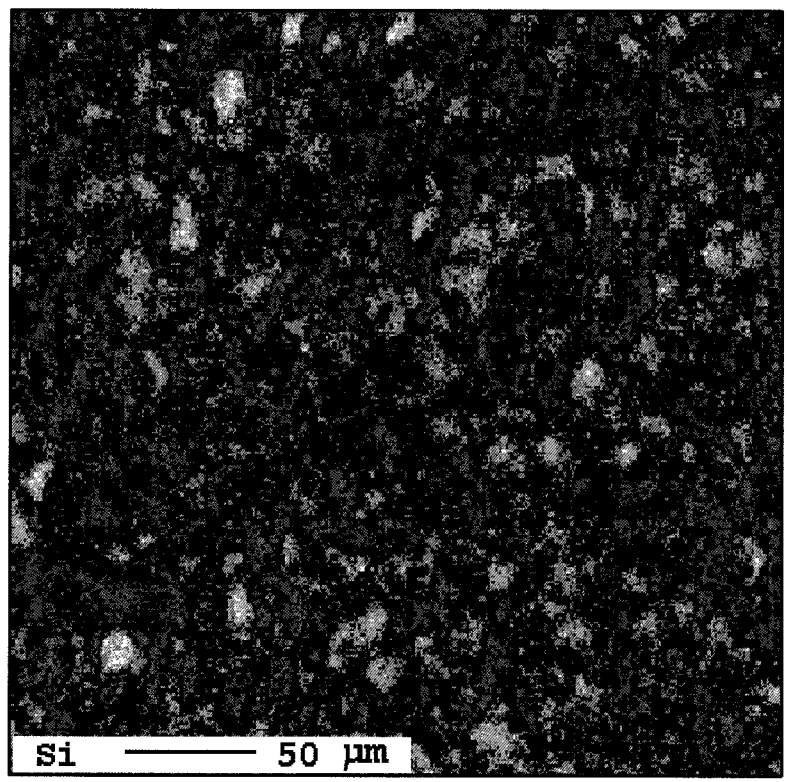
FIG. 32 shows an X-ray image of Example 13.

FIG. 18: Example 9, cross section in the initial stage
FIG. 19: Example 10, cross section in the initial stage
FIG. 20: Example 11, cross section in the initial stage
FIG. 21: Example 12, cross section in the initial stage
FIG. 22: Example 13, cross section in the initial stage
FIG. 23: Example 14, cross section in the initial stage
FIG. 24: Example 15, cross section in the initial stage
FIG. 25: Example 9, cross section after the sliding test
FIG. 26: Example 10, cross section after the sliding test
FIG. 27: Example 12, cross section after the sliding test
FIG. 28: Example 13, cross section after the sliding test
FIG. 29: Example 9, surface after the sliding test
FIG. 30: Example 10, surface after the sliding test
FIG. 31: Example 12, surface after the sliding test
FIG. 32: Example 13, surface after the sliding test As seen in the mapping images based on Si element concentration or O element concentration on the cross section in the initial stage, all the examples gave no uneven distribution of silicone compound in stratum state in the extrusion direction. With the comparison between the mapping image based on the Si element concentration and the mapping image based on the C element concentration, all the examples showed a tendency of distribution of Si elements in a large quantity around the insular zone where C element concentration is high. Similar to above, also on the mapping image based on the O element concentration, there appeared a tendency of distribution of O elements in a large quantity around the insular zone where C element concentration is high. A presumable reason of the phenomenon is that a phase composed mainly of the silicone compound is formed between the phases composed mainly of the olefin-based polymer having high C element concentration.

For the case of Example 9, the degree of uneven distribution of Si element concentration distribution was low, and the Si elements were distributed relatively uniformly. For the Examples 10 and 13, compared with Example 9, the percent age of zone of high Si concentration, 32 or higher level of Si element concentration, became distinctively large. For the Examples 14 and 15, there was shown a tendency of further increase in the percentage of the zone of high Si element concentration than in Example 13, giving many portions where the zone of high Si element concentration formed a network structure. Once the network structure is formed, it is presumed that many supply routes of the silicone compound from interior to the surface of the sliding member are formed. Furthermore, when Examples 11 and 12 are compared with Example 10, there is a tendency that increased quantity of silicone compound increases the percentage of the zone of high Si element concentration. In Example 12, there were observed many portions where the zones of high Si element concentration connect each other to form a network structure. In Example 9, the surface layer part in the vicinity of the sliding face significantly decreased after the sliding test under the Condition 2. However, Examples 10, 12, and 13 almost maintained the initial state of Si element distribution.

For the Example 9, the quantity of Si element left on the sliding face after the sliding test under the Condition 2 was small. On the other hand, Examples 10, 12, and 13 maintained a large quantity of zones of high Si element concentration around the insular zone of high C element concentration.

In the mapping images based on the O element concentration on the cross section in the initial stage, the zone of 3 or less of the level of O element concentration was judged as a dispersed phase of olefin-based polymer, and the longitudinal length of the dispersed phase, (dispersion diameter) was determined. The result is given in Table 9.

Figure 33:
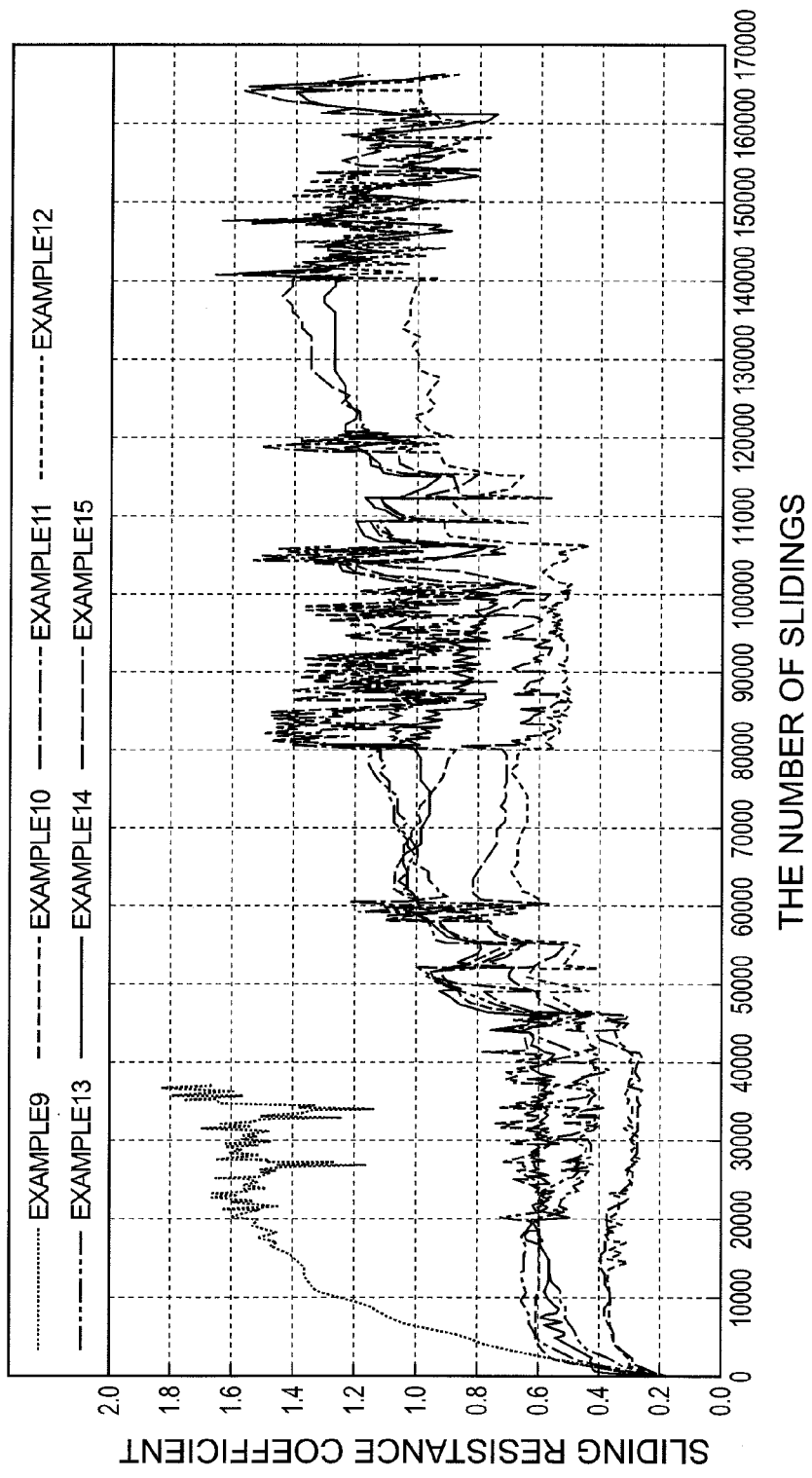
FIG. 33 is a graph showing the relation between the sliding resistance coefficient and the number of slidings.

FIG. 33 is a graph plotting the relation between the sliding resistance coefficient and the number of slidings in the sliding test under the "Condition 2". All the tests showed no significant increase in the sliding resistance coefficient in spite of severe condition. In particular, Examples 10 to 15 gave extremely high slide durability.

(Investigation 3)

Instead of ultrahigh molecular weight PE and SBS, more general materials were applied for investigation.

(1) Preparation of Crosslinked Lump

Using the raw material having the composition shown in Table 11, the crosslinked lump 6 was prepared by a similar procedure with that for preparing above crosslinking lumps 1 to 5. On applying dynamic crosslinking, however, the organic peroxide master batch was not scattered onto the pellets, but a composition other than the organic peroxide master batch and the organic peroxide master batch were charged into an extruder at a stoichiometric ratio using a weighing feeder. In the table, "EBT1" signifies ethylene-butene-ethylidene norbornene terpolymer, (high ethylene high diene type, diene quantity of 10.4 (iodine value of 22)), and "PP" signifies Novatec MA3H, (trade name, Japan Polychem Corporation). Other components are the same to those in the cases of crosslinked lumps 1 to 5,

TABLE 9

|  | Example 9 | Example 10 | Example 11 | Example 12 | Example 13 | Example 14 | Example 15 |
|---|---|---|---|---|---|---|---|
| Dispersion diameter (maximum length) [μm] | 13-55 | 6-51 | 14-65 | 6-69 | 14-55 | 6-55 | 10-83 |

The evaluation results of (5) to (7) are given in Table 10.

TABLE 10

|  | Example 9 | Example 10 | Example 11 | Example 12 | Example 13 | Example 14 | Example 15 |
|---|---|---|---|---|---|---|---|
| Viscosity of silicone compound (Torque of plastomill) [Nm] | 1.66 | 1.18 | 1.18 | 1.18 | 1.18 | 0.66 | 0.33 |
| Appearance | Good | Good | Good | Good | Good | Good | Good |
| Moldability | Good | Good | Good | Good | Good | Good | Good |
| Hardness Durometer D | 47 | 49 | 47 | 45 | 49 | 45 | 49 |
| 20 sets repeated sliding test Maximum value of sliding resistance [N] | 15.3 | 16.7 | 17.2 | 17.0 | 15.0 | 15.5 | 15.3 |
| 20 sets repeated sliding test Squeaking Noise generating Set No. (Numeral in parentheses is the number of slidings) | 4(4), 6(3), 7(6), 8(4), 11(1), 12(1), 13(1), 14(1), 15(2), 18(1), 19(1), 20(1) | Not generated | Not generated | Not generated | Not generated | Not generated | Not generated |
| 20 sets repeated sliding test Si-Me absorbance ratio on the sliding face Initial stage → after 20 sets | 2.0 →0.8 | 1.8 →1.3 | 1.9 →1.6 | 2.2 →2.5 | 1.4 →1.3 | 1.6 →1.9 | 1.5 →1.2 |
| Sliding test (Condition 2) The number of slidings exceeding 1.5 of the sliding resistance coefficient | 17506 | 82050 | 118636 | 166000 or more | 104663 | 140712 | 140212 |

TABLE 11

|  | Crosslinked lump 6 |
| --- | --- |
| EBT1 | 15.3 |
| HDPE | 66.3 |
| PP | 11.8 |
| Black pigment | 4.1 |
| Silicone oil (dynamic viscosity: 100 cSt) | 2.5 |
| Subtotal | 100 |
| Organic peroxide master batch | 17.4 |

(2) Preparation of Sliding Member (Two-Layer Molding)

The sliding material having the composition given in Table 12 was prepared by a similar procedure to that for the cases of "Investigation 1" and "Investigation 2". In the table, "Phenol crosslinked TPV2" is Sarlink 4155 (manufactured by DSM Inc.), and other components are the same to those in Investigations 1 and 2. With thus obtained sliding material, the sliding member was prepared by a similar procedure to that of "Investigation 1".

TABLE 12

|  | Example 16 |
| --- | --- |
| Phenol crosslinked TPV2 | 16.8 |
| PP | 25.2 |
| Crosslinked lump 6 | 48.4 |
| Light stabilizer and anti-aging agent | 0.3 |
| Black pigment | 2.9 |
| Clay | 6.3 |
| Subtotal | 100.0 |
| Acrylic silicone | 6.3 |
| Silicone oil A | 3.4 |
| Silicone oil B | 0.0 |
| Subtotal of silicone material | 9.7 |
| Grand total | 109.7 |
| Quantity of silicone compound | 9.7 |
| Content (%) of silicone compound in the sliding material | 8.8 |
| Residual fraction (%) of hot xylene reflux of the sliding material | 38.8 |

(3) Evaluation

For the Example 16, evaluations were given on the viscosity of silicone compound, the dispersed state of silicone compound, the appearance, the moldability, the hardness, and the slidability, similar to the "Investigation 2". The evaluation of slidability was given by the 7 sets repeated sliding test under the "Condition 1". Table 13 shows the result of the tests of the viscosity of silicone compound, the appearance, the moldability, the hardness, and the slidability.

Figure 34:
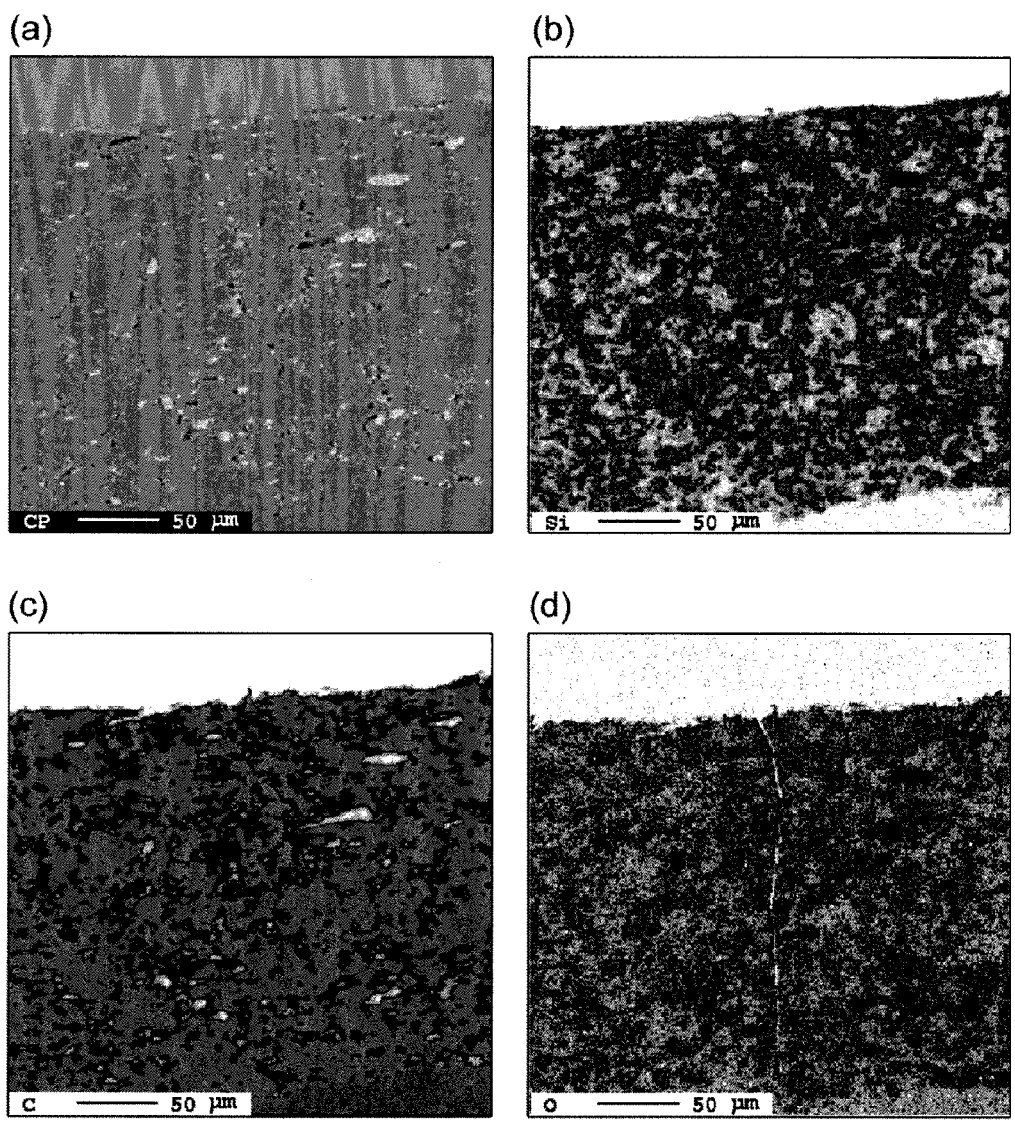
FIGS. 34(*a*) to 34(*d*) show X-ray images of Example 16.

FIG. 34 shows X-ray images of Example 16. In the X-ray images of FIG. 34, the case of Si element divides the concentration levels to the zone of "over 100", "100 to 87", "87 to 75", "75 to 62", "162 to 50", "50 to 37", "37 to 25", "25 to 12", "12 to 0", and "below 0". Color development was allowed by allotting the respective colors to the respective divided zones. The Si element did not segregate along the extrusion direction, but was distributed around the insular zone of high C element concentration (above-described dispersed phase of olefin-based polymer). The longitudinal length of the domain of high C element concentration was 2 to 56 μm.

TABLE 13

|  | Example 16 |
| --- | --- |
| Viscosity of silicone compound (Torque of plastomill) [Nm] | 0.52 |
| Viscosity of a mixture of silicone compound and clay (Torque of plastomill) [Nm] | 1.43 |
| Appearance | Good |
| Moldability | Good |
| Hardness (Durometer D) | 50 |
| 7 sets repeated sliding test Maximum dry load | 18.7 N |
| 7 sets repeated sliding test Squeaking Noise generating Set No. | Not generated |
| 7 sets repeated sliding test Removability of water | A |

(Investigation 4)

(1) Preparation of Crosslinked Lump

Using the raw material having the composition shown in Table 14, the crosslinked lump 7 and the crosslinked lump 8 were prepared by a similar procedure to that for preparing above crosslinking lump 6. In the table, "HDPE containing ultra-large molecule polyolefin" is LUBMER L5000 (trade name, manufactured by Mtsui Chemicals Inc.), "SEBC" is DYNARON 4600P (trade name, manufactured by JSR Corporation), and "Polyorganosiloxane containing Si—H group" is KF-99 (trade name, manufactured by Shin-Etsu Chemical Co., Ltd.).

Other components are the same to those in crosslinked lump 6.

TABLE 14

|  | Crosslinked lump 7 | Crosslinked lump 8 |
| --- | --- | --- |
| EBT1 | 36.0 | 25.0 |
| HDPE | 11.4 | 25.0 |
| HDPE containing ultra-large molecule polyolefin | 25.0 | 25.0 |
| PP | 16.9 | 18.8 |
| SEBC | 4.5 | 0 |
| Polyorganosiloxane containing Si—H group | 0.5 | 0.5 |
| Black pigment | 5.6 | 5.6 |
| Subtotal | 100.0 | 100.0 |
| 18-22% by weight of organic peroxide master batch | 6 | 8 |
| Total | 106.0 | 108.0 |
| Residual fraction (%) of hot xylene reflux | 83.7 | — |

(2) Preparation of Sliding Member (Two-Layer Molding)

The sliding materials having the respective compositions given in Table 15 were prepared by a similar procedure to that for the cases of "Investigation 1", "Investigation 2", and "Investigation 3". In the table, "Block PP" is Novatec PP BC2E (trade name, manufactured by Japan Polypropylene Corporation), and other components are the same to those of Investigations 1, 2, and 3. Using thus prepared sliding materials, the respective sliding members were prepared by a similar procedure to that of "Investigation 2".

TABLE 15

|  | Example 17 | Example 18 |
| --- | --- | --- |
| Phenol crosslinked TPV2 | 6.8 | 9.2 |
| Block PP | 0.0 | 21.6 |
| Crosslinked lump 7 | 91.1 | 0.0 |

TABLE 15-continued

|  | Example 17 | Example 18 |
|---|---|---|
| Crosslinked lump 8 | 0.0 | 66.8 |
| Light stabilizer and anti-aging agent | 0.3 | 0.7 |
| Black pigment | 1.8 | 1.7 |
| Subtotal | 100.0 | 100.0 |
| Silicone master pellet | 17.0 | 0.0 |
| Acrylic silicone | 3.4 | 7.5 |
| Silicone oil A | 6.8 | 7.0 |
| Silicone oil B | 0.0 | 4.6 |
| Subtotal of silicone-based material | 27.2 | 19.1 |
| Grand total | 127.2 | 119.1 |
| Quantity of silicone compound | 18.7 | 19.1 |
| Content (%) of silicone compound in the sliding material | 14.7 | 16.0 |
| Residual fraction (%) of hot xylene reflux of the sliding material | 62.1 | 57.6 |

(3) Evaluation

For the Examples 17 and 18, evaluations were given on the viscosity of silicone compound, the dispersed state of silicone compound, the appearance, the moldability, the hardness, and the slidability, similar to the "Investigation 2". The evaluation of slidability was given by the 7 sets repeated sliding test under the "Condition 1". Table 16 shows the result of the tests of the viscosity of silicone compound, the appearance, the moldability, the hardness, and the slidability. Examples 17 and 18 generated small quantity of "GUM", providing excellent moldability on this point.

TABLE 16

|  | Example 17 | Example 18 |
|---|---|---|
| Viscosity of silicone compound (Torque of plastomill) [Nm] | 1.18 | 0.04 |
| Appearance | Good | Good |
| Moldability | Good | Good |
| Hardness (Durometer D) | 36 | 45 |
| 7 sets repeated sliding test Maximum dry load | 14.3 N | 10.7 N |
| 7 sets repeated sliding test Squeaking Noise generating Set No. | Not generated | Not generated |
| 7 sets repeated sliding test Removability of water | AA | AA |

Figure 35:
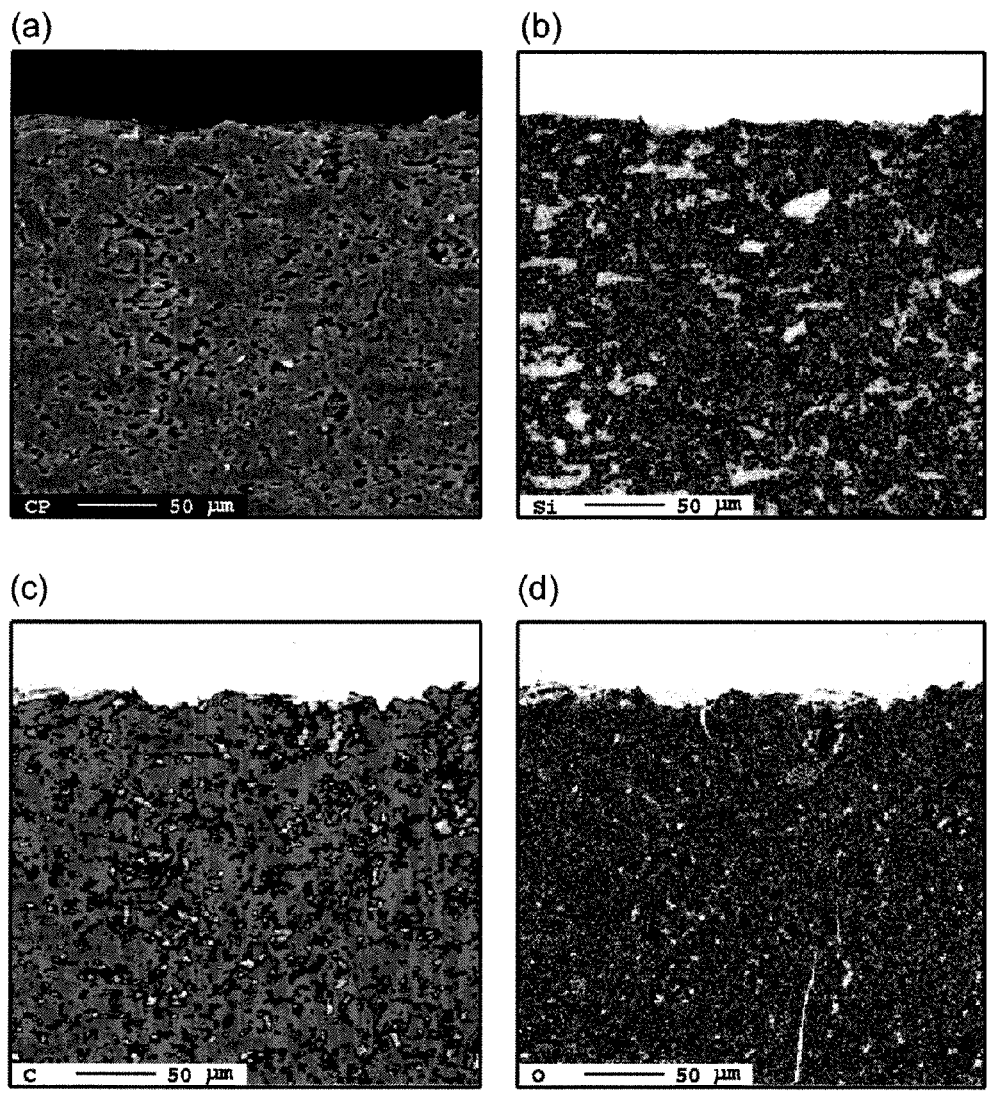
FIGS. 35(*a*) to 35(*d*) show X-ray images of Example 17.
Figure 36:
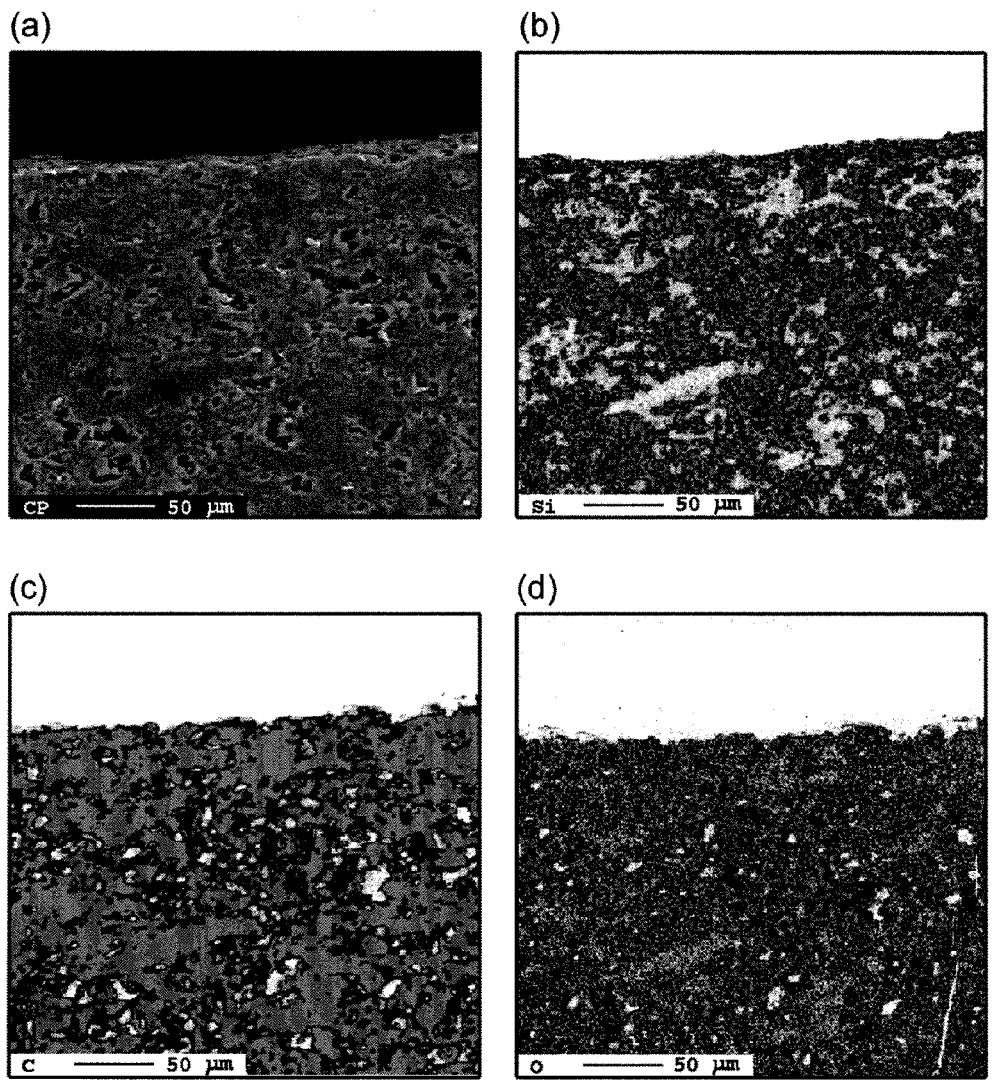
FIGS. 36(*a*) to 36(*d*) show X-ray images of Example 18.

FIG. 35 shows X-ray images of Example 17. FIG. 36 shows X-ray images of Example 18. Those X-ray images are drawn by different colors similar to FIG. 34. The maximum lengths of the zone of high C element concentration in Examples 17 and 18, (the above-described dispersed phase of olefin-based polymer), were 4 to 70 μm and 2 to 125 μm, respectively. There was observed the structure connecting the domains of high C element concentration with each other in spite of high concentration of silicone compound in the sliding material.

Figure 37:
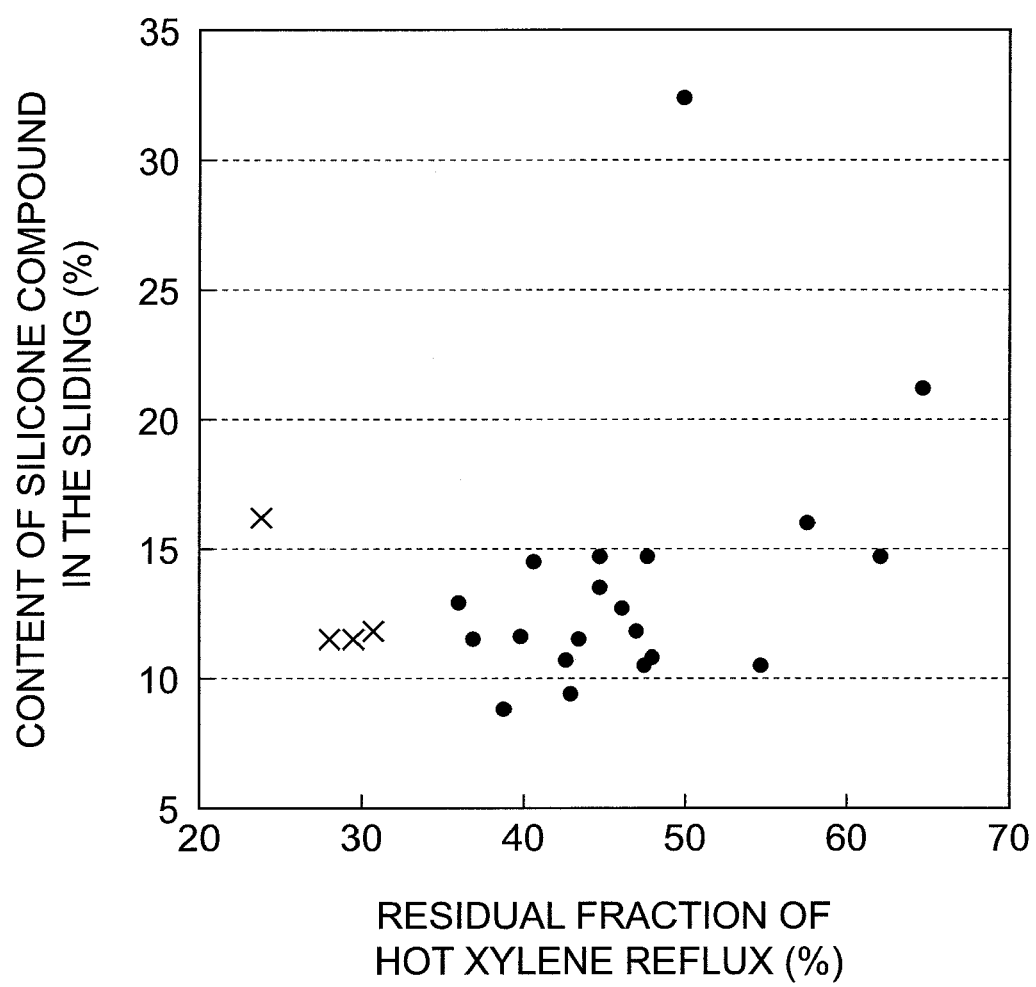
FIG. 37 is a graph showing the relation between the residual fraction (%) of hot xylene reflux and the content (%) of silicone compound in the sliding material.

FIG. 37 is the plot for the sliding members of Investigations 1 to 5, giving the relation between the residual fraction (%) of hot xylene reflux and the content (%) of silicone compound in the sliding material. The circular mark (○) in FIG. 37 signifies Example, and the cross mark (x) signifies Comparative Example.

(Investigation 5)
(1) Preparation of Crosslinked Lump

Using the raw materials and crosslinking agent having the composition shown in Table 17, the crosslinked lump 9 was prepared by a similar procedure to that for preparing above crosslinking lump 6. After dynamic crosslinking, however, the dynamic crosslinked material was formed into a strand by exclusion, water-cooled, and pulverized. In the table, "EPDM4" is NODEL IP4760P (trade name, manufactured by Dow Chemical Company), "EPDM5" is NODEL MG47130P (trade name, manufactured by Dow Chemical Company) which consist of 100 parts by weight of EPDM and 30 parts by weight of carbon black. Other components are the same to those in the investigation 1.

TABLE 17

|  | Crosslinked lump 7 |
|---|---|
| EPDM4 | 31.6 |
| EPDM5 | 27.3 |
| Reactor TPO | 8.4 |
| PP | 16.8 |
| Paraffin oil | 15.8 |
| Subtotal | 100 |
| Organic peroxide master batch | 15.8 |
| Total | 115.8 |

(2) Preparation of Sliding Member (Two-Layer Molding)

The sliding materials having the respective compositions given in Table 18 were prepared by a similar procedure to that for the cases of "Investigation 1", "Investigation 2", "Investigation 3" and "Investigation 4". Using thus prepared sliding materials, the respective sliding members were prepared by a similar procedure to that of "Investigation 2".

TABLE 18

|  | Example 19 | Example 20 |
|---|---|---|
| Phenol crosslinked TPV2 | 29.2 | 0 |
| Crosslinked lump 9 | 68.2 | 97.4 |
| Light stabilizer and anti-aging agent | 0.6 | 0.6 |
| Black pigment | 1.9 | 1.9 |
| Subtotal | 100 | 100 |
| Silicone master pellet | 3.2 | 5.7 |
| Acrylic silicone | 14.6 | 26.3 |
| Silicone oil A | 11.2 | 20.2 |
| Subtotal of silicone-based material | 29.0 | 52.2 |
| Grand total | 129.0 | 152.2 |
| Quantity of silicone compound | 27.4 | 49.3 |
| Content (%) of silicone compound in the sliding material | 21.2 | 32.4 |
| Residual fraction (%) of hot xylene reflux of the sliding material | 64.7 | 49.9 |

(3) Evaluation

For the Examples 19 and 20, evaluations were given on the viscosity of silicone compound, the dispersed state of silicone compound, the appearance, the moldability, the hardness, and the slidability, similar to the "Investigation 2". The evaluation of slidability was given by the 20 sets repeated sliding test under the "Condition 1". Additionally, the evaluation of the hardness A was given by the testing methods for durometer hardness of plastics (JIS K7215). Table 19 shows the result of the tests. Examples 19 and 20 generated no quantity of "GUM": non plate-out, providing excellent moldability on this point.

TABLE 19

|  | Example 19 | Example 20 |
|---|---|---|
| Viscosity of silicone compound (Torque of plastomill) [Nm] | 0.63 | 0.63 |
| Appearance | Good | Good |

TABLE 19-continued

|  | Example 19 | Example 20 |
| --- | --- | --- |
| Moldability | Good | Good |
| Hardness (Durometer D) | 17 | 14 |
| Hardness (A) | 70 | 60 |
| 20 sets repeated sliding test Dry maximum resistance at 7th set | 23.8 N | 16.3 N |
| 20 sets repeated sliding test Dry maximum resistance after 20th set | 28.9 N (at 14th set) | 19.8 N (at 19th set) |
| 20 sets repeated sliding test Squeaking Noise generating Set No. | — (none) | — (none) |

In Example 20, neither mud water nor water was present on the sliding face during 20 sets. In Example 19 as well, neither mud water nor water was ever present on the sliding track face during 14 sets. Afterwards, the water was sometime present on the sliding track face but the water moved along with the movement of the glass. The water never remained on the sliding track face as droplets or thin film. (The sliding face and sliding track face refers to a part where the glass is in slide-contact, in other words, a part that has a wear track.)

FIGS. 18 to 28 show X-ray images on the cross sections of the respective sliding members in the initial stage or after the sliding test. In FIGS. 18 to 24, (a), (b), (c), and (d) give the X-ray images in the same zone, giving (a) as the image of the cross section parallel to the extrusion direction, (b) as the image of applying mapping based on Si element concentration, (c) as the image thereof based on C element concentration, and (d) as the image thereof on O element concentration.

Figure 38:
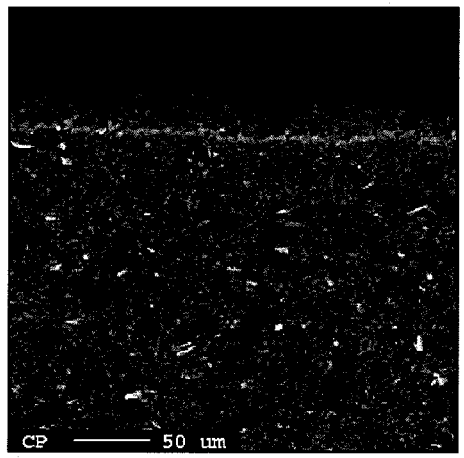
FIGS. 38(*a*) to 38(*d*) show X-ray images of Example 19.
Figure 38:
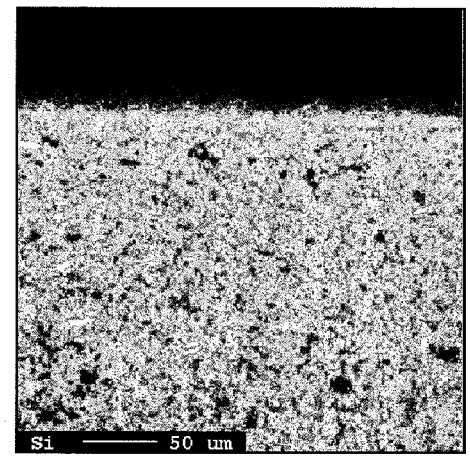
Figure 38:
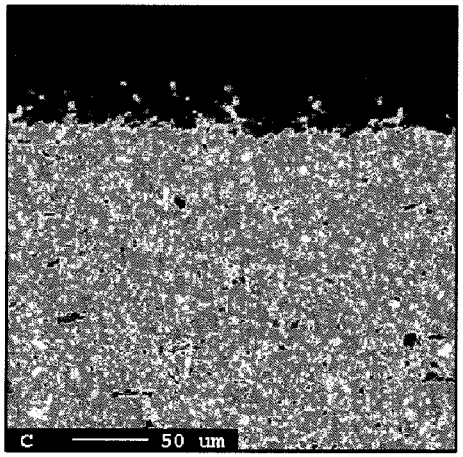
Figure 38:
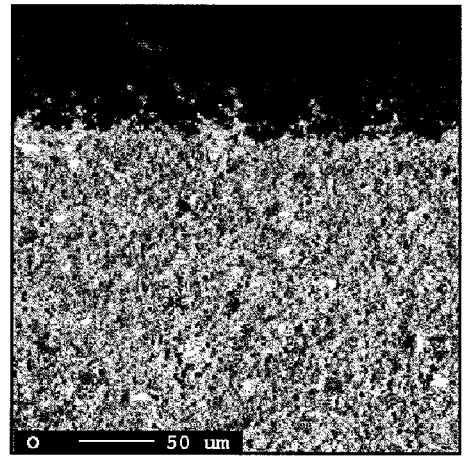
Figure 39:
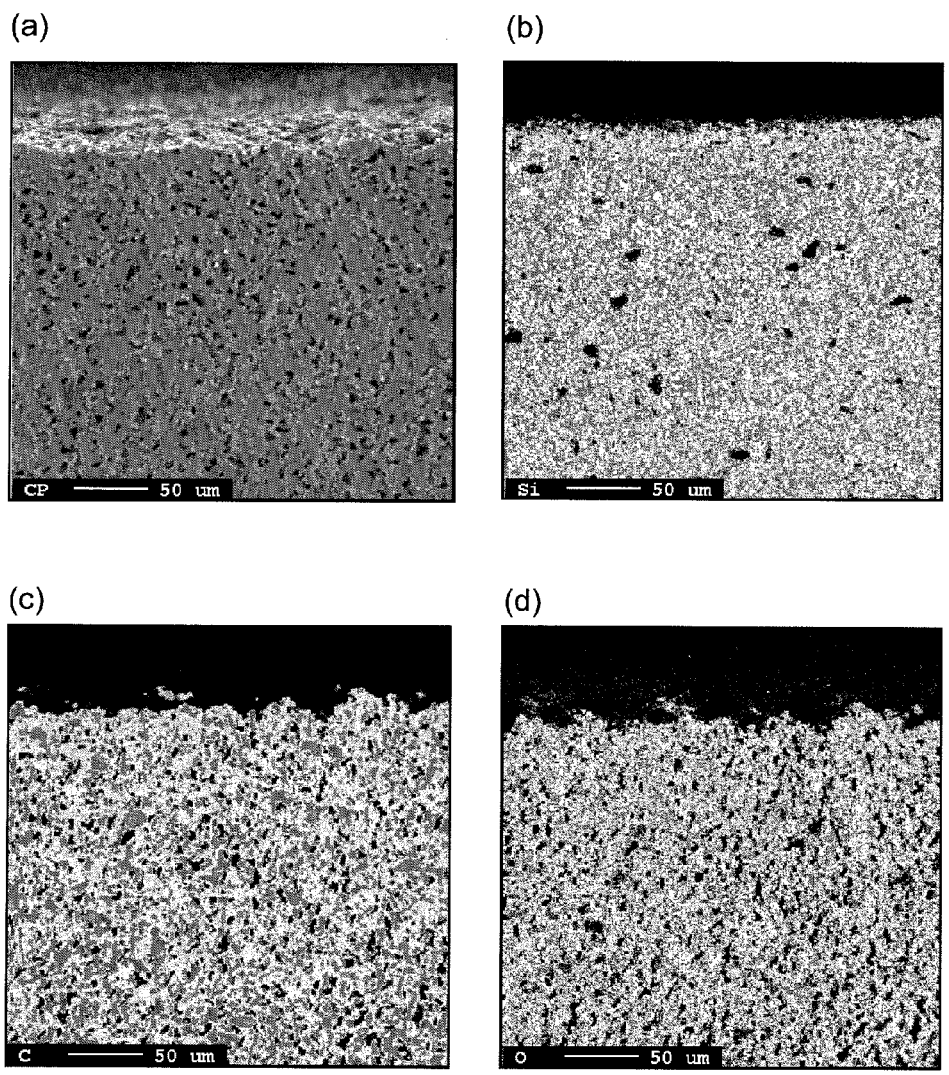
FIGS. 39(*a*) to 39(*d*) show X-ray images of Example 20.

As can be seen in FIGS. 38 and 39, Si is mesh-connected. The maximum length of olefin-based polymer of Example 19 is 4-21 μm. The maximum length of olefin-based polymer of Example 20 is 8-25 μm. The maximum length of olefin-based polymers of Example 19 and Example 20 were short and its distribution was small compared to other examples.

The invention claimed is:

1. A sliding material obtained by extrusion of a raw material containing an olefin-based polymer and a silicone compound as essential components,
wherein a part of the olefin-based polymer forms a crosslinked material in the sliding material, the crosslinked material forms domains to disperse in the sliding material so as to prevent uneven distribution of the silicone compound in the extrusion direction, the residual fraction of hot xylene reflux of the sliding material is in a range from 33 to 75% by weight based on the total weight of the sliding material, and the content of the silicone compound based on the total weight of the sliding material is in a range from 9 to 33% by weight,
wherein the mean particle diameter of the domains on the cross section parallel to the extrusion direction is in a range from 0.5 to 150 μm.

2. The sliding material according to claim 1,
wherein, on a cross section parallel to the extrusion direction, a portion of dispersed phase composed of the domain and the olefin-based polymer not-crosslinked, occupying 80% by area, has a dispersion diameter in a range from 0.1 to 200 μm.

3. The sliding material according to claim 1,
wherein the olefin-based polymer contains at least one olefin-based polymer selected from the group consisting of a not-crosslinked olefin-based polymer having an unsaturated bond and a not-crosslinked olefin-based polymer containing a group represented by the formula (i), (ii), (iii), or (iv), and the crosslinked material is obtained by dynamic-crosslinking extrusion,

4. The sliding material according to claim 1,
wherein the raw material contains a not-crosslinked olefin-based polymer and a crosslinked olefin-based polymer, and the crosslinked material is obtained by dynamic-crosslinking extrusion.

5. The sliding material according to claim 1,
wherein the silicone compound contains at least one silicone compound having 10 mPa·s or higher viscosity, selected from the group consisting of a silicone oil, a silicone gum, and a silicone copolymer containing 40% by weight or more of silicone.

6. A sliding member for weather strip slide-contacting with a window glass,
which sliding member is made of the sliding material according to claim 1.

7. A weather strip having a sliding member slide-contacting with a window glass,
which sliding member is made of the sliding material according to claim 1.

* * * * *